United States Patent
Kobayashi et al.

[11] Patent Number: 6,111,700
[45] Date of Patent: Aug. 29, 2000

[54] OPTICAL DISPLAY DEVICE HAVING A REFLECTION-TYPE POLARIZER

[75] Inventors: Tetsuya Kobayashi; Mari Sugawara; Tetsuya Hamada; Toshihiro Suzuki; Noriyuki Ohashi; Takeshi Gotoh; Hisashi Yamaguchi, all of Kawasaki, Japan

[73] Assignee: Fujitsu Limited, Kawasaki, Japan

[21] Appl. No.: 09/266,614

[22] Filed: Mar. 11, 1999

Related U.S. Application Data

[63] Continuation-in-part of application No. 08/922,489, Sep. 3, 1997, abandoned.

[30] Foreign Application Priority Data

| Sep. 5, 1996 | [JP] | Japan | ................................ 8-235506 |
| Apr. 30, 1997 | [JP] | Japan | ................................ 9-112603 |
| Jul. 30, 1997 | [JP] | Japan | ................................ 9-205052 |
| May 28, 1998 | [JP] | Japan | ................................ 10-147762 |

[51] Int. Cl.[7] ............................. G02B 27/10; G02B 5/30; G02B 27/28; G02F 1/13; G03B 21/14

[52] U.S. Cl. ......................... 359/627; 349/194; 353/20; 359/352; 359/502

[58] Field of Search ..................................... 349/193, 194; 353/20; 359/352, 483, 485, 490, 618, 619, 627, 502

[56] References Cited

U.S. PATENT DOCUMENTS

| 5,325,218 | 6/1994 | Willett et al. ............................. 359/53 |
| 5,387,953 | 2/1995 | Minoura et al. .......................... 353/20 |
| 5,506,704 | 4/1996 | Broer et al. ............................... 359/63 |
| 5,548,422 | 8/1996 | Conner et al. ............................ 359/65 |
| 5,564,810 | 10/1996 | Larson ....................................... 353/8 |
| 5,573,324 | 11/1996 | De Vaan ................................... 353/77 |
| 5,619,355 | 4/1997 | Sharp et al. .............................. 349/78 |
| 5,626,408 | 5/1997 | Heynderickx et al. ................... 353/20 |
| 5,627,666 | 5/1997 | Sharp et al. .............................. 349/74 |
| 5,691,789 | 11/1997 | Li et al. .................................... 349/98 |
| 5,712,694 | 1/1998 | Taira et al. ................................ 349/9 |
| 5,721,603 | 2/1998 | De Vaan et al. ........................ 349/194 |
| 5,737,044 | 4/1998 | Van Haaren et al. .................... 349/61 |
| 5,751,385 | 5/1998 | Heinze ...................................... 349/61 |
| 5,751,388 | 5/1998 | Larson ...................................... 349/96 |
| 6,008,871 | 12/1999 | Okumura .................................. 349/61 |

*Primary Examiner*—Scott J. Sugarman
*Assistant Examiner*—David N. Spector
*Attorney, Agent, or Firm*—Greer, Burns & Crain, Ltd.

[57] ABSTRACT

A polarization device includes a reflection-type polarization element disposed at a side to which an optical beam comes in and an absorption-type polarization element disposed behind the reflection-type polarization element, wherein the reflection-type polarization element and the absorption-type polarization element are disposed such that a transmission axis of the reflection-type polarization element coincides with the transmission axis of the absorption-type polarization element. Further, an optical projector using such a polarization device is disclosed.

29 Claims, 77 Drawing Sheets

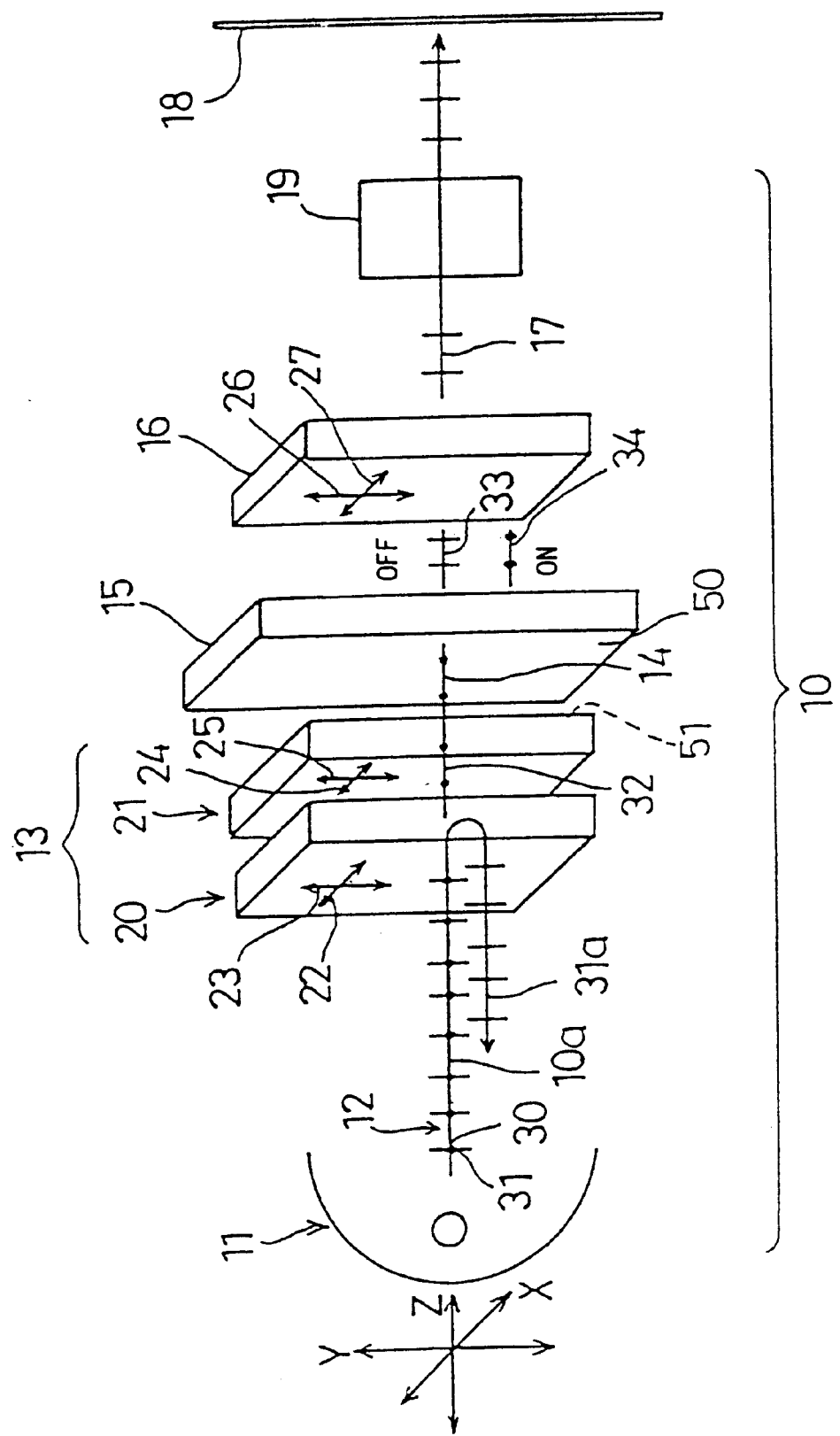

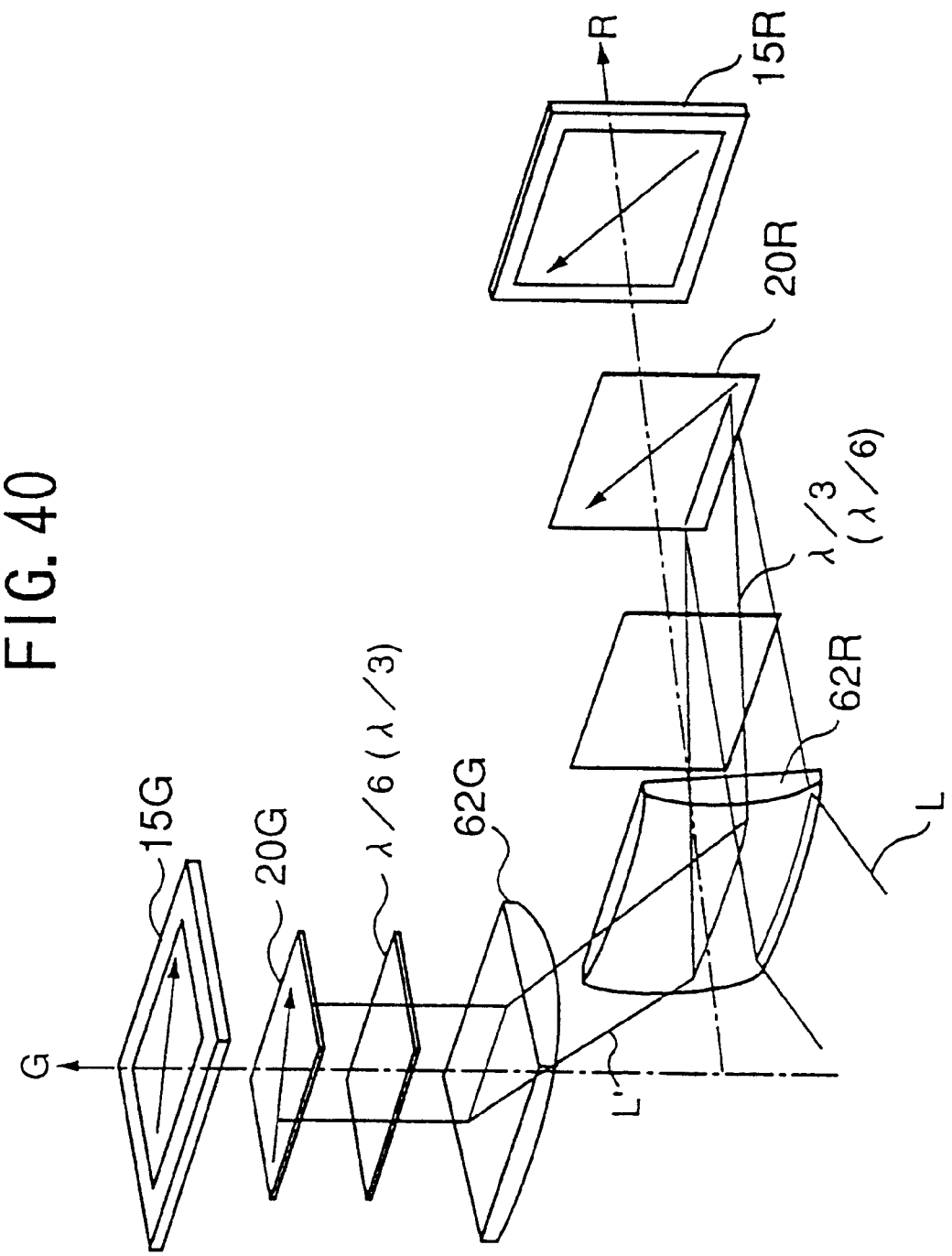

FIG. 68
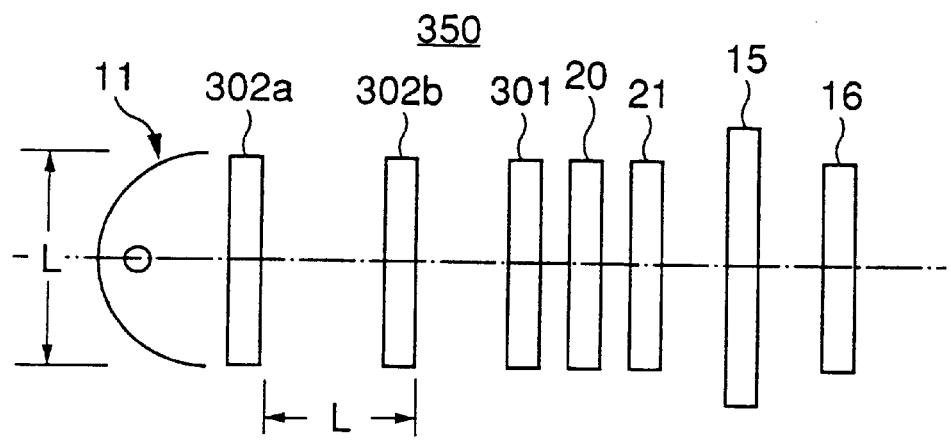
FIG. 69A
FIG. 69B
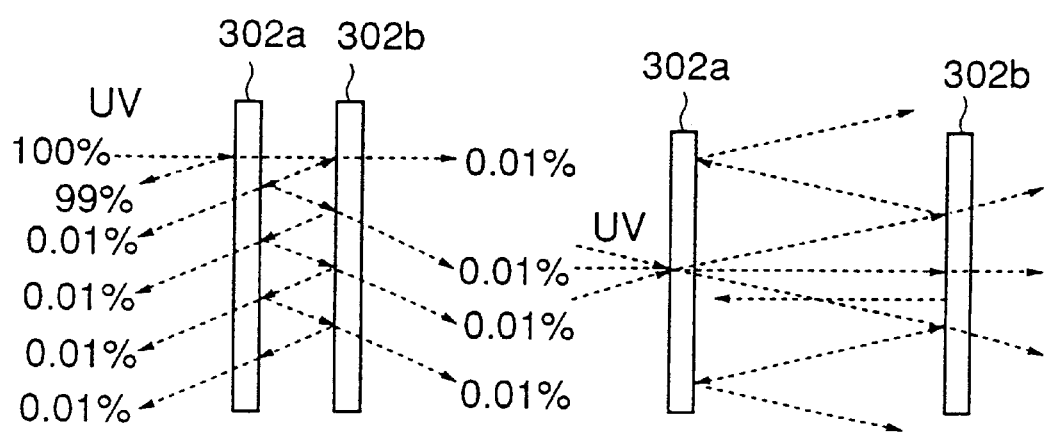

520

FIG. 85A
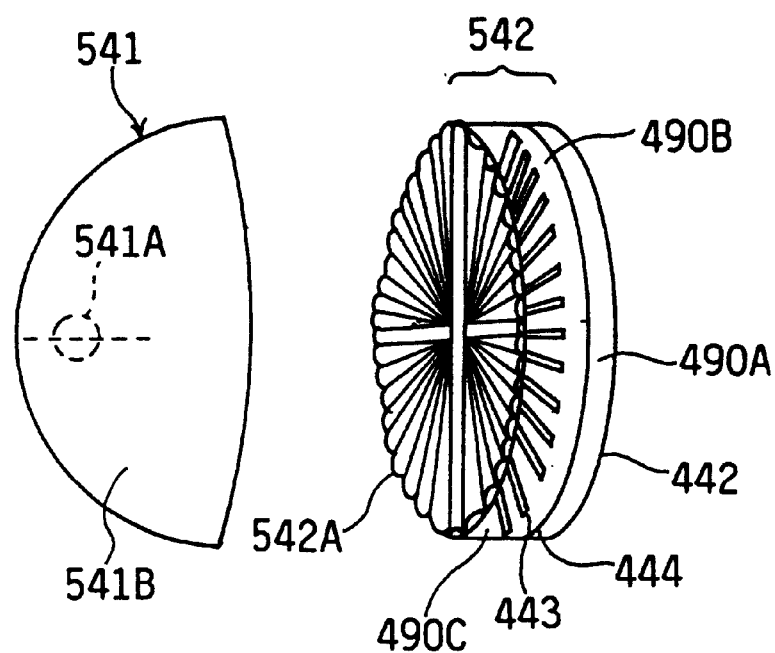
FIG. 85B    541    FIG. 85C
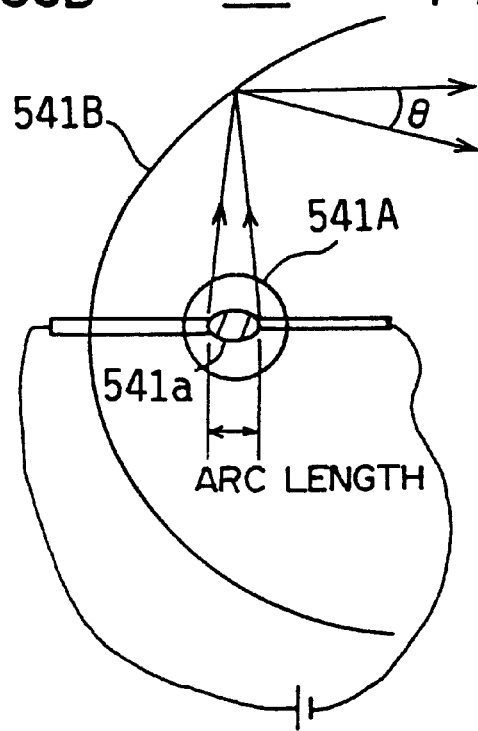
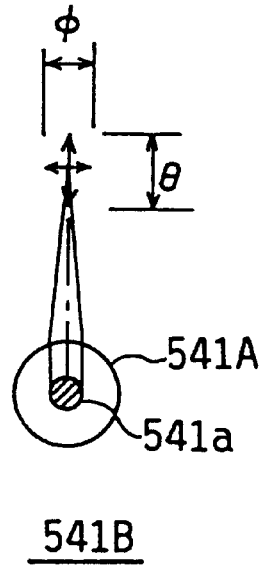

OPTICAL DISPLAY DEVICE HAVING A REFLECTION-TYPE POLARIZER

CROSS-REFERENCE TO RELATED APPLICATIONS

The present invention is a continuation-in-part application of the U.S. Pat. application Ser. No. 08/922,489 filed Sep. 3, 1997, now abandoned, the disclosure content thereof being incorporated herein by reference.

BACKGROUND OF THE INVENTION

The present invention generally relates to optical display devices and more particularly to an optical display device that uses a light valve such as an optical projector for projecting an image on a screen by means of a spatially modulated optical beam produced by a light valve. Further, the present invention relates also to a direct-view-type liquid crystal display device.

An optical projector is a device for projecting images on a screen by means of a spatially modulated optical beam produced by a light valve. In order to improve the visibility of the projected image, intensive efforts are being made to increase the luminance of the optical projectors. In conventional optical projectors, a luminance of about 600 lumens has been required on the screen. Recently, however, there are demands for a luminance of as much as 1000–1200 lumens on the screen.

In order to meet the demand, recent optical projectors tend to use a high-power metal-halide lamp of 350 W or more as compared with conventional optical projectors that typically use a metal-halide lamp of 250 W.

On the other hand, the use of such a high-power optical source causes a problem of severe heating of a polarizer used in the optical projector in combination with the light valve for producing a linearly polarized optical beam. For example, the polarizer surface is exposed to a luminance of as much as 200 million luxes in such high-power optical projectors. This value of luminance is twice as large as the luminance in a conventional optical projector.

A conventional optical projector typically has a construction that includes a metal-halide lamp as an optical source for producing an optical beam, a polarizer provided in a path of the optical beam for polarizing the incident optical beam to produce a linearly polarized optical beam, a light valve disposed in an optical path of the linearly polarized optical beam for a spatial modulation thereof, an analyzer disposed in an optical path of the spatially modulated optical beam to complete the optical spatial modulation, and a projection lens that projects the output optical beam exiting the analyzer on a screen. The polarizer typically includes dye molecules or iodine molecules dispersed in a polymer matrix and absorbs polarization components in the optical beam except for the component that has a polarization plane perpendicular to an absorption axis of the polarizer.

The optical beam components thus absorbed by the polarizer naturally induce a temperature rise in the polarizer itself, and because of this, conventional optical projectors have used a bulky cooling mechanism for cooling the polarizer as an indispensable element thereof. In a typical example, such a cooling mechanism is used for suppressing the temperature of the polarizer below about 70° C. for the polarizers that use dye molecules. In the case of iodine polarizers, the temperature has to be suppressed below about 60° C. As already noted, the luminance reaches as much as 200 million luxes at the polarizer surface when the metal-halide lamp of 350 W is used in place of the metal-halide lamp of 250 W. Thus, the temperature of the polarizer easily exceeds the foregoing tolerable limit as a result of the absorption of about one-half the energy of the foregoing 200 million luxes when the polarizer is not properly cooled.

Thus, the use of a cooling mechanism has been indispensable in conventional optical projectors for cooling the polarizer. However, such a use of the cooling mechanism inevitably increases the size as well as the cost of the optical projector.

SUMMARY OF THE INVENTION

Accordingly, it is a general object of the present invention to provide a novel and useful optical projector wherein the foregoing problems are successfully eliminated.

Another and more specific object of the present invention is to provide an optical projector capable of effectively suppressing a temperature rise of a polarizer used in the optical projector for polarizing a high-power optical beam produced by a high-power optical source.

Another object of the present invention is to provide an optical projector that uses a polarizer in combination with an optical source for producing a polarized optical beam, wherein the polarizer reflects an incident optical beam from the optical source except for an optical component having a predetermined polarization plane when producing a polarized optical beam.

Another object of the present invention is to provide an optical projector that uses a reflection-type polarizer in combination with an optical source for producing a polarized optical beam, wherein the problem of projection of a stray light, caused by the reflection of the optical beam at the reflection-type polarizer, on the screen is successfully minimized.

Another object of the present invention is to provide an optical projector that uses a reflection-type polarizer in combination with an optical source for producing a polarized optical beam, wherein the reflected polarization component is processed in a polarization processor for converting the polarization plane thereof so as to be coincident to the polarization plane of the polarization component passed through the reflection-type polarizer.

Another object of the present invention is to provide a polarization device for polarizing an incident optical beam, comprising:

a first polarization element passing a predetermined polarization component included in said incident optical beam and having a predetermined polarization plane, said first polarization element reflecting other polarization components substantially, said other polarization components being included in said incident optical beam and having different polarization planes; and a second polarization element passing said polarization component having said predetermined polarization plane and absorbing said other polarization components substantially;

said first and second polarization elements being disposed such that a transmission axis of said first polarization element and a transmission axis of said second polarization element coincide with each other;

said first polarization element being disposed at an upstream side of an optical path of said incident optical beam with respect to said second polarization element, said polarization device further comprising a condenser lens on said optical path at an upstream side of said incident optical beam with respect to said first polarization element.

According to the present invention, about one-half of the energy of the incident optical beam is reflected by the first polarization element without causing a temperature rise in the first or second polarization elements. Further, the second polarization element of the absorption-type refines the polarization of the incident optical beam caused by the first polarization element. By providing a condenser lens on the optical path at the upstream side of the incident optical beam with respect to the first polarization element, the optical path of the polarization component reflected by the first polarization element is offset from the optical path of the optical beam incident to the first polarization element, and the problem of temperature rise of the optical source by the reflected polarization component is avoided.

Another object of the present invention is to provide an optical projector, comprising:

an optical source;

a color separation system disposed on an optical path of an optical beam emitted from said optical source, said color separation system separating said optical beam into respective color optical beams;

a plurality of light valves provided respectively in correspondence to said color optical beams, each of said light valves being disposed on an optical path of a corresponding color optical beam for applying a spatial modulation thereto, said light valve producing thereby a spatially modulated color optical beam;

a plurality of polarization devices respectively provided on said optical paths of said color optical beams incident to said light valves, each of said polarization devices causing a polarization in said color optical beam passing therethrough, such that said color optical beam has a predetermined polarization plane; and a projecting optical system synthesizing a projection optical beam from said plurality of spatially modulated color optical beams and projecting said projection optical beam on a screen;

at least one of said plurality of polarization devices including a reflection-type polarization element that has a transmission axis and passes a predetermined linear polarization component included in said color optical beam incident to said reflection-type polarization element and having a predetermined polarization plane coincident to said transmission axis, said reflection-type polarization element further reflecting other polarization components included in said color optical beam incident thereto, said reflection-type polarization element including a lens at a side to which said color optical beam impinges.

According to the present invention, it is possible to eliminate the cooling system for cooling the polarization element even when a very powerful optical source is used for improving the visibility of the optical projector. Due to the elimination of the bulky cooling system, it becomes possible to construct the optical projector with reduced size and cost. By providing a lens at the upstream side of the incident optical beam with respect to the reflection-type polarization element, the optical path of the polarization component reflected by the reflection-type polarization element is offset from the optical path of the optical beam incident to the reflection-type polarization element, and the problem of temperature rise of the optical source by the reflected polarization component is avoided.

Another object of the present invention is to provide an optical display device, comprising:

an optical source;

a focusing element disposed in an optical path of an optical beam produced by said optical source;

a reflection-type polarization element disposed in an optical path of said optical beam passed through said focusing element, said reflection-type polarization element selectively passing therethrough an optical component of said optical beam having a predetermined polarization plane and reflecting polarization components of said optical beam of which polarization plane does not coincide said predetermined polarization plane;

an optical spatial modulation element disposed in an optical path of said optical beam passed through said reflection-type polarization element for applying a spatial modulation thereto;

a reflector disposed in an optically ineffective region of said focusing element, said optically ineffective region being a region to which no optical beam reaches as a result of focusing action of said focusing element, said reflector reflecting said optical components reflected by said reflection-type polarization element in a direction toward said optical spatial modulation element as a reflection optical beam; and a polarization plane rotating device disposed in an optical path of said reflection optical beam for causing a rotation in an optical plane of said reflection optical beam before said reflection optical beam impinges said optical spatial modulation element.

According to the present invention, the polarization component hitherto being simply wasted is used also for the representation of optical images. Thereby, the luminance of the optical representation is improved by almost twice, without increasing the optical power of the optical source.

Other objects and further features of the present invention will become apparent from the following detailed description when read in conjunction with the attached drawings.

BRIEF DESCRIPTION OF THE DRAWINGS

FIG. 1 is a diagram showing the construction of an optical projector according to a first embodiment of the present invention;

FIG. 40 is a diagram showing the construction of an optical projector according to a twenty-fifth embodiment of the present invention;

FIG. 68 is a diagram showing the construction of an optical projector according to a forty-eighth embodiment of the present invention;

FIGS. 69A and 69B are diagrams explaining the action of a ultraviolet-cut filter used in the construction of FIG. 68;

FIGS. 85A–85C are diagrams showing the construction of a polarization optical source according to a sixty-first embodiment of the present invention;

DETAILED DESCRIPTION OF THE PREFERRED EMBODIMENTS

FIRST EMBODIMENT

Figure 2A:
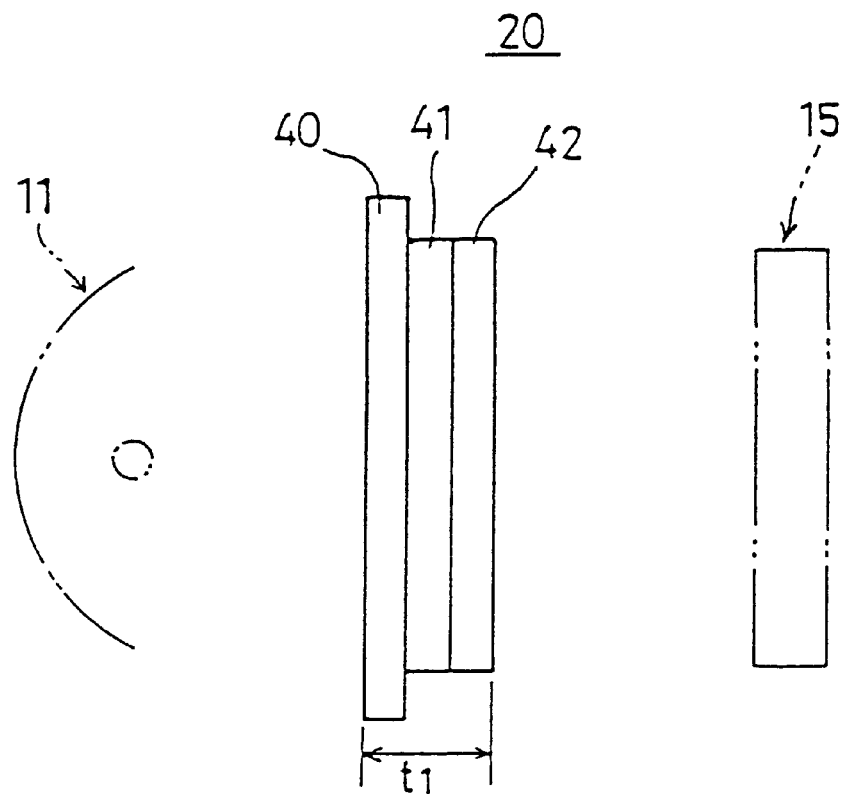
FIGS. 2A and 2B are diagrams showing the construction of a polarizer used in the optical projector of FIG. 1 in detail.

FIG. 1 shows the construction of an optical projector 10 according to a first embodiment of the present invention.

Referring to FIG. 1, the optical projector 10 includes a high-power metal halide lamp as an optical source 11 for producing a high-power optical beam 12 such that the optical beam 12 travels along an optical path 10a in a Z-direction, wherein a polarization device 13 is disposed on the optical path 10a of the optical beam 12 for producing a linearly polarized optical beam 14 from the incident optical beam 12, such that the linearly polarized optical beam 14 has a polarization plane parallel to an X-direction which is perpendicular to the Z-direction as indicated in FIG. 1. In order to improve the visibility of the projected image, the optical projector 10 of FIG. 1 uses a high-power metal halide lamp of 350 W for the optical source 11.

In the optical projector 10 of FIG. 1, the polarization device 13 is formed of a first polarization element 20 having an optical transmission axis 22 parallel to the X-direction and a second polarization element 21 having an optical transmission axis 24 also parallel to the foregoing X-direction, wherein it should be noted that the polarization element 20 has a reflection axis 23 perpendicular to the transmission axis 22 and reflects an optical beam component 31a included in the optical beam 12 and having a polarization plane deviated from the foregoing optical transmission axis 22. The second polarization element 21 is an ordinary polarizer having an optical absorption axis 25 in a Y-direction which is perpendicular to the foregoing optical transmission axis 24 and absorbs the optical beam components except for the one having a polarization plane coincident to the foregoing optical transmission axis 24. It should be noted that the optical beam 12, produced by the metal halide lamp 11 is an unpolarized, natural beam, includes an X-polarization component having a polarization plane 30 parallel to the polarization plane 22 and also a Y-polarization component having a polarization plane 31 perpendicular to the polarization plane 22. A more detailed description about the construction as well as the principle of the polarization device 13 will be given later.

After passing through the polarization device 13, the optical beam 14, formed of the X-component, impinges upon a light valve 15 that includes therein a liquid crystal panel 50, wherein the liquid crystal panel 50 causes a 90°-rotation in the polarization plane of the optical beam 14 as it passes through the liquid crystal panel 50 in a non-activated state thereof in which no drive voltage is applied across the liquid crystal panel 50. In such a case, an optical beam is obtained at an exit side of the light valve 15 with a polarization plane 33 such that the polarization plane 33 is perpendicular to the polarization plane of the incident optical beam 14. When the liquid crystal panel 50 is applied with a drive voltage in correspondence to an activated state thereof, on the other hand, the optical beam 14 passes through the liquid crystal panel 50 without a rotation of the polarization plane. Thereby, an output optical beam is obtained at the exit side of the light valve 15 with a polarization plane 34 parallel to the polarization plane of the incident optical beam 14.

The optical beam 33 or 34 thus obtained at the exit side of the light valve 15 then impinges upon an analyzer 16 that has an optical absorption axis 27 in the X-direction, and a spatially modulated output optical beam 17 is obtained at an exit side of the analyzer 16 as a result of the foregoing passage of the optical beam through the analyzer 16. The output optical beam 17 is then projected on a screen 18 by way of a projection lens 19.

FIG. 2A shows the construction of the polarization element 20 used in the optical projector 10 of FIG. 1, wherein it should be noted that the polarization element 20 includes a glass substrate 40 that carries thereon a liquid crystal panel 41 of a cholesteric liquid crystal. Further, a quarter-wavelength plate 42 is provided on the liquid crystal film 41 at a side away from the optical source 11.

Figure 2B:
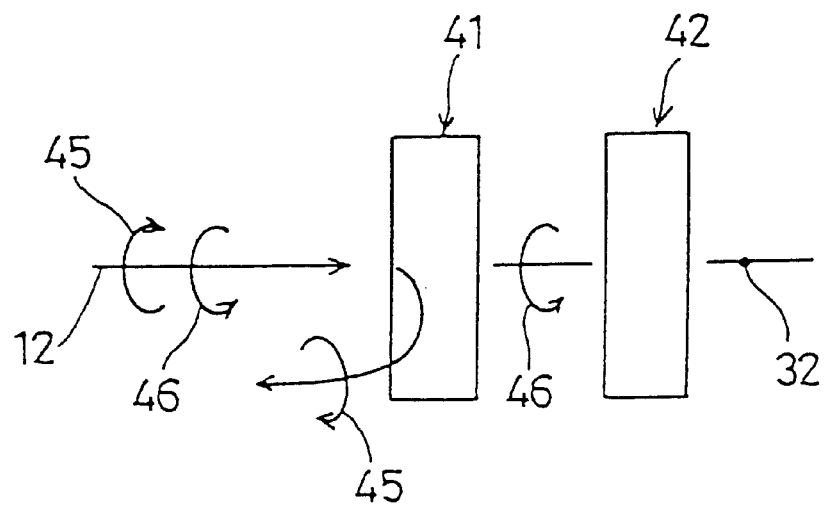

Referring to FIG. 2B, it should be noted that the cholesteric liquid crystal panel 41 reflects a circularly polarized optical beam component 45 included in the incoming optical beam 12 and showing a right-hand rotation of the polarization plane, while the cholesteric liquid crystal film 41 allows a circularly polarized optical beam component 46 that shows a left-hand rotation of the polarization plane to pass therethrough without a substantial absorption or reflection. The circularly polarized optical beam 46 thus passed through the liquid crystal panel 41 then impinges upon a quarter-wavelength plate 42 that converts the incoming circularly polarized optical beam 46 into a linearly polarized optical beam 32 having a planar polarization plane. The function of a quarter-wavelength plate to convert a circularly polarized optical beam to a linearly polarized optical beam or vice versa is well known in the art.

As almost one-half of the energy of the incoming optical beam 12 is thus reflected by the cholesteric liquid crystal panel 41, the problem of the temperature rise of the polarization element 21 disposed behind the polarization element 20 is successfully minimized.

Figure 3A:
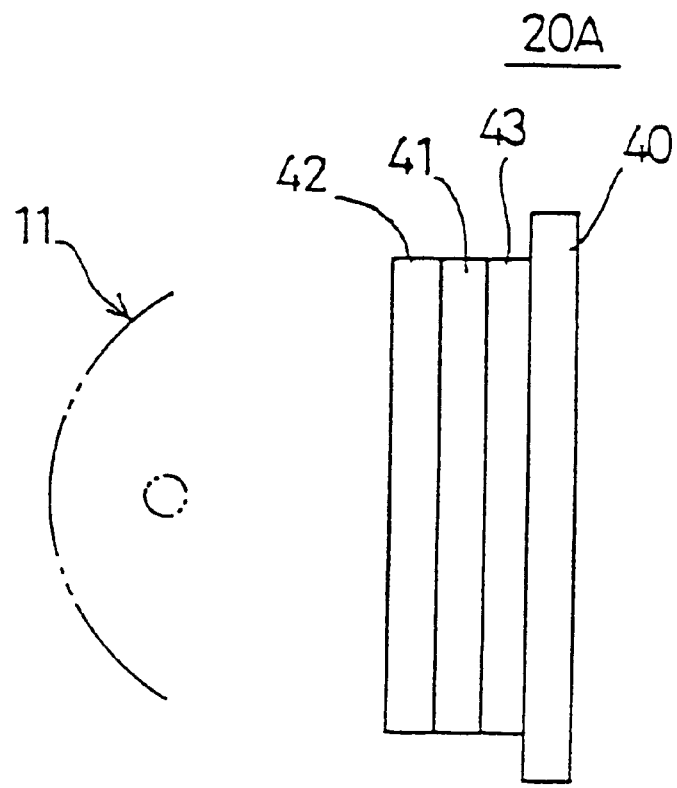
FIGS. 3A and 3B are diagrams showing a modification of the polarizer of FIGS. 2A and 2B.

FIG. 3A shows a polarization element 20A according to a modification of the polarization element 20 of FIG. 2A.

Figure 3B:
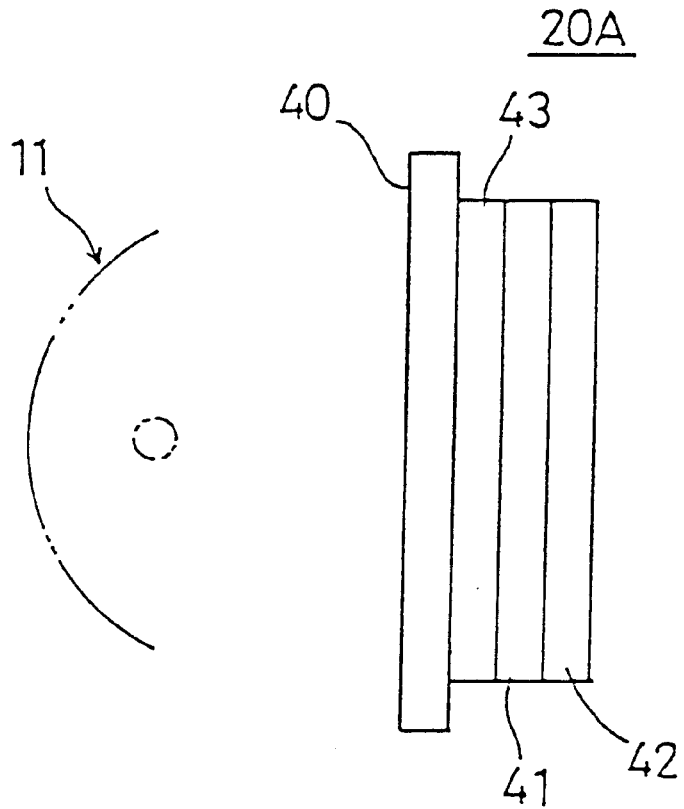

Referring to FIG. 3A, the polarization element 20A includes the layers 41 and 42 at the side of the substrate 40 close to the optical source 11, and another quarter-wavelength plate 43 is disposed between the cholesteric liquid crystal panel 41 and the substrate 40. By constructing the polarization element 20A such that the cholesteric liquid crystal panel 41 is sandwiched between the quarter-wavelength plates 42 and 43, it is possible to use the polarization element 20A in either the state shown in FIG. 3A in which the layers 41–43 are provided at the side of the substrate 40 close to the optical source 11 or the state shown in FIG. 3B in which the layers 41–43 are provided at the side of the substrate 40 away from the optical source 11.

Figure 4:
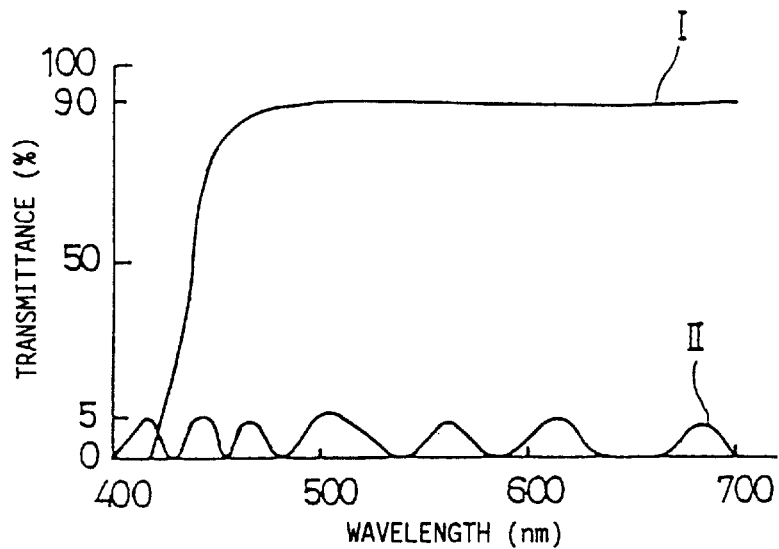
FIG. 4 is a diagram showing a transmittance of a polarization element used in the polarizer of FIGS. 2A and 2B; A

FIG. 4 shows a transmittance of the X-component of the optical beam 12 shown in FIG. 2B through the polarization element 20 in comparison with the Y-component that is interrupted by the polarization element 20 as a result of the reflection, wherein the X-component corresponds to the optical beam component of the optical beam 12 having the polarization plane 30 while the Y-component corresponds to the optical beam component that has the polarization plane 31.

Referring to FIG. 4, it should be noted that the transmittance of the polarization element 20 reaches about 90% or more for the wavelength exceeding 500 nm for the X-component. On the other hand, the transmittance is suppressed to below 5% throughout the wavelength range between 400–700 nm for the Y-component. The result of FIG. 3 indicates that the polarization element 20 acts as an effective polarizer.

Figure 5:
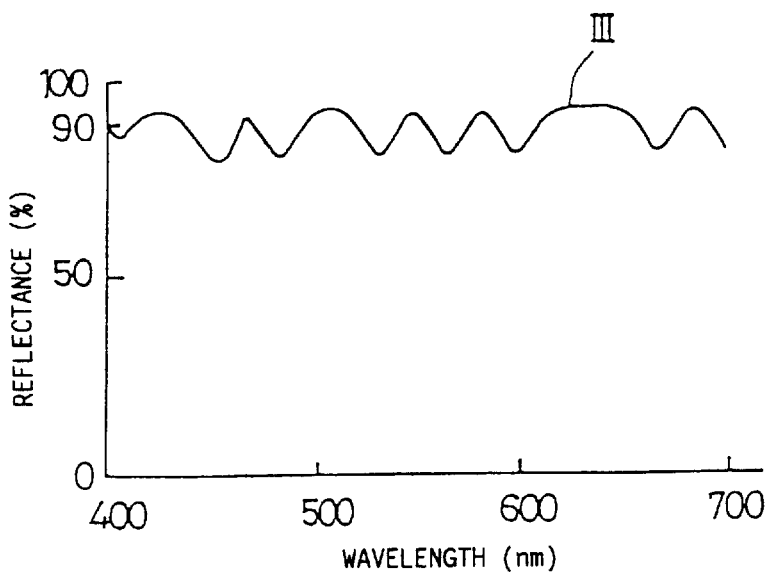
FIG. 5 is a diagram showing a reflectance of the polarization element of FIG. 3

FIG. 5 shows, on the other hand, a reflectance which the polarization element 20 shows against the right-handed polarization component 45 as shown in FIG. 2B, wherein it should be noted that the reflectance reaches as high as about 90% for the entire wavelength range between 400 nm and 700 nm. The result of FIG. 5 indicates that almost one-half of the incident optical energy is reflected by the polarization element 20 in the polarization device 13 of FIG. 1. Further, the absorption of the X-polarization component is very small in the polarization element 20 as can be seen in the transmittance of 90% or more for the X-polarization component in FIG. 4. Thus, the temperature rise of the polarization element 20 is successfully minimized without using a cooling mechanism.

Figure 6:
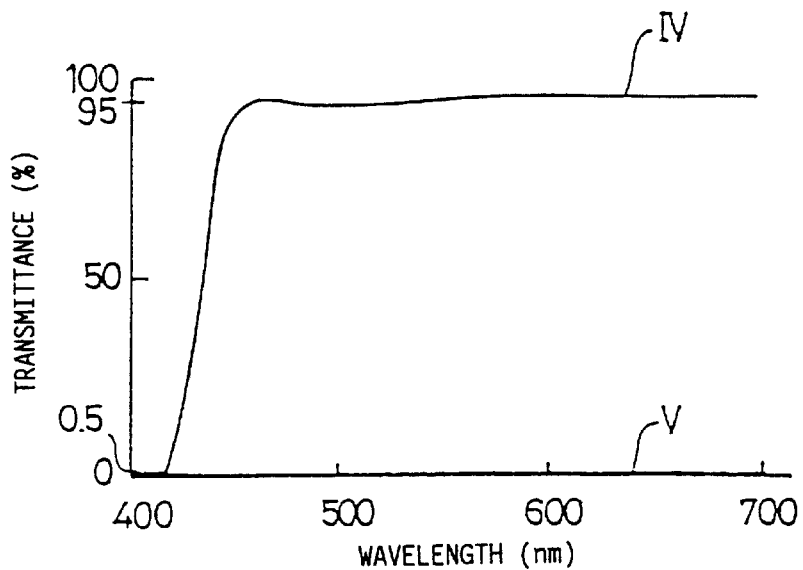
FIG. 6 is a diagram showing a transmittance of another polarization element used in the polarizer of FIGS. 2A and 2B.

FIG. 6 shows the transmittance of the polarization element 21 for the optical beam component having the X-polarization plane in comparison with the optical beam component having the Y-polarization plane.

Referring to FIG. 6, the polarization element 21, having the construction of an ordinary polarizer, shows a transmittance of as high as 95% for the X-polarization component and a transmittance of as low as 0.5% for the Y-polarization component. Thus, the polarization state of the optical beam 32, produced from the optical beam 12 as it passes through the polarization element 20, is further refined as the optical beam 32 passes through the polarization element 21. In other words, the optical beam 14 obtained at the exit side of the polarization element 21 has a sharply defined polarization plane in the X-direction.

It is noted that the polarization element 21 absorbs the Y-polarization component passed through the polarization element 20. However, the absorption does not cause any serious heating of the polarization element 21, as the energy of the Y-polarization component reaching the polarization element 21 after passing through the polarization element 20 is very small as clearly indicated in FIG. 4. In other words, the problem of a temperature rise of the polarizer 21 is also eliminated successfully in the polarization device 13 of FIG. 1.

Figure 7:
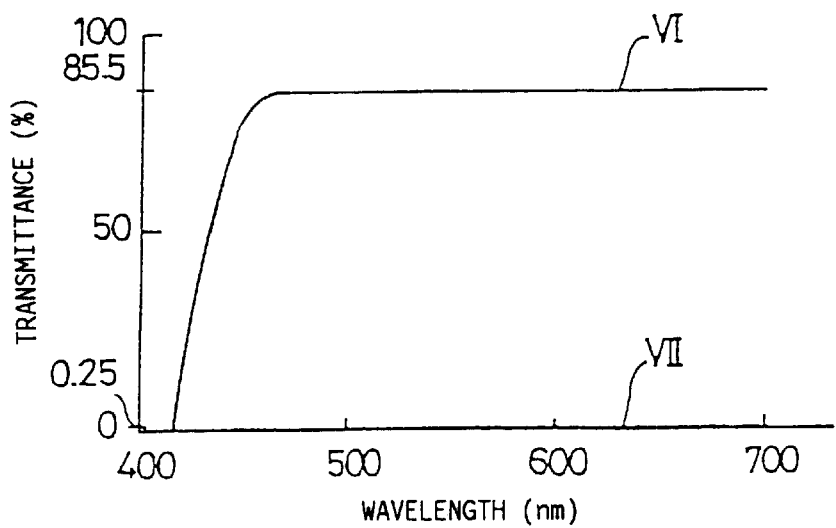
FIG. 7 is a diagram showing an overall transmittance of the polarizer of FIGS. 2A and 2B.

FIG. 7 shows the overall transmittance of the polarization device 13.

Referring to FIG. 7, it will be noted that the polarization device 13 shows a transmittance of as high as 85.5% for the X-polarization component and a transmittance of as low as 0.25% for the Y-polarization component. As already noted with reference to FIG. 5, most of the interrupted optical beam is reflected and the temperature rise of the polarization device 13 is successfully suppressed without using a cooling mechanism.

In the foregoing description, it is possible to change the X- and Y-directions without causing any change in the operation or function of the optical projector 60.

Figure 8A:
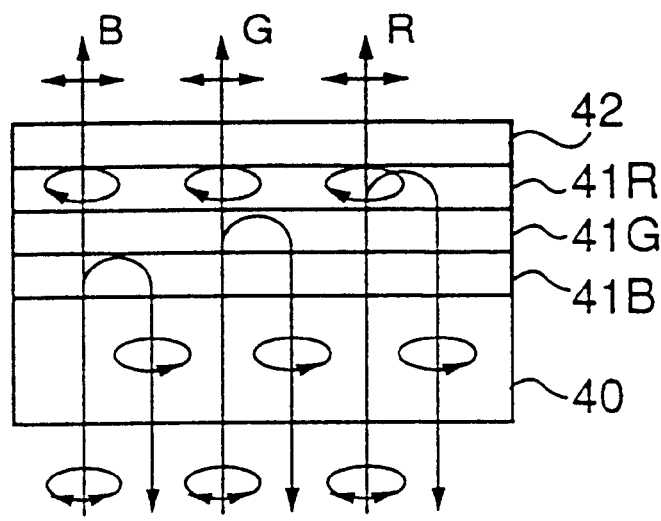
FIGS. 8A and 8B are diagrams showing a modification of the polarization element of FIGS. 2A and 2B.

FIG. 8A shows a more detailed construction of the first polarization element 20.

Referring to FIG. 8A, it should be noted that the polarization element 20 is constructed on the foregoing glass substrate 40 and includes a first cholesteric liquid crystal layer 41B that acts upon a blue component (B) of the optical beam incident to the glass substrate 40, wherein the liquid crystal layer 41B transmits therethrough only one of the circular polarization components in the incident optical beam, such as the left-rotation component, and reflects the other, right-rotation component. On the liquid crystal layer 41B, there is provided another cholesteric liquid crystal layer 41G that acts upon a green component (G) of the optical beam incident to the glass substrate 40 and passed through the liquid crystal layer 41B, wherein the liquid crystal layer 41G transmits therethrough only the left-rotation component and reflects the other, right-rotation component. On the liquid crystal layer 41G, there is provided another cholesteric liquid crystal layer 41R that acts upon a red component (R) of the optical beam incident to the glass substrate 40 and passed successively through the liquid crystal layers 41B and 41G, wherein the liquid crystal layer 41R transmits therethrough only the left-rotation component and reflects the other, right-rotation component.

On the cholesteric liquid crystal layer 41R, there is provided a quarter-wavelength plate 42 that converts the circularly polarized R, G and B components passed through the layers 41B–41R consecutively, into linearly polarized R, G and B components.

Figure 8B:
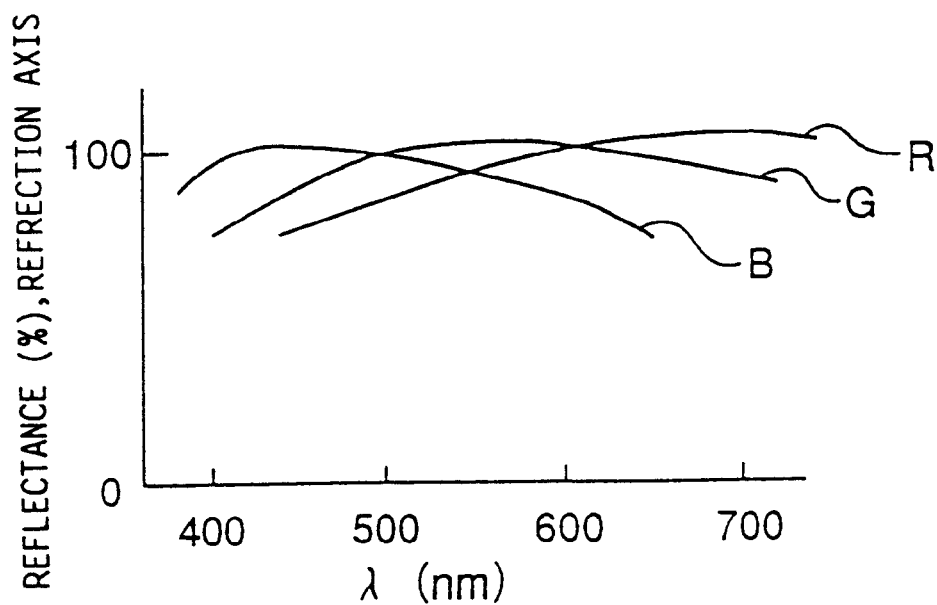

FIG. 8B shows the reflectance of the foregoing liquid crystal layers 41B, 41G and 41R for various wavelengths, wherein the curve designated by "B" corresponds to the liquid crystal layer 41B, the curve designated by "G" corresponds to the liquid crystal layer 41G and the curve designated by "R" corresponds to the liquid crystal layer 41R.

Referring to FIG. 8B, it will be noted that each of the liquid crystal layers shows a reflectance of almost 100% in a wavelength range corresponding thereto. See also FIG. 6. This means, that it is possible to construct an optical element that is capable of eliminating the right-rotation component almost completely from an incident optical beam by a reflection, at least in the range of 400–700 nm, by merely stacking the liquid crystal layers 41B, 41G and 41R as indicated in FIG. 8A.

Figure 9A:
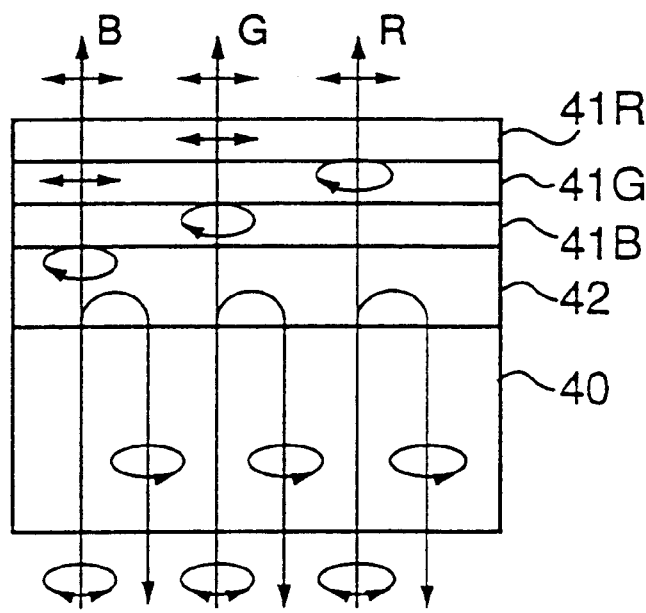
FIGS. 9A and 9B are diagrams showing a further modification of the polarization element of FIGS. 2A and 2B.

FIG. 9A shows a polarization element $20_1$ according to a modification of the polarization element 20 of FIG. 8A.

Referring to FIG. 9A, it should be noted that the polarization element $20_1$ includes the quarter wavelength plate 42 between the glass substrate 40 and the cholesteric liquid crystal layer 41B, such that the optical beam incident to the bottom surface of the glass substrate 40 first experiences a rotation of the polarization plane by the quarter wavelength plate 42, before impinging into the liquid crystal layer 41B.

By constructing the polarization element $20_1$ in this way, the right-rotation component in the incident optical beam is reflected, while the B (blue) component forming a part of the left-rotation component of the incident optical beam is converted into a linearly polarized beam. The linearly polarized B component beam thus formed then passes through the layers 41G and 41R consecutively.

Similarly, the liquid crystal layer 41G converts the G (green) component forming a part of the left-rotation component of the incident optical beam and passed through the liquid crystal layer 41B, into a linearly polarized beam. Further, the liquid crystal layer 41R converts the R (red) component forming a part of the left-rotation component of the incident optical beam and passed consecutively through the liquid crystal layers 41B and 41G, into a linearly polarized beam.

Figure 9B:
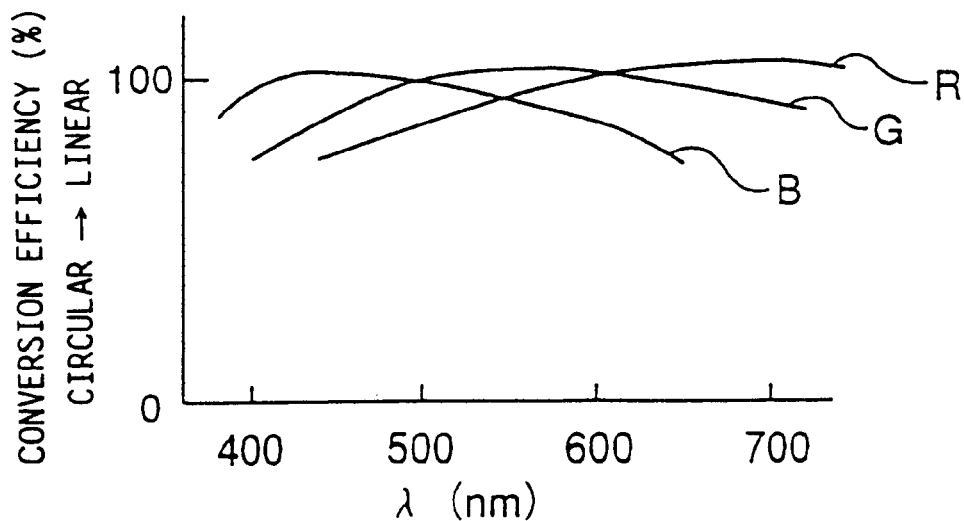

FIG. 9B shows the efficiency of conversion of the circularly polarized beam into a linearly polarized beam in each of the liquid crystal layers 41B–41R for various wavelengths.

Referring to FIG. 9B, it will be noted that each of the liquid crystal layers 41B–41R shows a conversion efficiency of almost 100% in the wavelength range corresponding thereto. In other words, the polarization element $20_1$ not only reflects the right-rotation component included in the incident natural optical beam with an almost 100% reflectance, but is also capable of converting the left-rotation component in the incident optical beam into a desired linearly polarized beam with efficiency.

Figure 10:
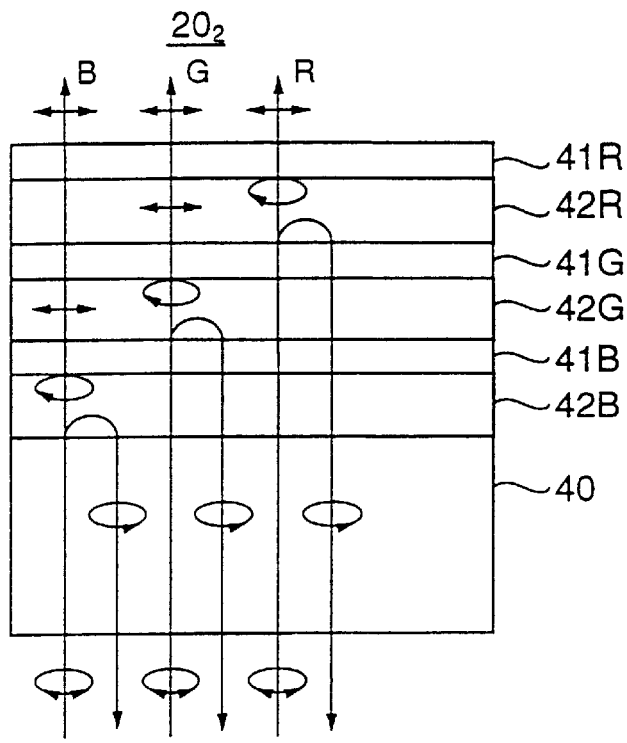
FIG. 10 is a diagram showing a further modification of the polarization element of FIGS. 2A and 2B.

FIG. 10 shows the construction of a polarization element $20_2$ according to another modification.

Referring to FIG. 10, it will be noted that the polarization element $20_2$ includes a stack of the liquid crystal layers 41B–41R on the glass substrate 40 similarly as before, wherein it should be noted that the foregoing stack further includes a quarter-wavelength plate 42B between the substrate 40 and the liquid crystal layer 41B for rotating the polarization plane of the B (blue) component beam. Similarly, a quarter-wavelength plate 42G is provided between the liquid crystal layer 41B and the liquid crystal layer 41G for rotating the polarization plane of the G (green) component beam, and another quarter-wavelength plate 42R is provided between the liquid crystal layer 41G and the liquid crystal layer 41R for rotating the polarization plane of the R (red) component beam.

It should be noted that the construction of FIG. 10, too, is effective for reflecting the unnecessary right-rotation component and obtaining a desired linearly polarized beam from the left-rotation component, for each of the R, G and B color components.

In the foregoing description, it should be noted that a similar explanation holds when the left-rotation component is reflected and the right-rotation component is transmitted.

Figure 11:
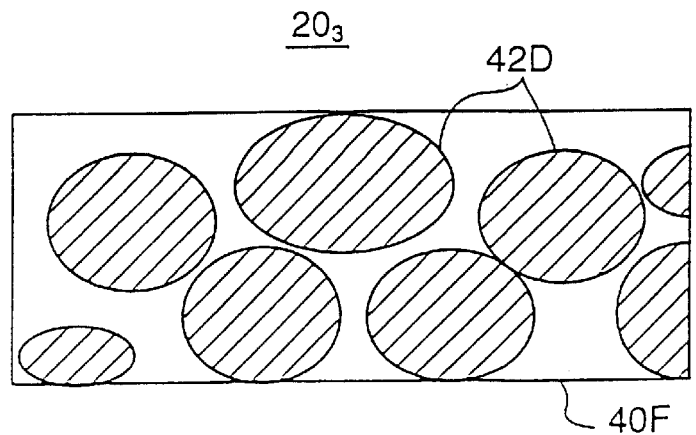
FIG. 11 is a diagram showing a further modification of the polarization element of FIGS. 2A and 2B.

FIG. 11 shows the construction of a further polarization element $20_3$.

Referring to FIG. 11, the glass substrate 40 used in the previous polarization element 20 or $20_1$–$20_2$ is eliminated, and droplets 42D of a cholesteric liquid crystal are dispersed in a resin matrix 40F. The polarization element $20_3$, too, is effective for selectively passing one of the right- and left-rotation polarization components while reflecting the other rotation polarization component. As the polarization element $20_3$ is flexible, the polarization element $20_3$ can be adhered on other optical element, as will be explained later with reference to other embodiments.

SECOND EMBODIMENT

Figure 12:
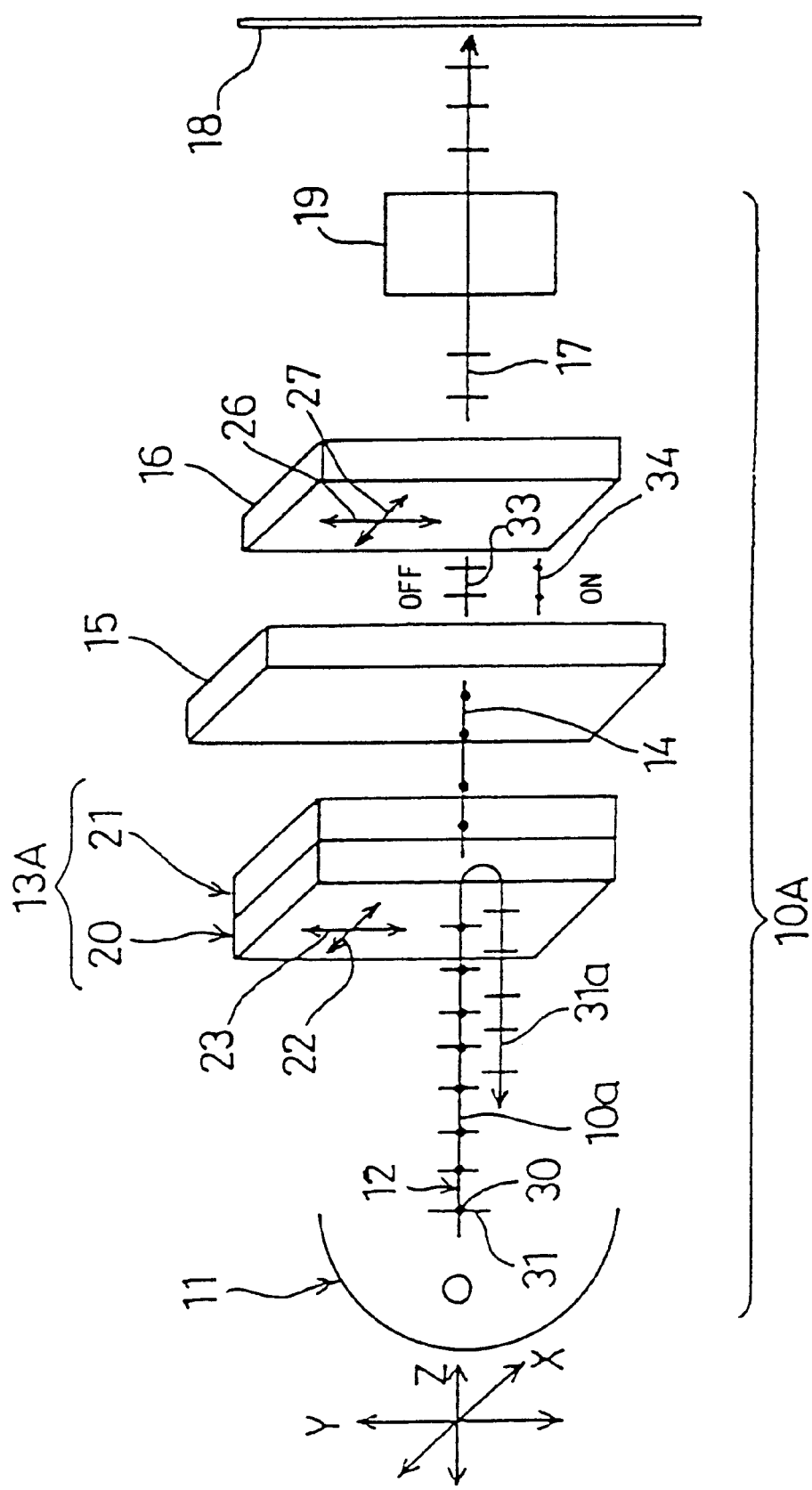
FIG. 12 is a diagram showing the construction of an optical projector according to a second embodiment of the present invention.

FIG. 12 shows the construction of an optical projector 10A according to a second embodiment of the present invention, wherein those parts described previously are designated by the same reference numerals and the description thereof will be omitted.

Referring to FIG. 12, the optical projector 10A includes a polarization device 13A in place of the polarization device 13 in which the polarization elements 20 and 21 are adhered to each other by means of an adhesive such as an acrylic ester copolymer. Further, the polarization device 13A itself is adhered upon the light valve 15 also by an adhesive such as the foregoing acrylic ester copolymer. In the illustration of FIG. 12, although the light valve 15 and the polarization elements 20 and 21 are indicated separately, this is merely for the sake of ease of recognition of the drawing.

By constructing the polarization device 13A including the elements 20 and 21 to be integral with the light valve 15 as such, it is possible to eliminate an optical loss of as much as about 4% caused by the reflection of the X-component beam from the exposed surface of the light valve 15 at the side facing the optical element 21 or the optical loss of 2–4% caused by the reflection of the X-component beam from the exposed surface of the element 21 at the side facing the light valve 15. Thus, the optical projector 10A of FIG. 12 provides an improved luminance of the image on the screen 18.

Further, by providing the polarization element 21, which typically has a form of a thin flexible film, directly on the surface of the liquid crystal panel 50 forming the light valve 15, it is possible to provide a rigid support to the flexible polarization element 21 without using an extra glass substrate for carrying the polarization film 21.

THIRD EMBODIMENT

Figure 13:
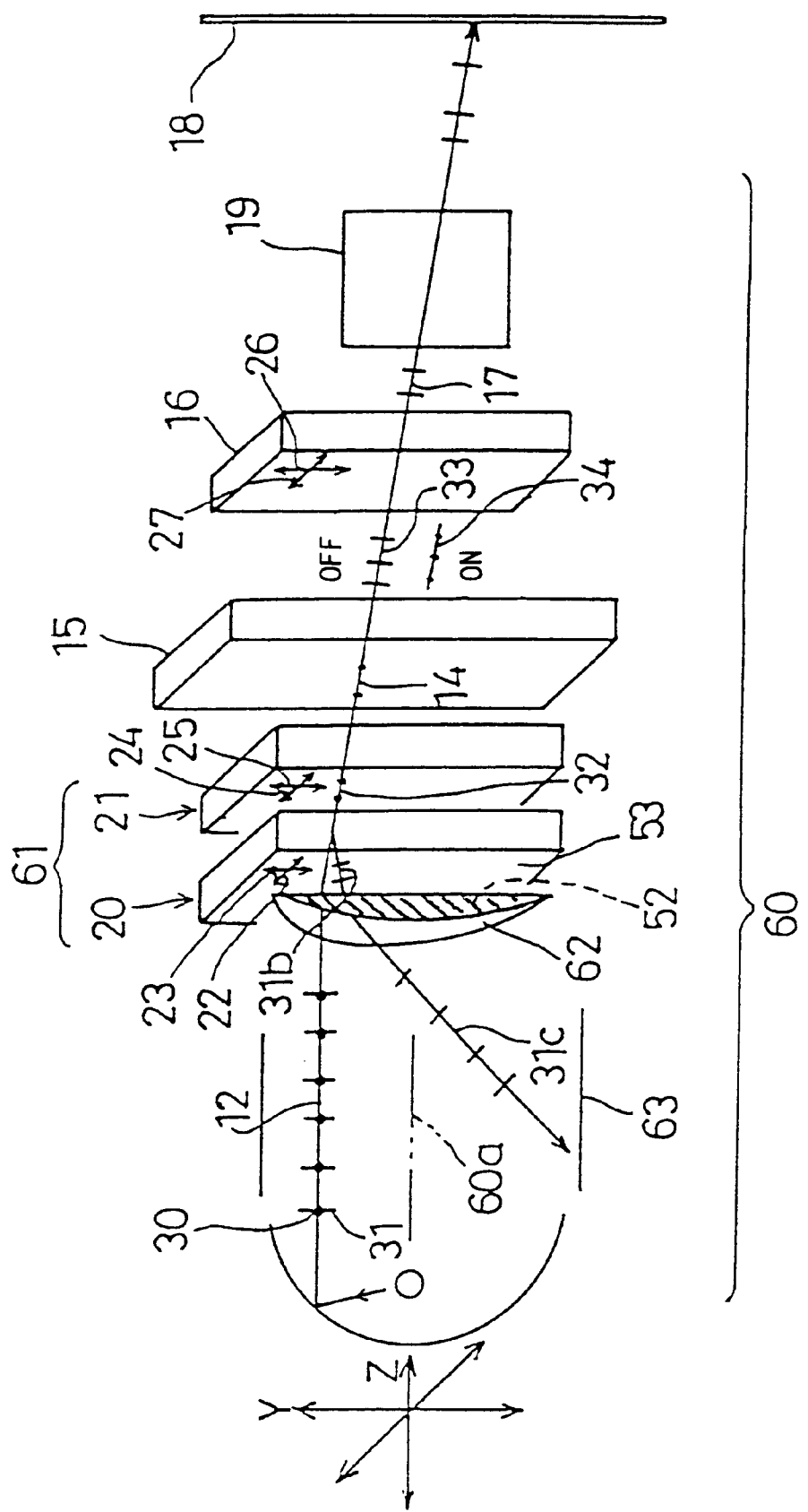
FIG. 13 is a diagram showing the construction of an optical projector according to a third embodiment of the present invention.

FIG. 13 shows the construction of an optical projector 60 according to a third embodiment of the a present invention, wherein those parts corresponding to the parts described previously are designated by the same reference numerals and the description thereof will be omitted.

Referring to FIG. 13, the optical projector 60 includes a polarization device 61 in place of the polarization device 13 of FIG. 1, wherein the polarization device 61 includes, in addition to the first polarization element 20 and the second polarization element 21 described already, a plano-convex condenser lens 62 having an optical axis 60a aligned substantially coincident with the optical path of the optical beam 12 incident to the polarization device 61 from the optical source 11. It will be seen in FIG. 13 that the convex side of the lens 62 faces the optical source 11.

By providing the condenser lens 62, the optical beam 12 is focused over the projection lens 19. Further, as the optical beam impinges, after a refraction in the condenser lens 62, obliquely to the polarization element 20, a Y-component optical beam 31b produced as a result of reflection of the optical beam 12 and having the polarization plane 31, is deflected, upon passage through the condenser lens 62 for the second time, in a direction away from the halogen lamp 11 toward an optical shield plate 63 as an optical beam 31c. Thereby, the problem of excessive temperature rise of the high-power halogen lamp 11 caused by the optical beam 31c returning from the polarization element 20 is successfully eliminated and the lifetime of the high-power halogen lamp is increased substantially.

FOURTH EMBODIMENT

Figure 14:
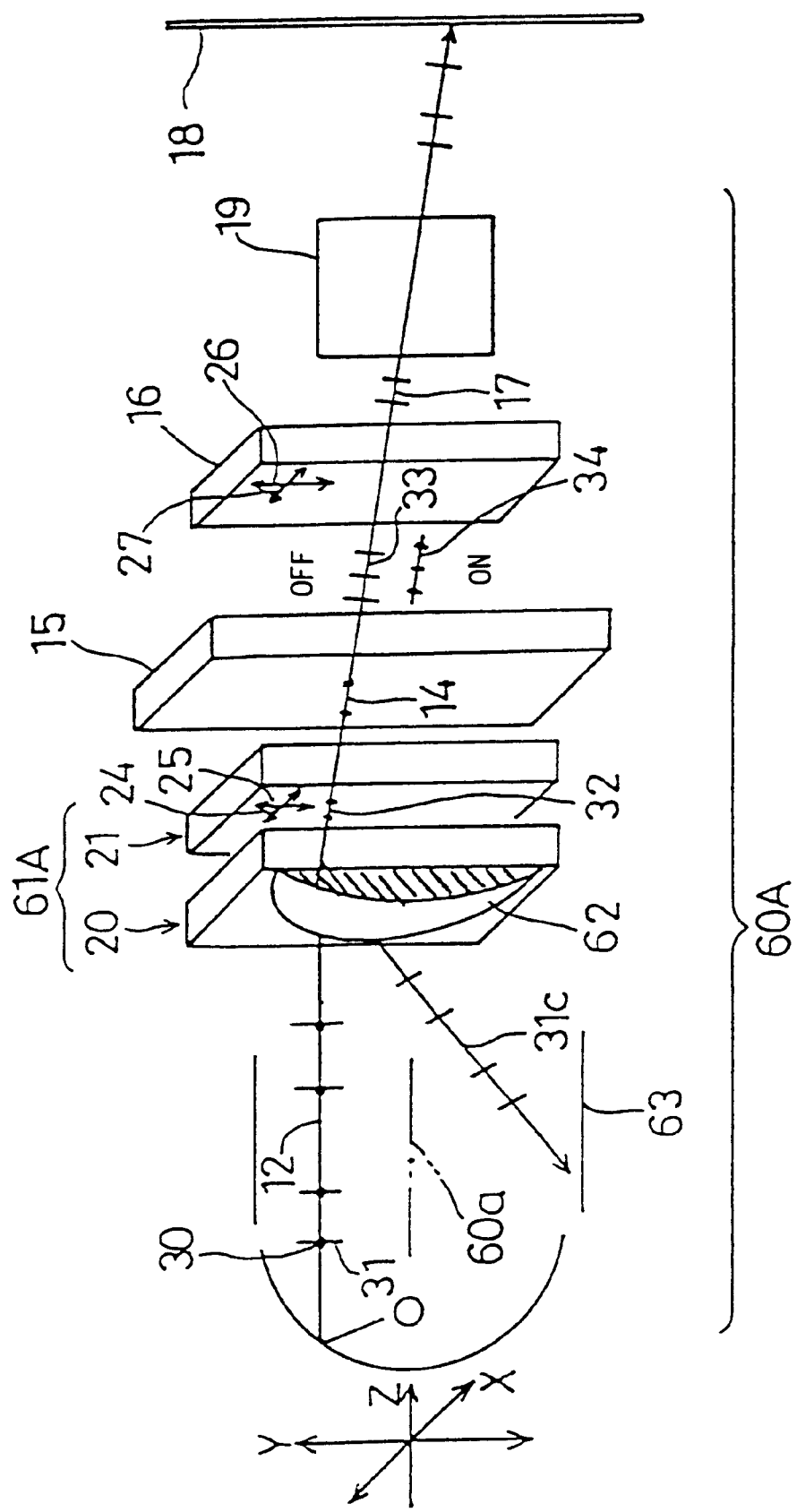
FIG. 14 is a diagram showing the construction of an optical projector according to a fourth embodiment of the present invention.

FIG. 14 shows an optical projector 60A according to a fourth embodiment of the present invention, wherein those parts described previously are designated by the same reference numerals and the description thereof will be omitted.

In the present embodiment, a polarization device 61A is used in place of the foregoing polarization device 61A, wherein it should be noted that the polarization device 61A includes the polarization elements 20 and 21 attached to each other by an adhesive to form an integral body of the polarization device 61A, and the polarization element 21 forming the integral polarization device 61A is attached to the light valve 15 similarly to the embodiment of FIG. 12. Thereby, the polarization device 61A and the light valve 15 form together an integral body. In the illustration of FIG. 14, although the light valve 15 and the polarization elements 20 and 21 are illustrated separately, this is merely for the sake of ease of visual recognition of the drawing.

Further, the condenser lens 62 is attached to the exposed surface of the polarization element 20 by an adhesive. Thereby, the optical loss of as much as about 4%, caused by the reflection of the optical beam 12 at an exposed surface 52 of the lens 62 at the side facing the polarization element 20 in the construction of FIG. 13, is successfully eliminated, in addition to the elimination of the optical loss explained with reference to the embodiment of FIG. 12.

Further, the use of the lens 62 provides an beneficial effect of rigidly supporting the polarization element 20 without using a support substrate. Thus, it is possible to form the polarization element 20 in the form of a thin flexible film.

FIFTH EMBODIMENT

Figure 15:
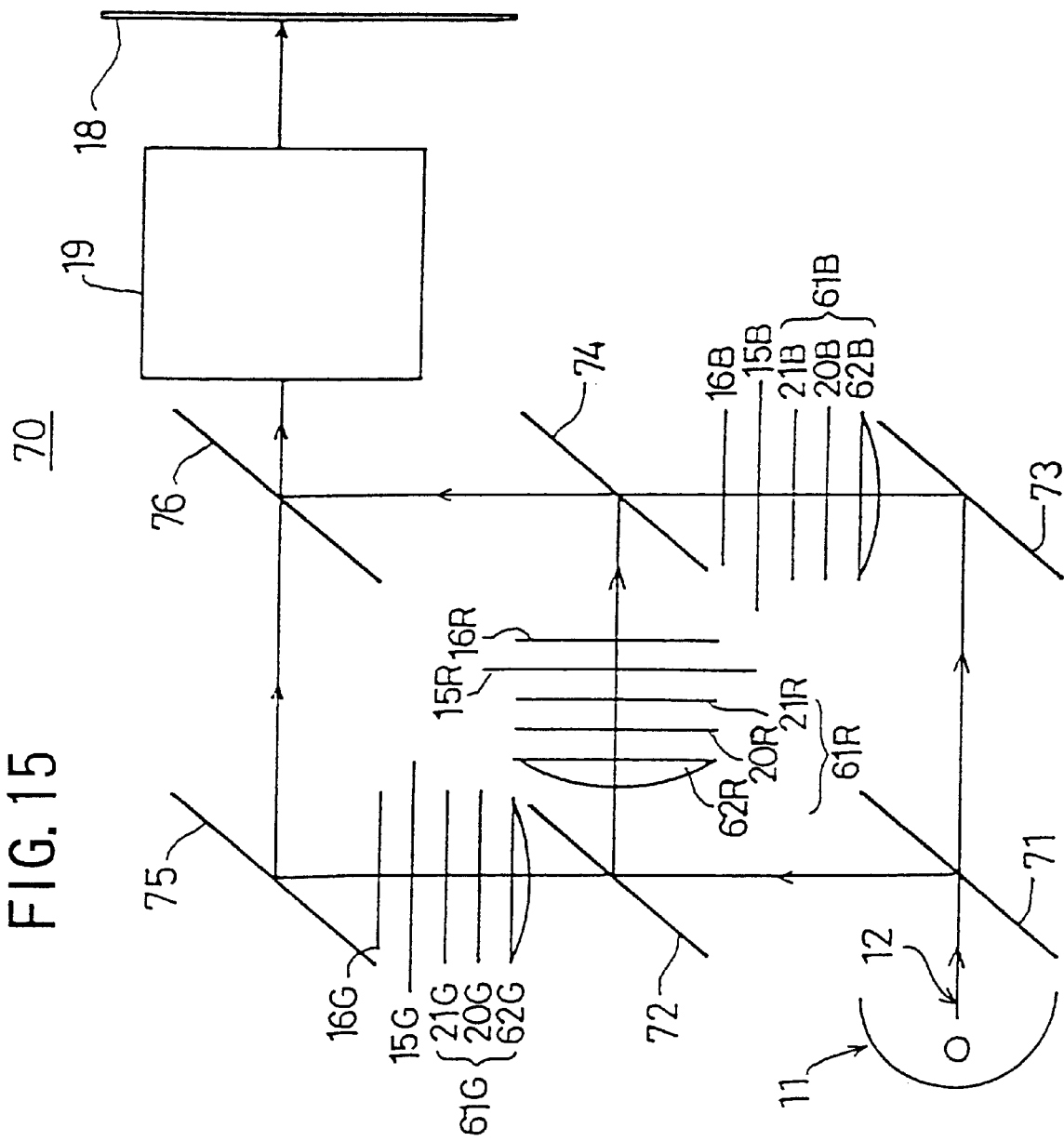
FIG. 15 is a diagram showing the construction of an optical projector according to a fifth embodiment of the present invention.

FIG. 15 shows the construction of a color optical projector 70 according to a fifth embodiment of the present invention, wherein those parts described previously are designated by the same reference numerals and the description thereof will be omitted.

Referring to FIG. 15, the optical projector 70 includes a first dichroic mirror 71 disposed in the path of the optical beam 12 exiting the optical source 11, wherein the first dichroic mirror 71 reflects the optical beam incident thereto except for a blue component having a wavelength of about 500 nm or less. In other words, the dichroic mirror 71 acts as a blue optical filter for extracting a blue component B from the incident optical beam 12 while reflecting the optical components of longer wavelengths.

On the path of the optical beam thus reflected by the dichroic mirror 71, there is provided a second dichroic mirror 72 that reflects the optical beam component having a wavelength of about 600 nm or longer. Thereby, the dichroic mirror 72 acts as an optical filter for extracting a red component R from the optical beam 12. The dichroic mirror 72 thereby allows a green component G to pass therethrough.

The blue component B passed through the dichroic mirror 71 is deflected by a mirror 73 and is directed to a light valve 15B after passing through a polarization device 61B having a construction similar to the polarization device 61 of FIG. 13 or 61A of FIG. 14. Thus, the polarization device 61B includes a condenser lens 62B corresponding to the condenser lens 62, a polarization element 20B corresponding to the polarization element 20 and another polarization element 21B corresponding to the polarization element 21.

After passing through the polarization device 61B, the blue component beam B passes through the light valve 15B corresponding to the light valve 15 and further an analyzer 16B corresponding to the analyzer 16, and the blue component beam B thus modulated spatially reaches a dichroic mirror 76 after passing through a dichroic mirror 74 that allows the blue component beam B to pass therethrough. The dichroic mirror 76 then deflects the blue component beam B reached thereto to the projector lens 19 and further toward the screen 18.

On the other hand, the dichroic mirror 72 reflects the red component beam R included in the incident optical beam and having a wavelength of about 600 nm or longer while passing therethrough the green component beam G having a wavelength between about 500 and 600 nm as mentioned already. The red component beam R is then passed through a polarizer device 61R corresponding to the polarizer device 61 or 61A described already and further through a light valve 15R and an analyzer 16R also corresponding to the light valve 15 and the analyzer 16 respectively. The red component beam R is thus deflected after the spatial modulation to the projection lens 19 and further toward the screen 19 via the dichroic mirrors 74 and 76.

Further, the green component G passed through the dichroic mirror 72 is passed further through a polarization device 61G corresponding to the polarization device 61 or 61A and enters into a light valve 15G corresponding to the light valve 15. After being modulated spatially in the light valve 15G, the green component beam G is passed through an analyzer 16G corresponding to the analyzer 16 and is deflected to the dichroic mirror 76 by a mirror 75. The dichroic mirror 76 thereby causes the green component beam G to pass therethrough and the green component beam G is supplied to the projection lens 19 and further to the screen 18. As a result of synthesis of the three primary color beams R, G and B, a color image is reproduced on the screen 18.

In the construction of the full-color optical projector 70 of FIG. 15, the luminance of the incident optical beam on each of the polarization elements 21R, 21G and 21B is reduced to one-third the luminance in the case of a monochromatic projector such as the projector 10 of FIG. 1. By using the polarization element 20 for the polarization elements 20R, 20G and 20B in such a full-color projector, the problem of temperature rise of the polarizer 21 is substantially eliminated.

In the full-color projector 70, it is of course possible to use the polarization device 13 of FIG. 1 for the polarization devices 61R, 61G and 61B.

SIXTH EMBODIMENT

Figure 16:
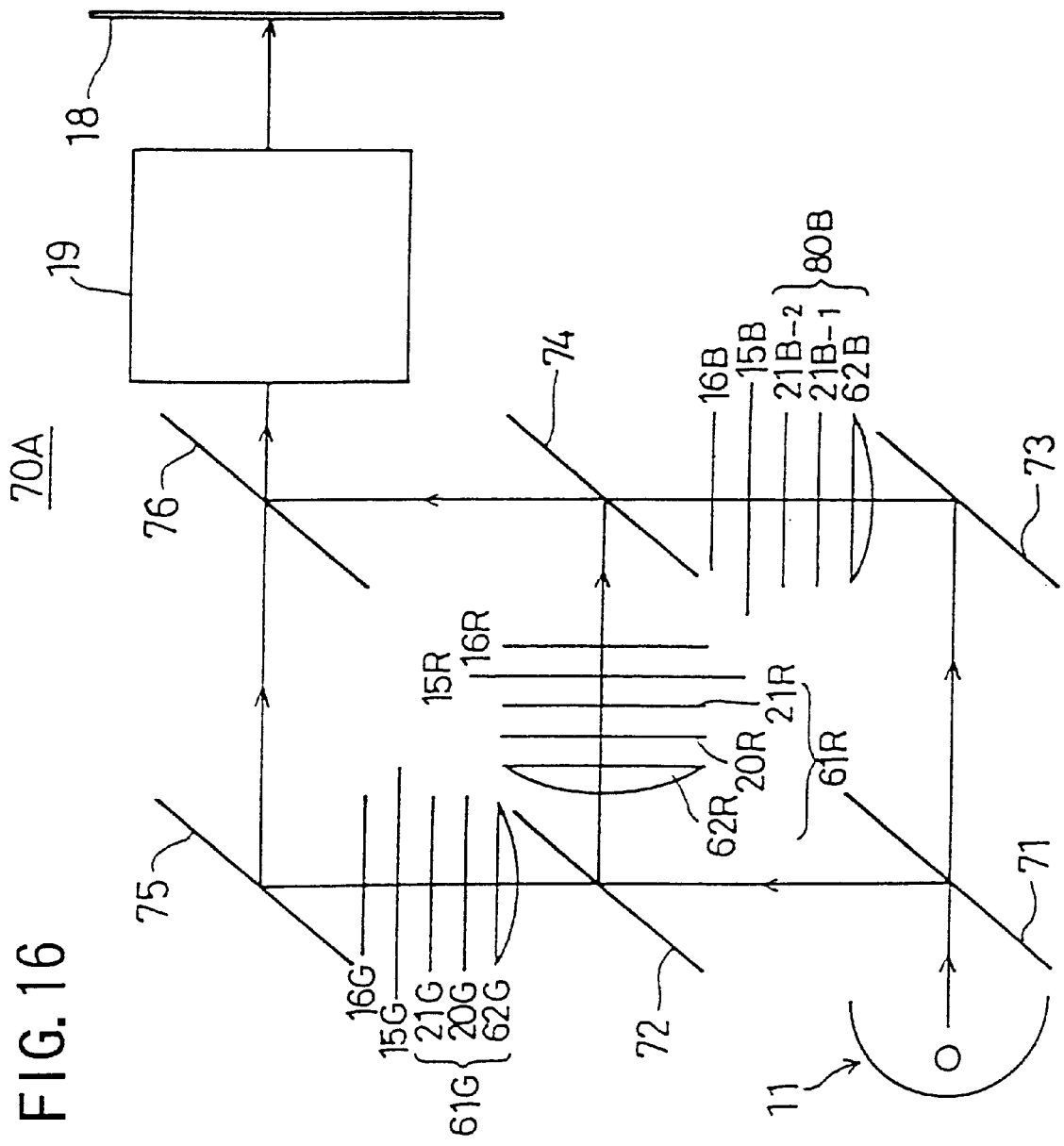
FIG. 16 is a diagram showing the construction of an optical projector according to a sixth embodiment of the present invention.

FIG. 16 shows the construction of a full-color optical projector 70A according to a sixth embodiment of the present invention, wherein those parts corresponding to the parts described previously are designated by the same reference numerals and the description thereof will be omitted.

Figure 17:
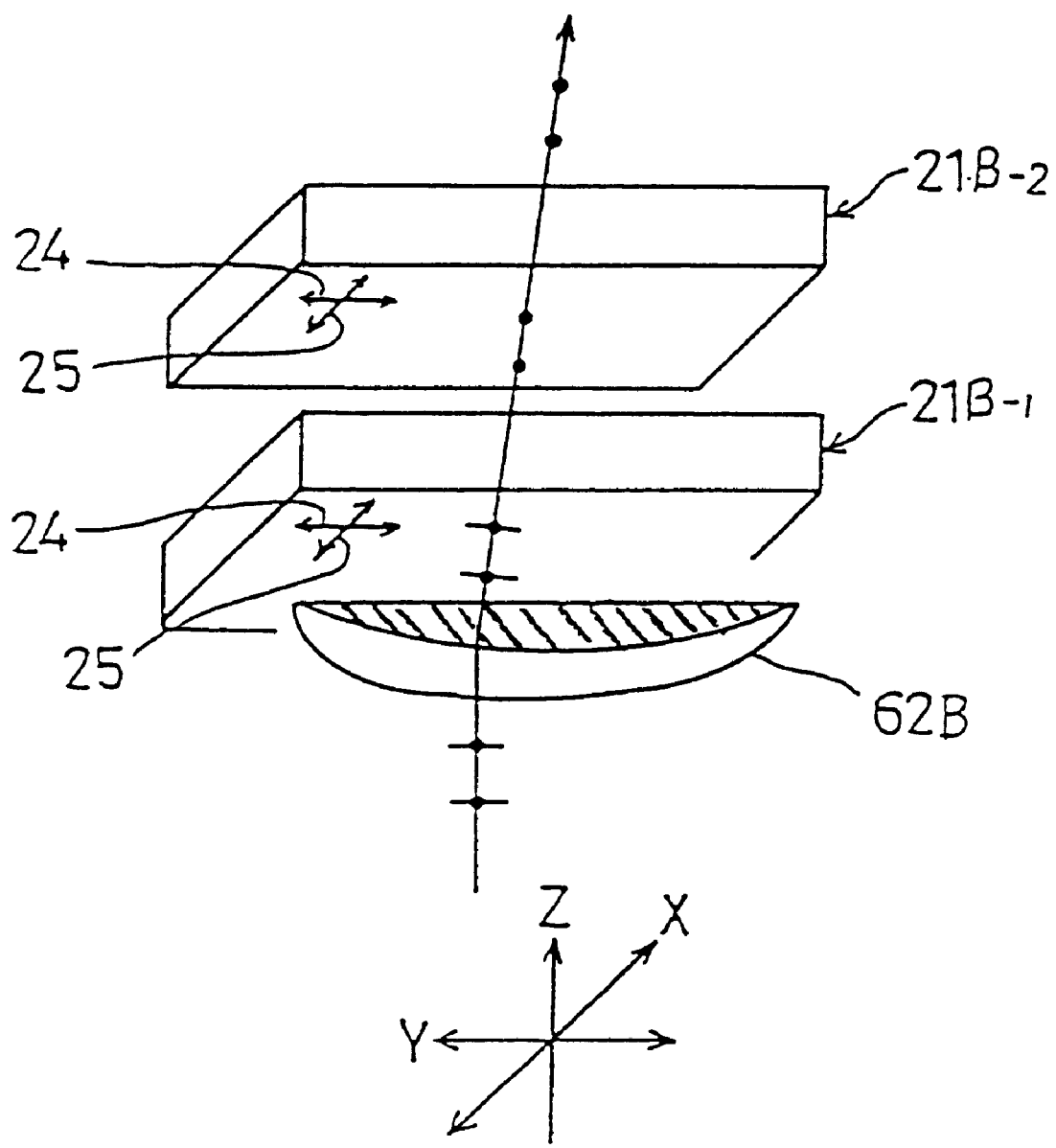
FIG. 17 is a diagram showing the construction of a polarizer used in the optical projector of FIG. 16 in detail.

Referring to FIG. 16, the optical projector 70A includes, in the optical path for the blue beam component B, a polarization device 80B shown in detail in FIG. 17 in place of the polarization device 61B, wherein it will be noted that the polarization device 80B includes, in addition to the condenser lens 62B, an absorption-type polarization film $21B_{-1}$ having an absorption axis in the direction 24 and another absorption-type polarization film $21B_{-2}$ also having an absorption axis in the direction 24, such that the polarization film $21B_{-2}$ is disposed behind the polarization film $21B_{-1}$.

Figure 18:
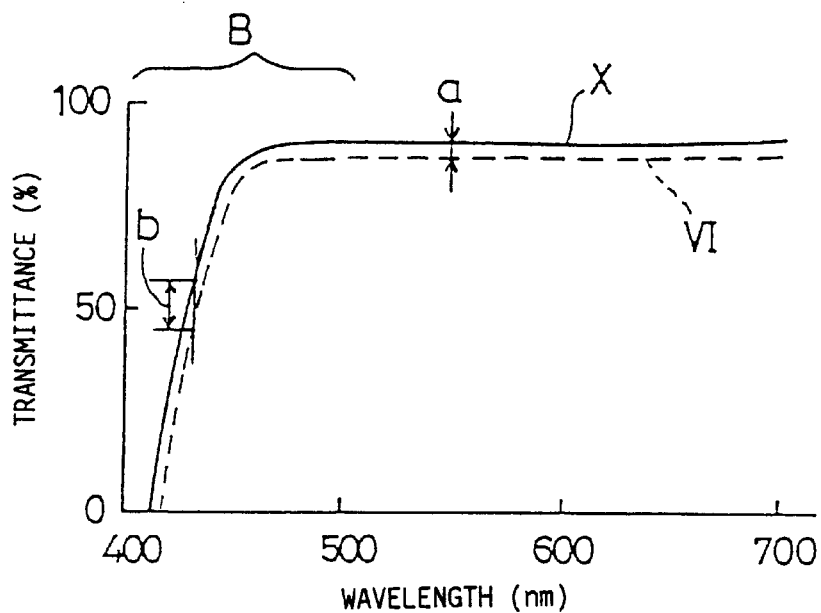
FIG. 18 is a diagram showing a transmittance of the polarizer of FIG. 17.

FIG. 18 shows the transmittance of the polarization device 80B of FIG. 17 in comparison with the transmittance of the polarization device 13 shown in FIG. 7, wherein the transmittance of the polarization device 80B is represented by a curve X while the transmittance of the polarization device 13 is represented by the curve VI.

Referring to FIG. 18, it should be noted that the curve X is a square of the curve IV of FIG. 6 for the absorption-type polarization element 21 and that the transmittance of the polarization device 80B is higher than the transmittance of the polarization device 13 or 51 by a% in the wavelength range exceeding 500 nm and by b% in the wavelength range below about 500 nm, wherein b is larger than a (b>a). This is due to the fact that the transmittance of the absorption-type polarization element represented by the curve IV in FIG. 6 is larger than the transmittance of the reflection-type polarization element represented by the curve I as indicated in FIG. 19, wherein it should be noted that the difference between the curve IV and the curve I increases in the wavelength range below about 500 nm for the blue color beam B.

Figure 19:
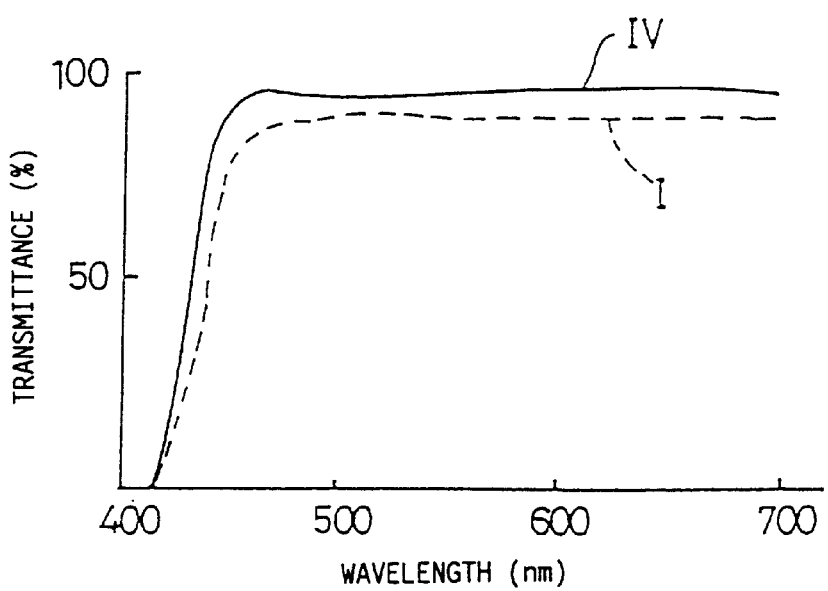
FIG. 19 is a diagram showing an overall transmittance of the polarizer of FIG. 17 in comparison with the transmittance of FIG. 6.

The results of FIGS. 18 and 19 indicate that the transmittance of the polarization device 80B for the blue color beam B is slightly larger than the corresponding transmittance of the polarization device 13 or 61B that includes a reflection-type polarization element. Thus, the optical projector of FIG. 16 provides a slightly brighter representation of the images on the screen 18 for the blue color component B.

Of course, it is possible to use a polarization device having the construction identical to the polarization device 61R or 61B for the polarization device 80B. In this case, the cooling mechanism, which may be used in combination with the polarization device 80B, can be omitted. Further, it is possible to replace the other polarization device 61R or 61G by a polarization device having the construction of the polarization device 80B. When the polarization device 61R is replaced by the polarization device 80B, a slightly brighter representation of the projected image is obtained on the screen 18 for the red color component R. When the polarization device 61G is replaced by the polarization device 80B, on the other hand, a slightly brighter representation of the projected image is obtained on the screen 18 for the green color component G.

As an absorption-type polarization device provides a higher quality of polarization than a reflection-type polarization device, the present invention uses the absorption-type polarization element 21 behind the reflection-type polarization element 20 in the polarization device 13 or the polarization devices 61G and 61R of FIG. 16 such that the quality of polarization of the output polarized optical beam obtained by the polarization device is improved further.

Further, it is possible to use the absorption-type polarization element 21 for a color component of a reduced light amount such as the blue component (B) in the color optical projector, while using the reflection-type polarization element and the absorption-type polarization element aligned consecutively in the optical path for the color components of a large light amount. By doing so, the contrast of the projected image is improved.

SEVENTH EMBODIMENT

Figure 20:
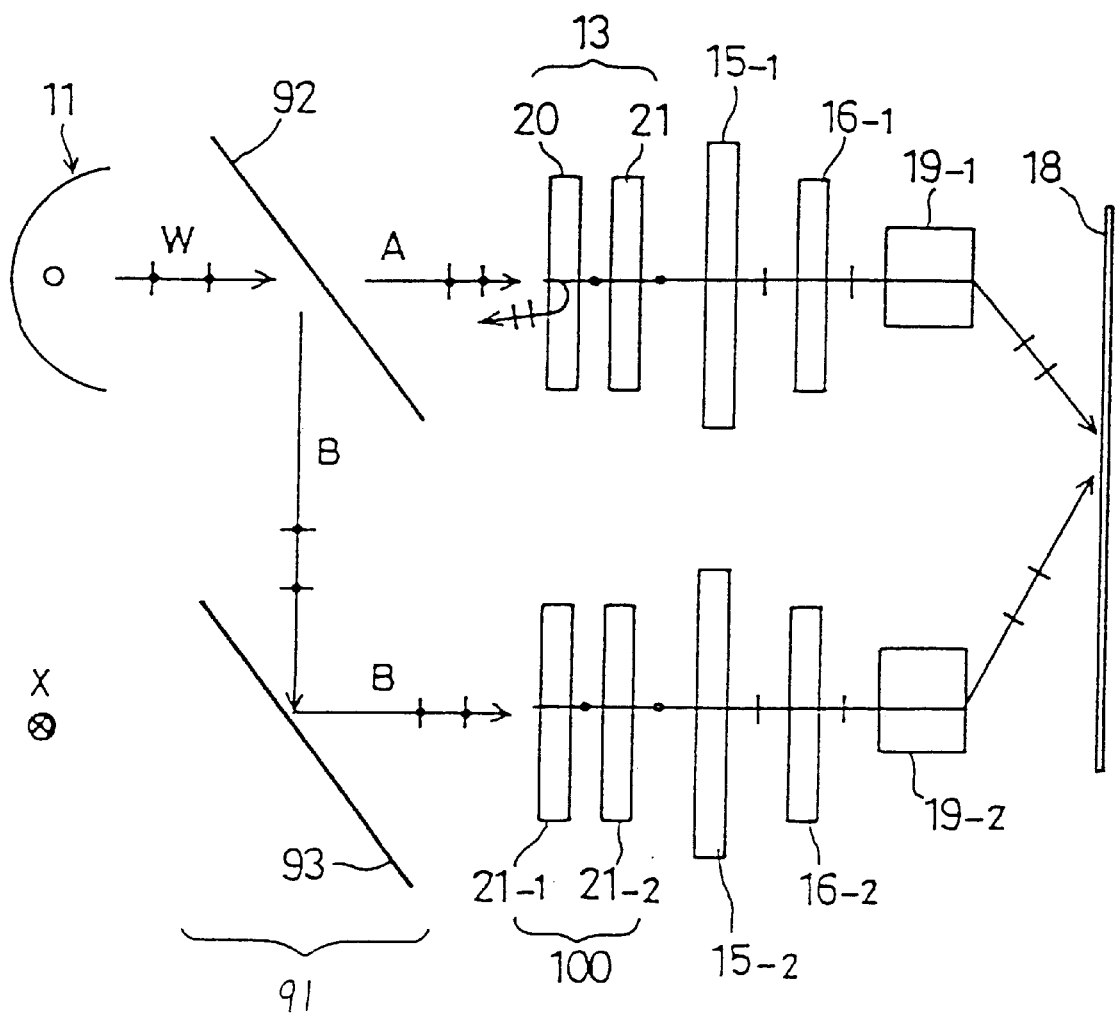
FIG. 20 is a diagram showing the construction of an optical projector according to a seventh embodiment of the present invention.

FIG. 20 shows the construction of an optical projector 90 according to a seventh embodiment of the present invention, wherein those parts of FIG. 20 corresponding to the parts described previously are designated by the same reference numerals and the description thereof will be omitted.

Referring to FIG. 20, the optical projector 90 includes, in addition to the metal halide lamp 11 of 350 W, dichroic mirrors 92 and 93 forming a color separation system 91 separating the optical beam produced by the metal halide lamp 11 into respective color beams A and B, wherein the polarization device is provided on each of the paths of the color optical beams A and B. On the path of the beam A, the polarization device 13 is provided, while the polarization device 100 is provided on the path of the beam B.

The polarization device 13 includes the reflection-type polarization element 20 and the absorption-type polarization element 21 similarly as before and reflects back the polarization components other than the one having a desired, predetermined polarization plane. The optical beam thus polarized by the polarization device 13 is then passed through a liquid crystal panel $15_{-1}$ and an analyzer $16_{-1}$ for a spatial modulation, and the modulated optical beam thus obtained is projected on the screen 18 by a first projection optical system $19_{-1}$.

On the other hand, there is provided a polarization device 100 on the optical path of the optical beam B reflected by the mirror 93, wherein the polarization device 100 is formed of two absorption-type polarization elements $21_{-1}$ and $21_{-2}$ disposed on the optical path in optical alignment with respect to the transmission axes thereof. The polarization device 100 shows the transmission characteristic as indicated in FIG. 18 by the curve X.

The polarization beam thus produced by the polarization device 100 is then caused to pass through a liquid crystal panel $15_{-2}$ and a corresponding analyzer $16_{-2}$ for spatial modulation, and the optical beam thus modulated spatially is focused on the screen 18 by a projection optical system $19_{-2}$.

In the construction of FIG. 20, it should be noted the dichroic mirror 92 produces the optical beam B to be polarized by the polarization device 100 such that the optical beam B has a wavelength in the range exceeding 600 nm. Thereby, both of the polarization elements $21_{-1}$ and $21_{-2}$ absorb the unnecessary polarization components, and the polarization elements $21_{-1}$ and $21_{-2}$ experience a temperature rise as a result of the optical energy thus absorbed.

It should be noted, however, that the amount of light or optical energy of the optical beam B is merely one-third the total optical energy of the optical beams A and B for the wavelength range of 400–700 nm, wherein only one half the optical energy of the optical beam B is absorbed by the polarization elements $21_{-1}$ and $21_{-2}$. As both of the polarization elements $21_{-1}$ and $21_{-2}$ absorb the optical energy, the optical energy that is absorbed by the polarization element $21_{-1}$ or $21_{-2}$ is merely one-twelfth of the total optical energy of the optical beam emitted by the metal halide lamp 11. Thus, the optical beam B corresponding to the blue optical beam B does not cause a serious thermal problem even when the absorption-type polarization device 100 is used for the polarization.

As noted already with reference to FIGS. 18 and 19, a polarization device formed of a combination of a reflection-type polarization element and an absorption-type polarization element, such as the polarization device 13, shows a transmittance of about 77% for the polarization component having the desired polarization plane, assuming that the reflection-type polarization component has a transmittance of about 85% and the absorption-type polarization component has a transmittance of about 90%. On the other hand, when a polarization device formed exclusively of absorption-type polarization elements such as the polarization device 100 is used, a transmittance of as much as 81% is achieved for the optical beam of the desired polarization plane in view of the transmittance of about 90% for each of the absorption-type polarization elements.

By using the polarization device 100 in combination with the polarization device 13 such that the polarization device 100 processes the optical beam component of small optical energy and such that the polarization device 13 processes the optical beam component of large optical energy, it is possible to improve the luminance and hence the visibility of the images projected by the optical projector 90.

Further, the use of the absorption-type polarization device 100 in the optical projector 90 is not limited to the polarization of the blue optical beam but the polarization device 100 may be used anywhere where there is room for the cooling mechanism. In this case, the reflection-type polarization device 13 is used in the site where there is no available space for the cooling mechanism.

EIGHTH EMBODIMENT

Next, an optical projector according to an eighth embodiment of the present invention will be described with reference to FIGS. 21A and 21B, wherein those parts corresponding to the parts described previously are designated by the same reference numerals and the description thereof will be omitted.

Figure 21A:
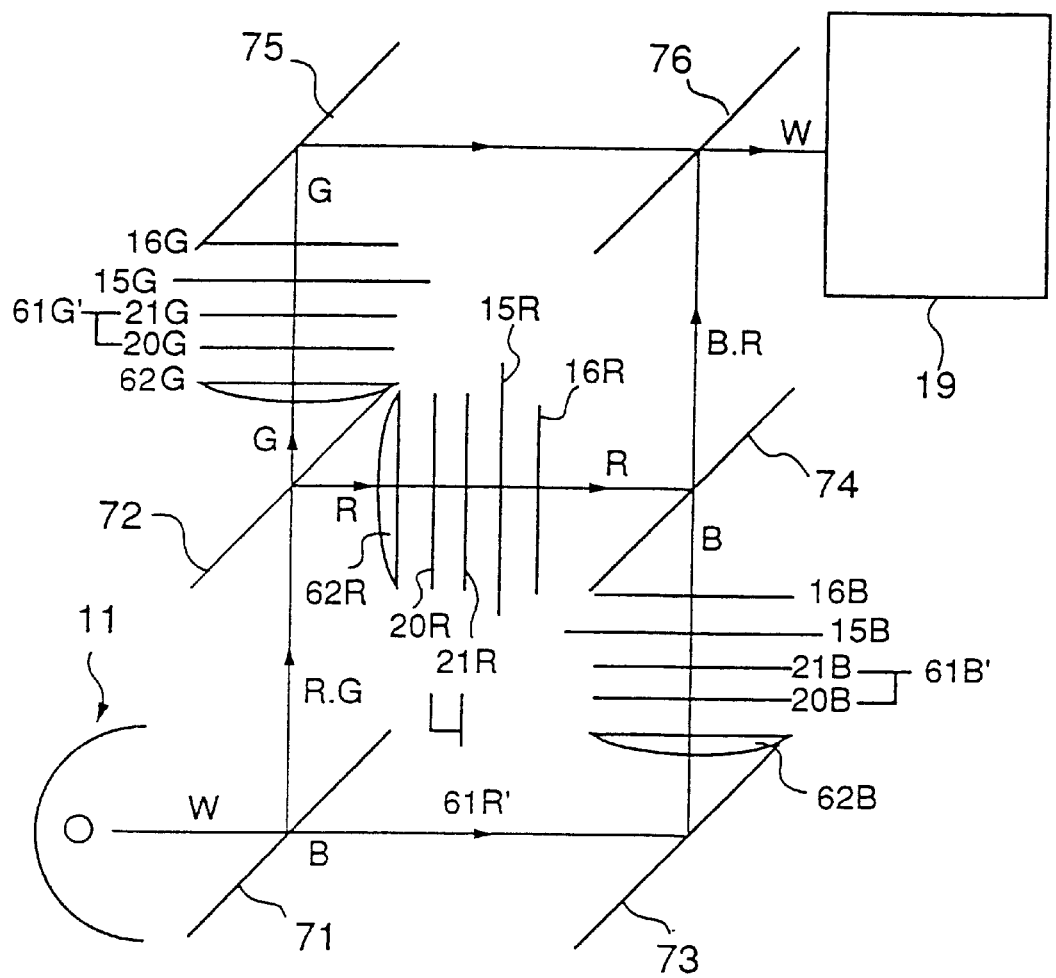
FIGS. 21A and 21B are diagrams showing the construction of an optical projector according to an eighth embodiment of the present invention.

Referring to FIG. 21A, the optical projector of the present embodiment has a block diagram similar to that of FIG. 15, except that the polarization devices 61G, 61R and 61B of FIG. 15 are replaced by polarization devices 61G', 61R' and 61B'.

Figure 21B:
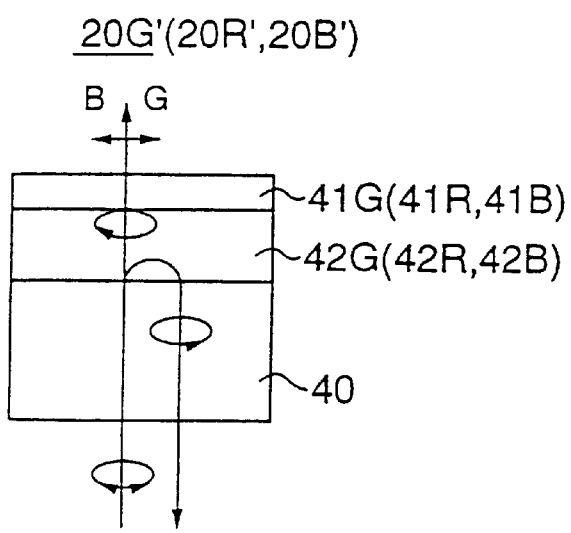

Referring to FIG. 21B showing one of the reflection-type polarization devices such as the polarization device 20G', the polarization device 20G' includes the quarter-wavelength plate 42G for the green optical beam G on the substrate 40, and the quarter-wavelength plate 42G is covered by the cholesteric liquid crystal layer 41G that acts upon the green optical beam G. The polarization devices 20R' and 20B' have substantially the same construction.

Referring to FIG. 21A again, the white optical beam produced by the metal halide lamp 11 is decomposed into the three primary color beams R, G and B by the dichroic mirrors and synthesized again after experiencing a spatial modulation in the respective optical paths. In the optical projector of such a construction, therefore, it is not necessary that the polarization devices 61G'–61B' have the structure of FIG. 8A in which three cholesteric liquid crystal layers 41B–41R are stacked on the glass substrate 40. In other words, the optical projector of the present embodiment can simplify the construction of the polarization devices 20G'–20B'.

NINTH EMBODIMENT

In the optical projector of the present invention that uses a reflection-type polarization device, there is a problem in that the optical beam emitted from the powerful optical source 11 and reflected by the polarization device may form a stray light. When such a stray light reaches the screen, the quality of the projected image may be deteriorated substantially. This problem did not emerge in conventional optical projectors that use a less powerful optical source together with absorption-type polarization devices but not with reflection-type polarization devices. In the present invention, however, it is desirable to devise a measure to interrupt the stray light.

Figure 22:
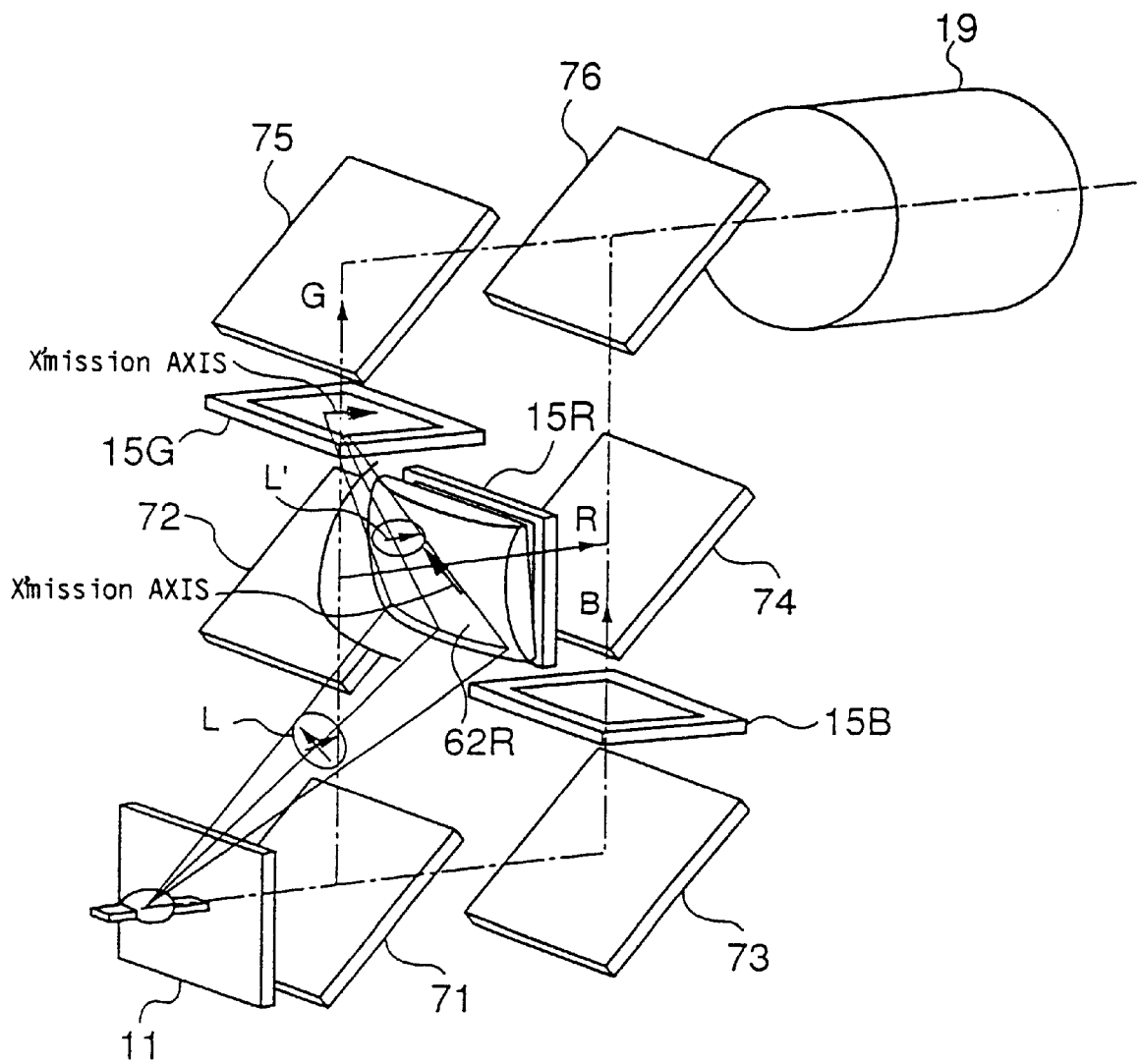
FIG. 22 is a diagram explaining the formation of a stray light in the optical projector of FIGS. 21A and 21B.

FIG. 22 shows the mechanism of the formation of the stray light in the full color optical projector of any of FIG. 15, 16 or 21, wherein those parts corresponding to the parts described previously are designated by the same reference numerals and the description thereof will be omitted. Further, FIG. 23 shows a part of FIG. 22 in detail.

Figure 23:
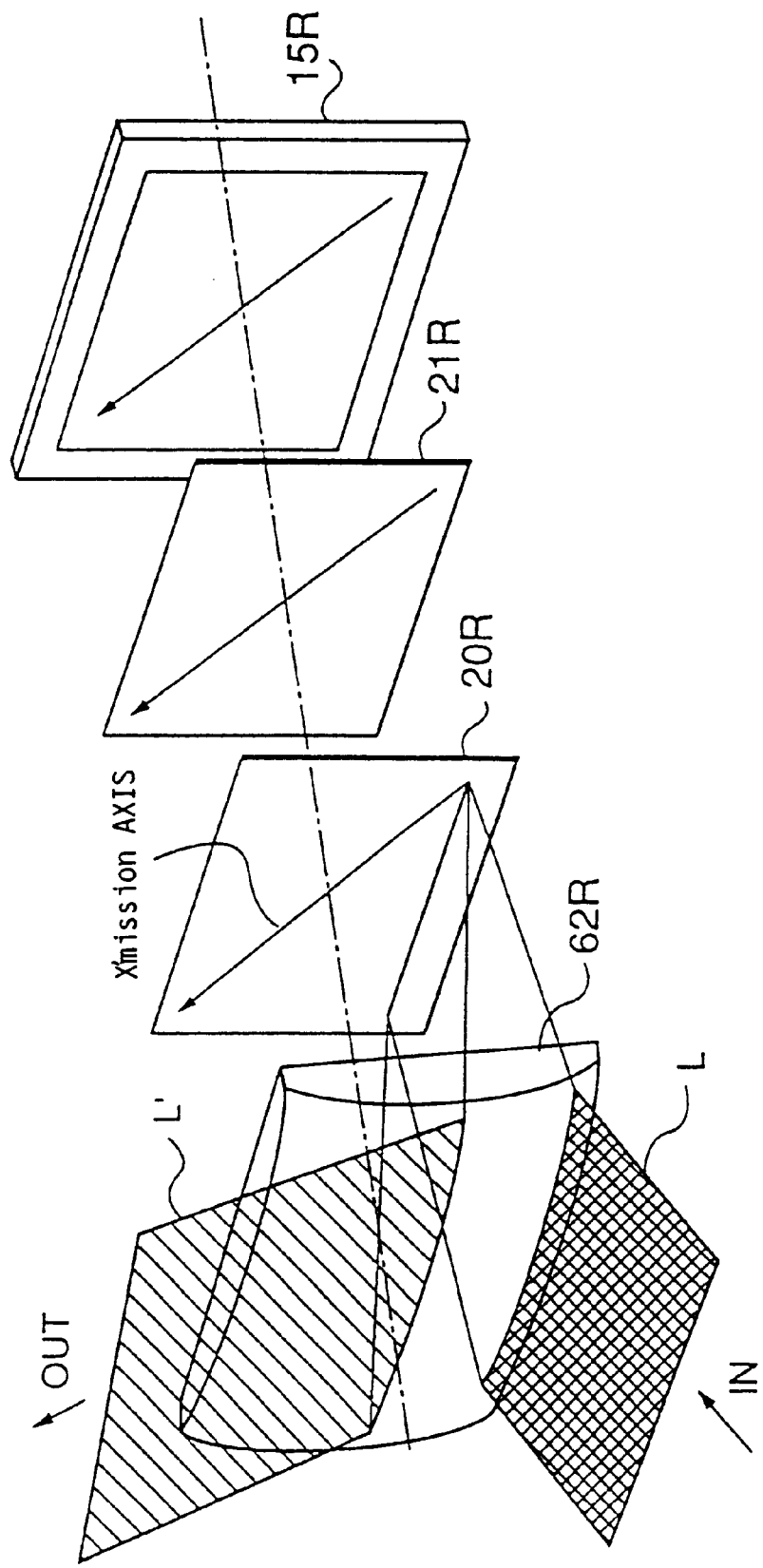
FIG. 23 is a diagram explaining the formation of the stray light in detail.

Referring to FIGS. 22 and 23, a part of the natural optical beam emitted obliquely from the optical source 11 reaches a lower part of the condenser lens 62R as a stray light L. The stray light L is then bent toward the light valve 15R by the action of the condenser lens 62R and reaches the reflection-type polarization element 20R.

It should be noted that the polarization element 20R has a transmission axis as indicated in FIGS. 22 and 23 by arrows, and the orientation of the absorption-type polarization element 21R and the liquid crystal light valve 15R is determined in conformity with the transmission axis of the polarization element 20R. Here, it should be noted that the foregoing "orientation" is defined as indicating the direction of molecular alignment caused by the molecular alignment film provided on the substrate at an incident side, wherein the foregoing substrate sandwiches a liquid crystal layer together with another substrate at the exit side.

Thus, the stray light L is reflected by the polarization element 20R and there is formed a linearly polarized stray light L' as a result of the reflection, wherein the linearly polarized stray light L' thus formed has a polarization surface indicated by an arrow in FIG. 22. It should be noted that the polarization element 20R includes a quarter wavelength plate 42R at the incident side of the cholesteric liquid crystal layer 41R as indicated in FIG. 21B.

The stray light L' thus formed then impinges the light valve 15G as indicated in FIG. 22 and is focused on the screen by the optical system 19, forming a color spot on the screen.

Figure 24:
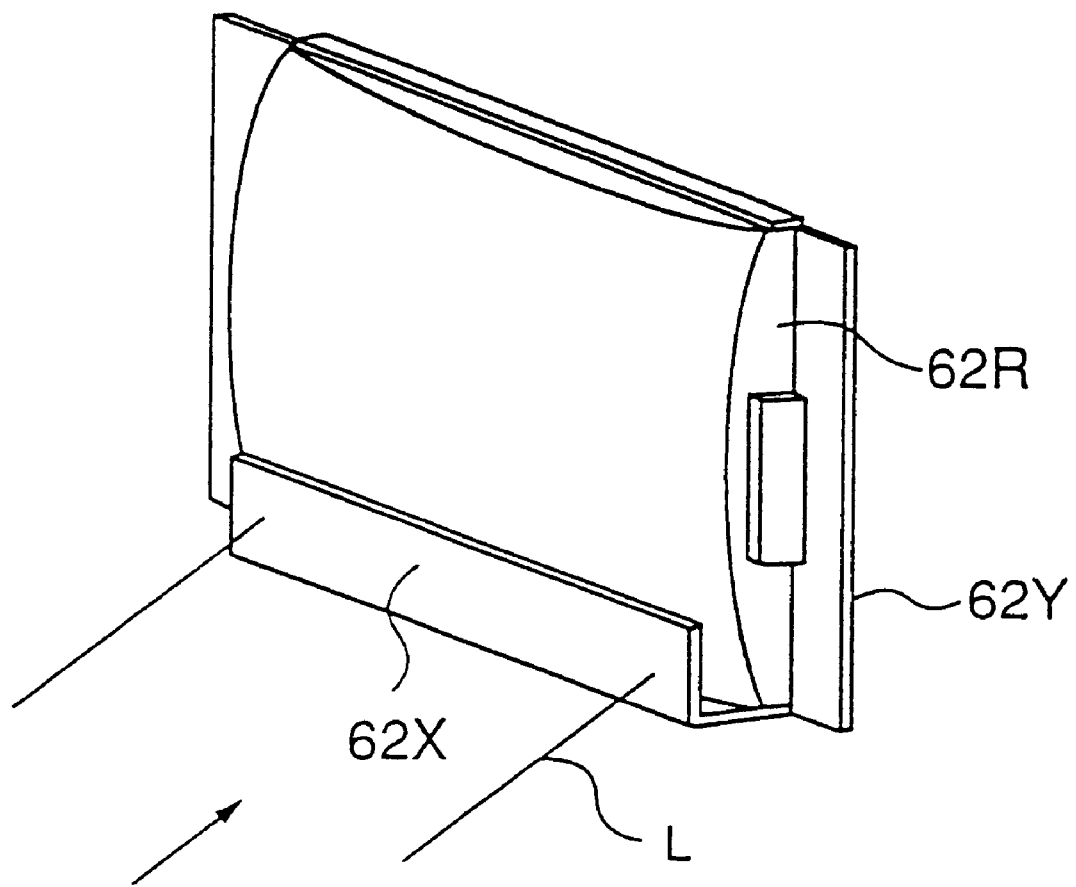
FIG. 24 is a diagram showing a ninth embodiment of the present invention.

Thus, the present embodiment employs an optical shield 62X as indicated in FIG. 24 so as to interrupt the stray light L' impinging the condenser lens 62R, wherein the optical shield 62X is mounted on the lens 62R by a mounting bracket 62Y. As the optical shield 62X thus provided decreases the amount of the optical beam passing through the light valve 15R, the region where the optical shield 62X is formed is limited to only the bottom region of the condenser lens 62R where the stray light L enters directly from the optical source 11.

According to the present invention, it is possible to eliminate the effect of the stray light from the image on the screen although the luminance on the screen is somewhat sacrificed. It should be noted that the present embodiment is easily implemented to the construction of FIG. 21A by a simple modification.

TENTH EMBODIMENT

Figure 25:
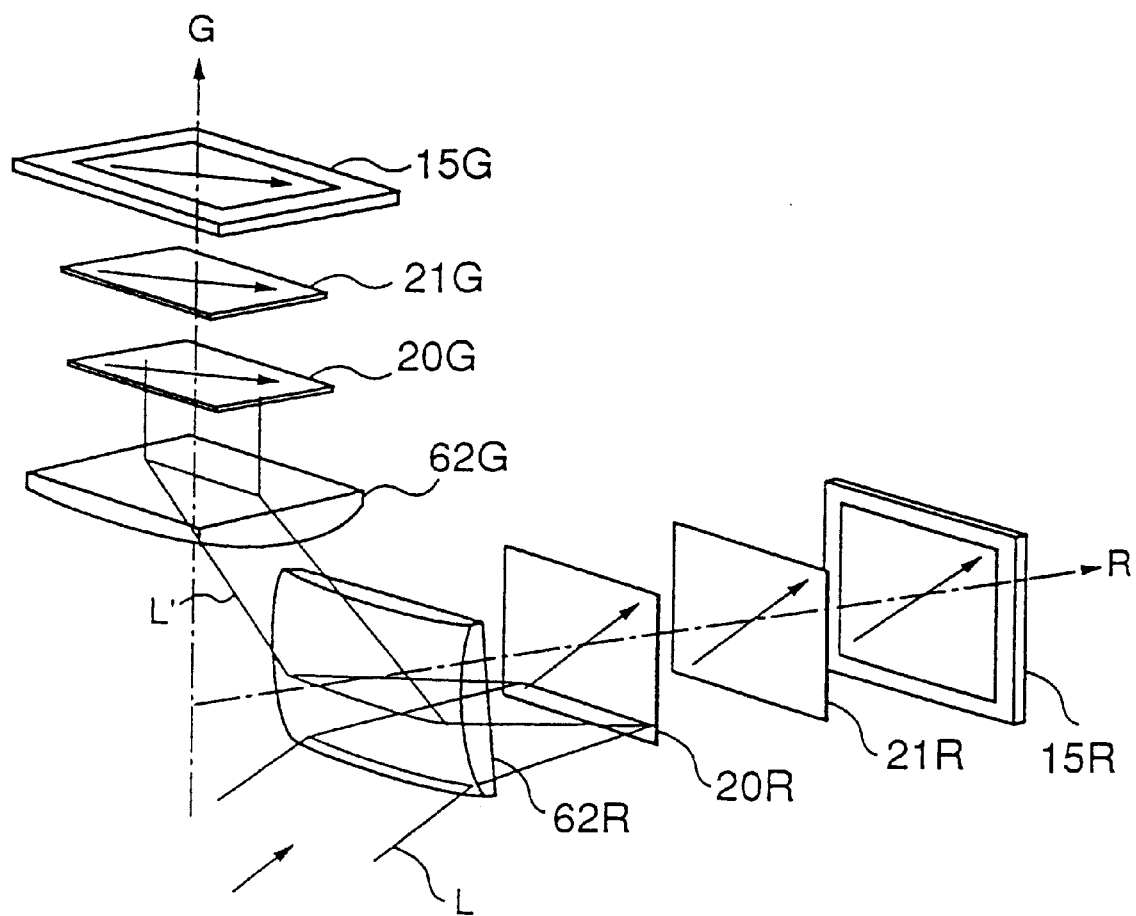
FIG. 25 is a diagram showing the construction of an optical projector according to a tenth embodiment of the present invention.

FIG. 25 shows a part of the full color optical projector according to a tenth embodiment of the present invention, wherein those parts described previously are designated by the same reference numerals and the description thereof will be omitted.

Referring to FIG. 25, the optical projector of the present embodiment is based on the optical projector of FIG. 22, except that the polarization elements 20R and 21R are disposed with such an orientation that the transmission axes of the polarization elements 20R and 21R intersect with the direction shown in FIG. 23. Further, the orientation of the light valve 15R is rotated by 90° in correspondence to the state of FIGS. 22 and 23. It should be noted that the direction of the transmission axis or the orientation of the polarization element is represented in the description hereinafter by an angle of the transmission axis on a plane perpendicular to the optical path of the optical beam, which may be any of the R, G or B optical beam or the stray light L'. According to the definition of the direction noted above, it is concluded that the direction of the transmission axis of the polarization element 20R is coincident to the direction of the transmission axis of the polarization element 20G.

According to the construction of the present embodiment, the polarization plane of the stray light L' reflected by the reflection-type polarization element 20R intersects the polarization plane of the stray light L' shown in FIG. 22 perpendicularly. Thus, the stray light L' is effectively interrupted by the polarization elements 20G and 21G disposed at the incident side of the light valve 15G and the problem of the stray light L' entering the light valve 15G is eliminated.

Of course, the transmission axis of the polarization element 20G is not necessarily exactly perpendicular to the transmission axis of the polarization element 20R but may deviated by an appropriate range from the foregoing perpendicular position depending on the intensity of the stray light L' or the target quality of the projected image.

ELEVENTH EMBODIMENT

Figure 26:
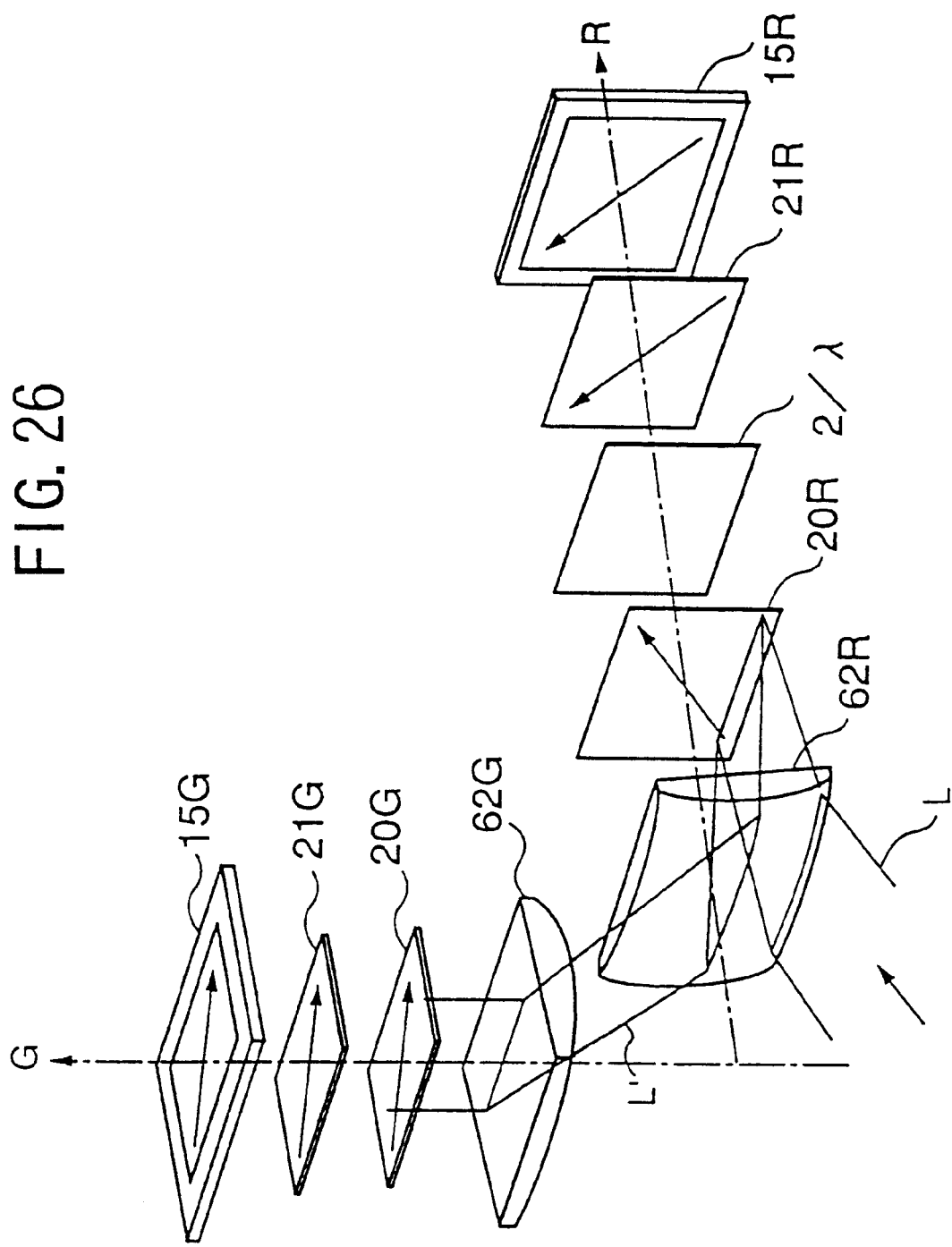
FIG. 26 is a diagram showing the construction of an optical projector according to an eleventh embodiment of the present invention.

FIG. 26 shows a part of the full color optical projector according to an eleventh embodiment of the present invention, wherein those parts corresponding to the parts described previously are designated by the same reference numerals and the description thereof will be omitted.

Referring to FIG. 26, the absorption-type polarization element 21R and the light valve 15R are disposed in an orientation as in the case of FIG. 22 or FIG. 23, and the reflection-type polarization element 20R alone is disposed with the orientation of FIG. 25 for reflecting the stray light L'. In this case, the transmission axis of the polarization element 20R and the transmission axis of the polarization element 21R intersect perpendicularly to each other as indicated by arrows in FIG. 26. Thus, in order to align the transmission axes, the present embodiment employs a half-wavelength retardation film $\lambda/2$ between the reflection-type polarization element 20R and the absorption-type polarization element 21R such that the plane of polarization of the optical beam passed through the reflection-type polarization element 20R is rotated in coincidence with the transmission axis of the absorption-type polarization element 21R. It should be noted that the half-wavelength retardation film $\lambda/2$ causes a retardation in phase of the optical beam passing therethrough by $\lambda/2$, where $\lambda$ represents the wavelength of the optical beam.

In the construction of FIG. 26, too, the stray light L' is interrupted effectively by the polarization elements 20G and 21G due to the fact that the polarization plane of the stray light L' intersects the transmission axes of the polarization elements 20G and 21G perpendicularly.

In the present embodiment, too, it is not necessary that the transmission axis of the polarization element 20G intersects the transmission axis of the polarization element 20R exactly perpendicularly but the transmission axis of the polarization element 20G may be deviated from the ideal perpendicular position within an appropriate range depending on the intensity of the stray light L' or the target quality of the projected image. Further, the retardation caused by the half-wavelength plate λ/2 is not necessarily exactly λ/2.

TWELFTH EMBODIMENT

Figure 27:
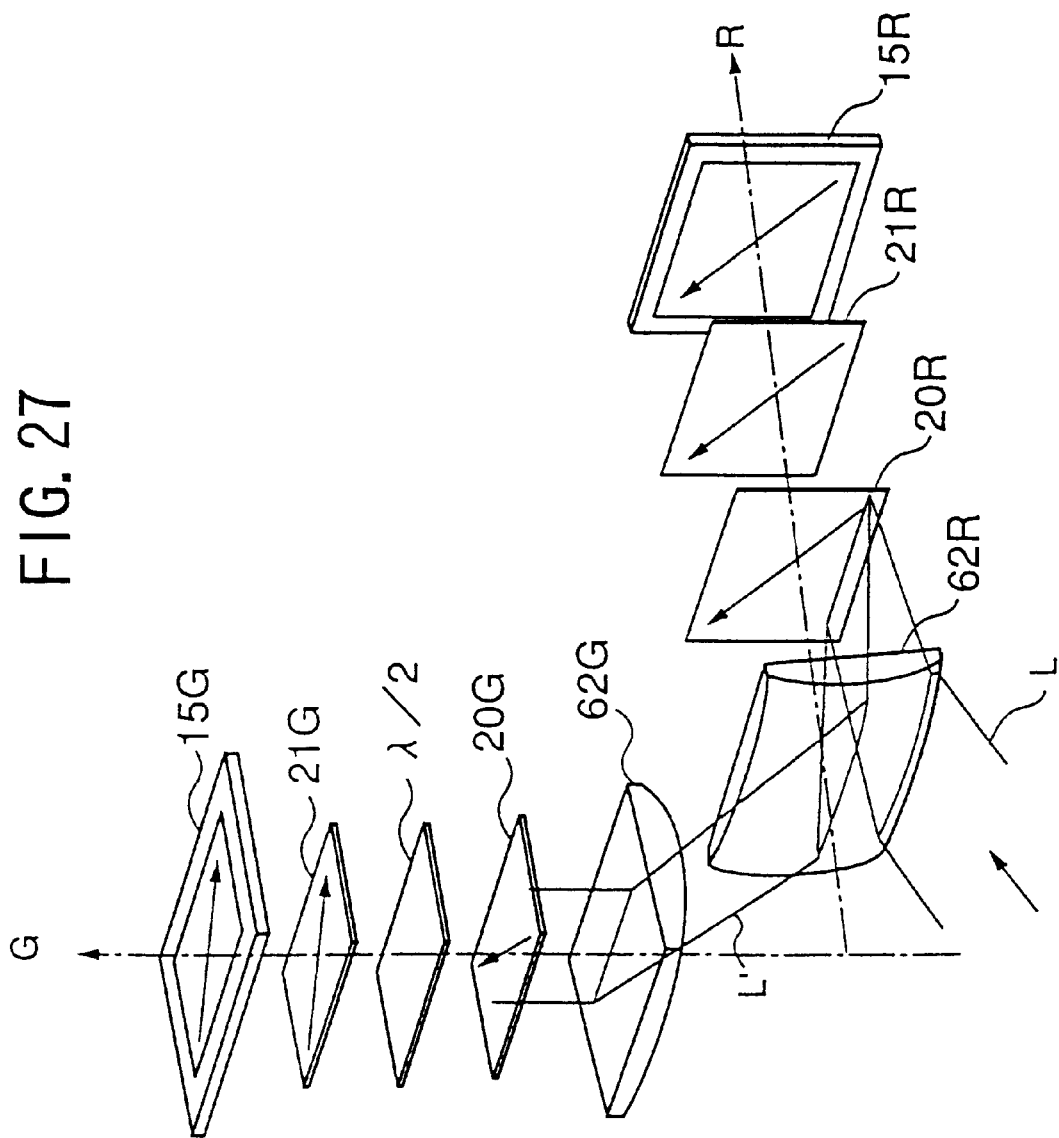
FIG. 27 is a diagram showing the construction of an optical projector according to a twelfth embodiment of the present invention.

FIG. 27 shows a part of the full color optical projector according to a twelfth embodiment of the present invention, wherein those parts described previously are designated by the same reference numerals and the description thereof will be omitted.

Referring to FIG. 27, the present embodiment sets the orientation of the transmission axes of the polarization elements 20R and 21R similarly to the case of FIGS. 22 and 23. Further, the light valve 15R is oriented similarly to the construction of FIGS. 22 and 23. Further, the polarization elements 21G and the light valve 15G are disposed with respective orientations similarly to the case of FIGS. 22 and 23.

In order to interrupt the stray light L' formed by the foregoing reflection-type polarization element 20R, the embodiment of FIG. 27 sets the orientation of the reflection-type polarization element 20G in a direction perpendicular to the direction shown in FIGS. 22 and 23. Further, there is provided a half-wavelength retardation film λ/2 between the polarization element 21G and the polarization element 20G, instead of providing the same between the polarization element 20R and the polarization element 21R as in the case of FIGS. 22 and 23, for causing a rotation in the polarization plane of the polarized beam passed through the polarization element 20G such that the polarization plane coincides the transmission axis of the polarization element 21G.

In the present embodiment, too, it is possible to interrupt the stray light L' formed by the reflection-type polarization element 20R by the polarization element 20G.

Further, it is not necessary that the transmission axis of the polarization element 20G intersects the transmission axis of the polarization element 20R exactly perpendicularly but the transmission axis of the polarization element 20G may be deviated from the ideal perpendicular position within an appropriate range depending on the intensity of the stray light L' or the target quality of the projected image. Further, the retardation caused by the half-wavelength retardation film λ/2 is not necessarily exactly λ/2.

THIRTEENTH EMBODIMENT

Figure 28:
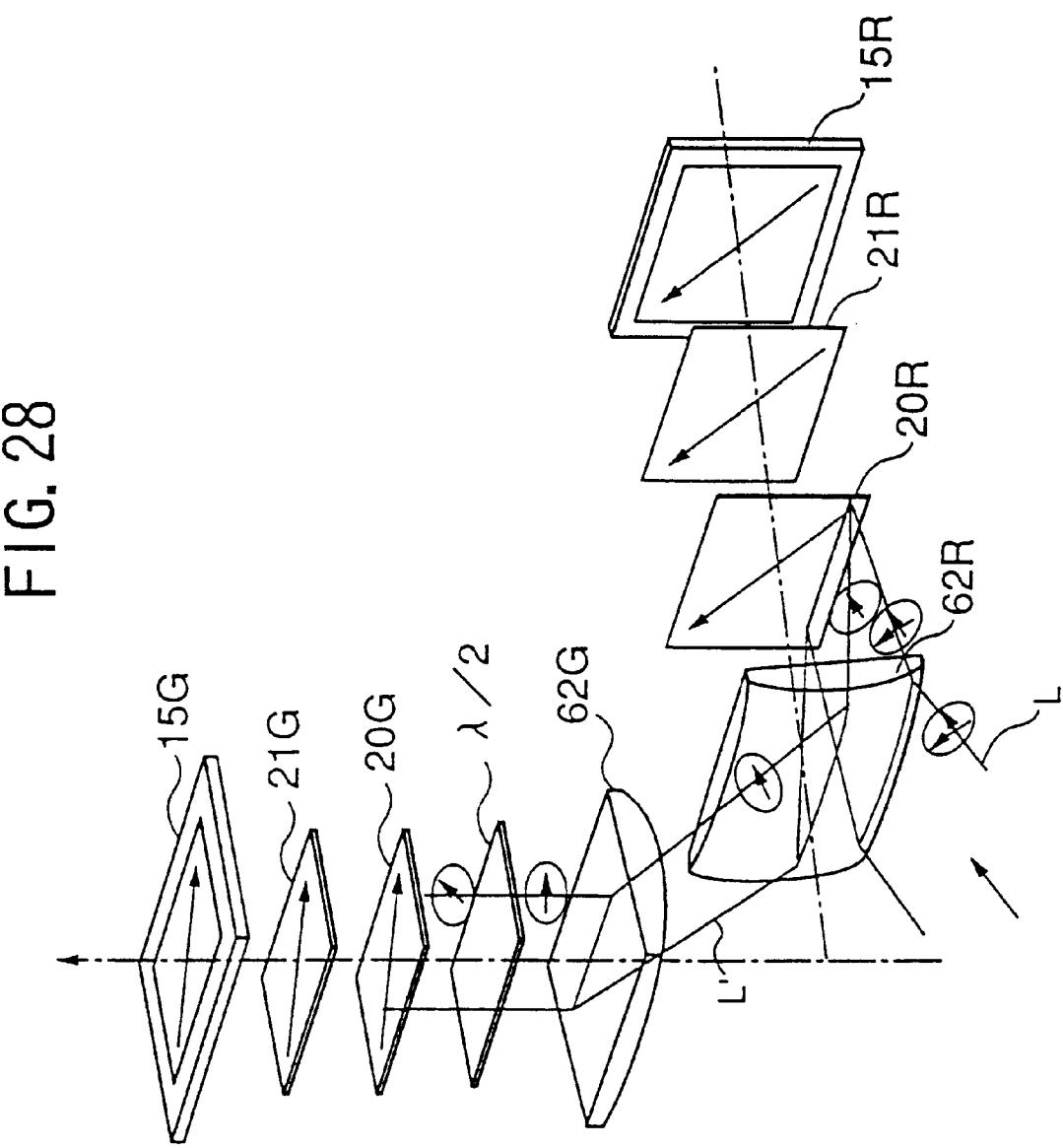
FIG. 28 is a diagram showing the construction of an optical projector according to a thirteenth embodiment of the present invention.

FIG. 28 shows a part of the full color optical projector according to a thirteenth embodiment of the present invention, wherein those parts corresponding to the parts described previously are designated by the same reference numerals and the description thereof will be omitted.

Referring to FIG. 28, the optical projector of the present embodiment has a construction fundamentally similar to that of FIGS. 22 and 23, except that the quarter-wavelength retardation film used in the previous embodiment is now disposed between the condenser lens 62G and the reflection-type polarization element 20G for causing the desired 90°-rotation of the polarization plane of the stray light L'.

In the construction of FIG. 28, it should be noted that the polarization plane of the stray light L' is rotated by the half-wavelength retardation film λ/2 by 90° such that the polarization plane intersects the transmission axis of the polarization element 20G perpendicularly. Thereby, the stray light L' is substantially entirely interrupted by the polarization element 20G and the polarization element 21G behind the polarization element 20G.

Further, it is not necessary that the transmission axis of the polarization element 20G intersects the transmission axis of the polarization element 20R exactly perpendicularly but the transmission axis of the polarization element 20G may be deviated from the ideal perpendicular position within an appropriate range depending on the intensity of the stray light L' or the target quality of the projected image. Further, the retardation caused by the half-wavelength retardation film λ/2 is not necessarily exactly λ/2.

FOURTEENTH EMBODIMENT

Figure 29:
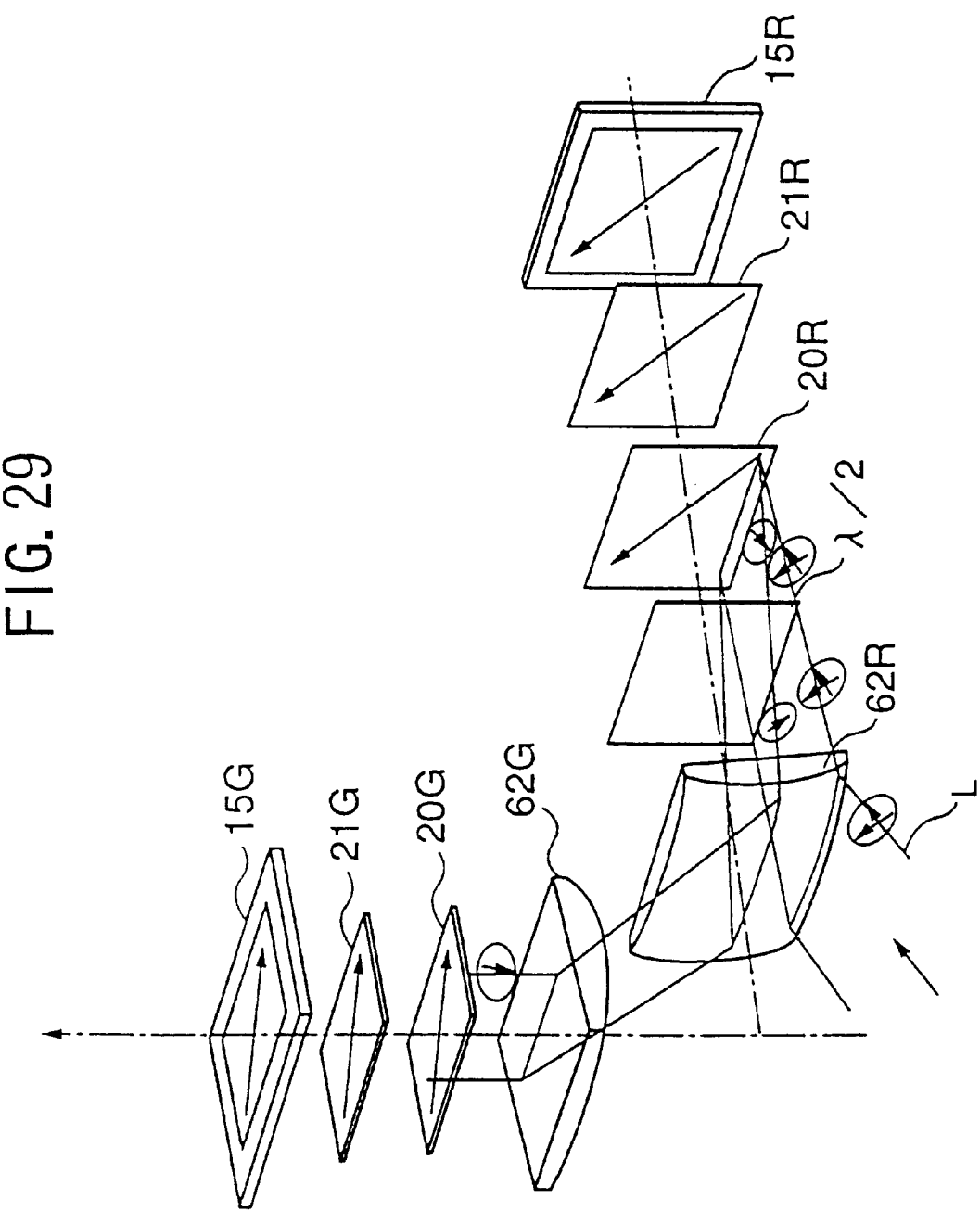
FIG. 29 is a diagram showing the construction of an optical projector according to a fourteenth embodiment of the present invention.

FIG. 29 shows a part of the full color optical projector according to a fourteenth embodiment of the present invention, wherein those parts described previously are designated by the same reference numerals and the description thereof will be omitted.

Referring to FIG. 29, the optical projector of the present embodiment has a construction similar to that of the optical projector of FIGS. 22 and 23, except that the quarter-wavelength retardation film λ/2 used in the previous embodiment for rotating the polarization plane of the stray light L', is now disposed between the condenser lens 62R and the reflection-type polarization element 20R.

In the construction of FIG. 29, too, the polarization plane of the stray light L' formed by the polarization element 20R is rotated by 90° by the half-wavelength retardation film λ/2 such that the polarization plane intersects the transmission axis of the polarization element 20G perpendicularly. As a result, the stray light L' is interrupted substantially by the polarization element 20G as well as by the polarization element 21G behind the polarization element 20G.

Further, it is not necessary that the transmission axis of the polarization element 20G intersects the transmission axis of the polarization element 20R exactly perpendicularly but the transmission axis of the polarization element 20G may be deviated from the ideal perpendicular position within an appropriate range depending on the intensity of the stray light L' or the target quality of the projected image. Further, the retardation caused by the half-wavelength retardation film λ/2 is not necessarily exactly λ/2.

FIFTEENTH EMBODIMENT

Figure 30:
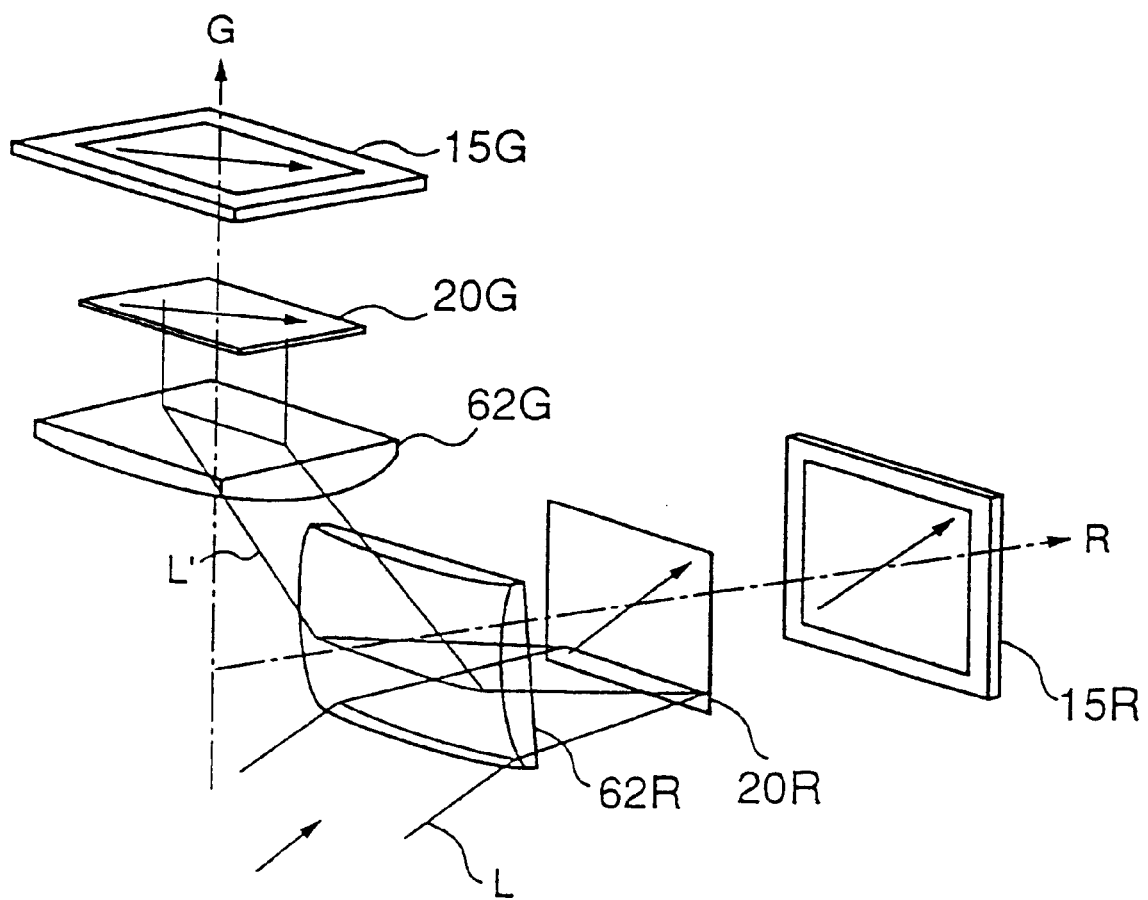
FIG. 30 is a diagram showing the construction of an optical projector according to a fifteenth embodiment of the present invention.

FIG. 30 shows a part of the full color optical projector according to a fifteenth embodiment of the present invention, wherein those parts described previously are designated by the same reference numerals and the description thereof will be omitted.

Referring to FIG. 30, the optical projector of the present embodiment has a construction somewhat similar to that of FIG. 25, except that the absorption-type polarization elements 21R and 21G are omitted. As the present embodiment uses only the reflection-type polarization elements 20R and 20G, the degree of polarization of the R or G optical beam thus obtained by the polarization elements 20R or 20G may be inferior to the case of the embodiment of FIG. 25. Nevertheless, the optical projector of the present embodiment can be produced with a lower cost, and the present embodiment may be useful or advantageous for the applications where a low cost is required for the optical projector.

As other features of the present embodiment are obvious from previous explanations, further description thereof will be omitted.

SIXTEENTH EMBODIMENT

Figure 31:
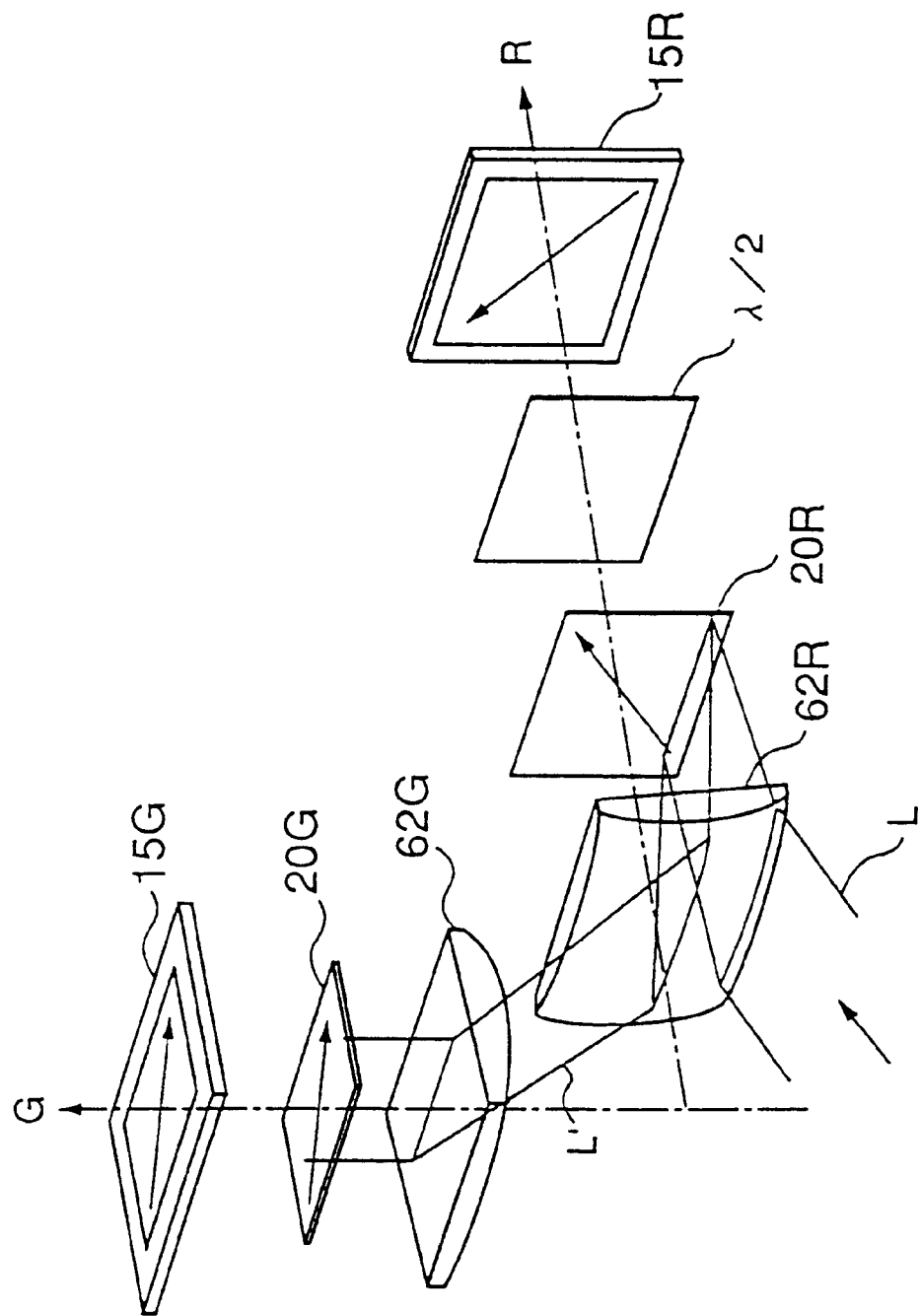
FIG. 31 is a diagram showing the construction of an optical projector according to a sixteenth embodiment of the present invention.

FIG. 31 shows a part of the full color optical projector according to a nineteenth embodiment of the present invention, wherein those parts described previously are designated by the same reference numerals and the description thereof will be omitted.

Referring to FIG. 31, the optical projector of the present embodiment has a construction similar to that of FIG. 26, except that the absorption-type polarization elements 21R and 21G are omitted similarly to the embodiment of FIG. 30. As the present embodiment uses only the reflection-type polarization elements 20R and 20G, the degree of polarization of the R or G optical beam obtained by the polarization element 20R or 20G may be inferior to the case of the embodiment of FIG. 25. Nevertheless, the optical projector of the present embodiment can be produced with a lower cost, and the present embodiment may be useful or advantageous for the applications where a low cost is required for the optical projector.

As other aspects of the present embodiment are obvious from previous explanations, further description thereof will be omitted.

SEVENTEENTH EMBODIMENT

Figure 32:
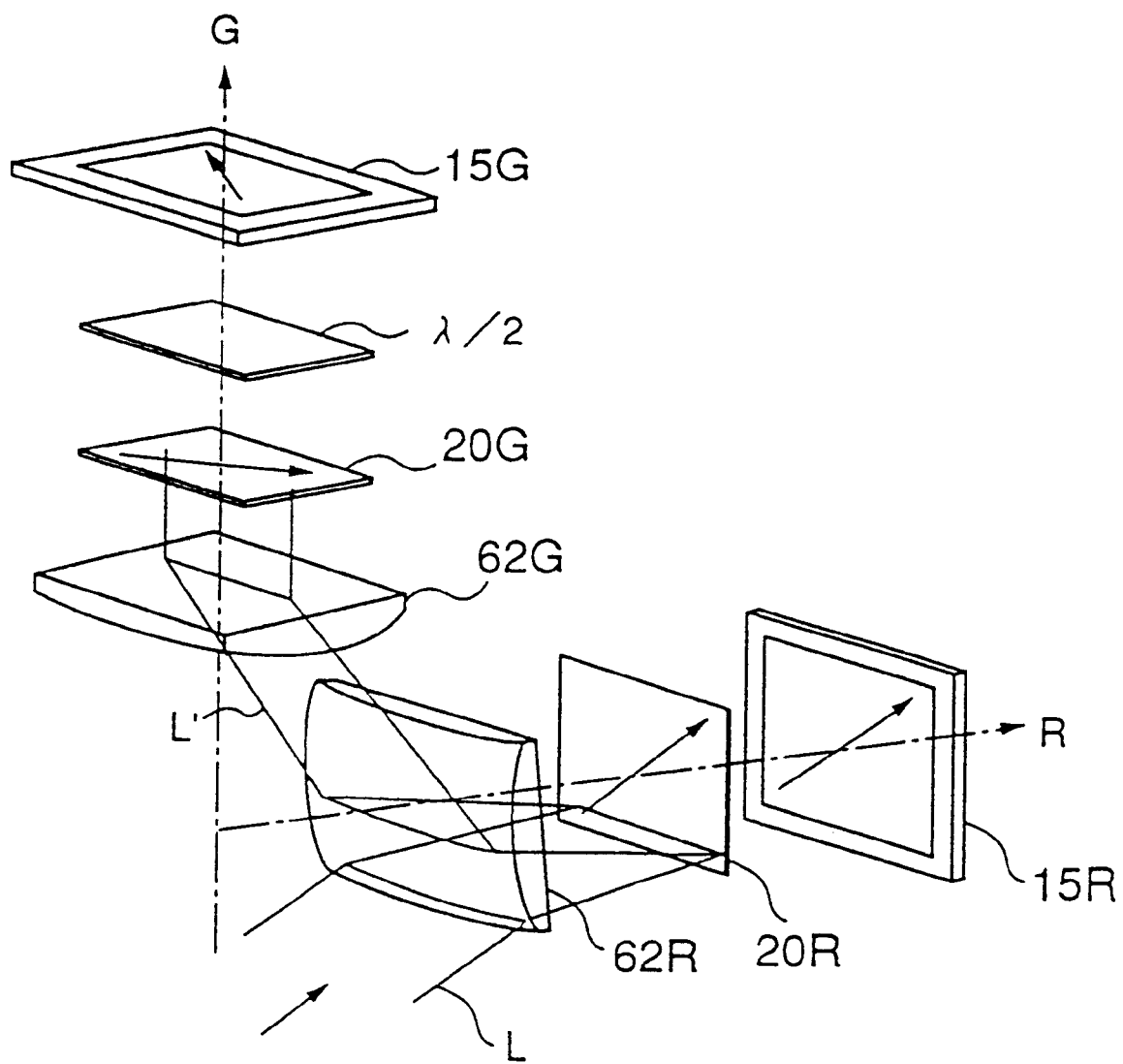
FIG. 32 is a diagram showing the construction of an optical projector according to a seventeenth embodiment of the present invention.

FIG. 32 shows a part of the full color optical projector according to a seventeenth embodiment of the present invention, wherein those parts corresponding to the parts described previously are designated by the same reference numerals and the description thereof will be omitted.

Referring to FIG. 32, the present embodiment is a modification of the embodiment of FIG. 30 in that a half-wavelength retardation film $\lambda/2$ is interposed between the reflection-type polarization element 20G and the light valve 15G. Further, the light valve 15G is disposed with an orientation rotated by 90° with respect to the embodiment of FIG. 30, in conformity with the use of the half-wavelength retardation film $\lambda/2$.

As other aspects of the present embodiment are obvious from previous explanations, further description thereof will be omitted.

EIGHTEENTH EMBODIMENT

Figure 33:
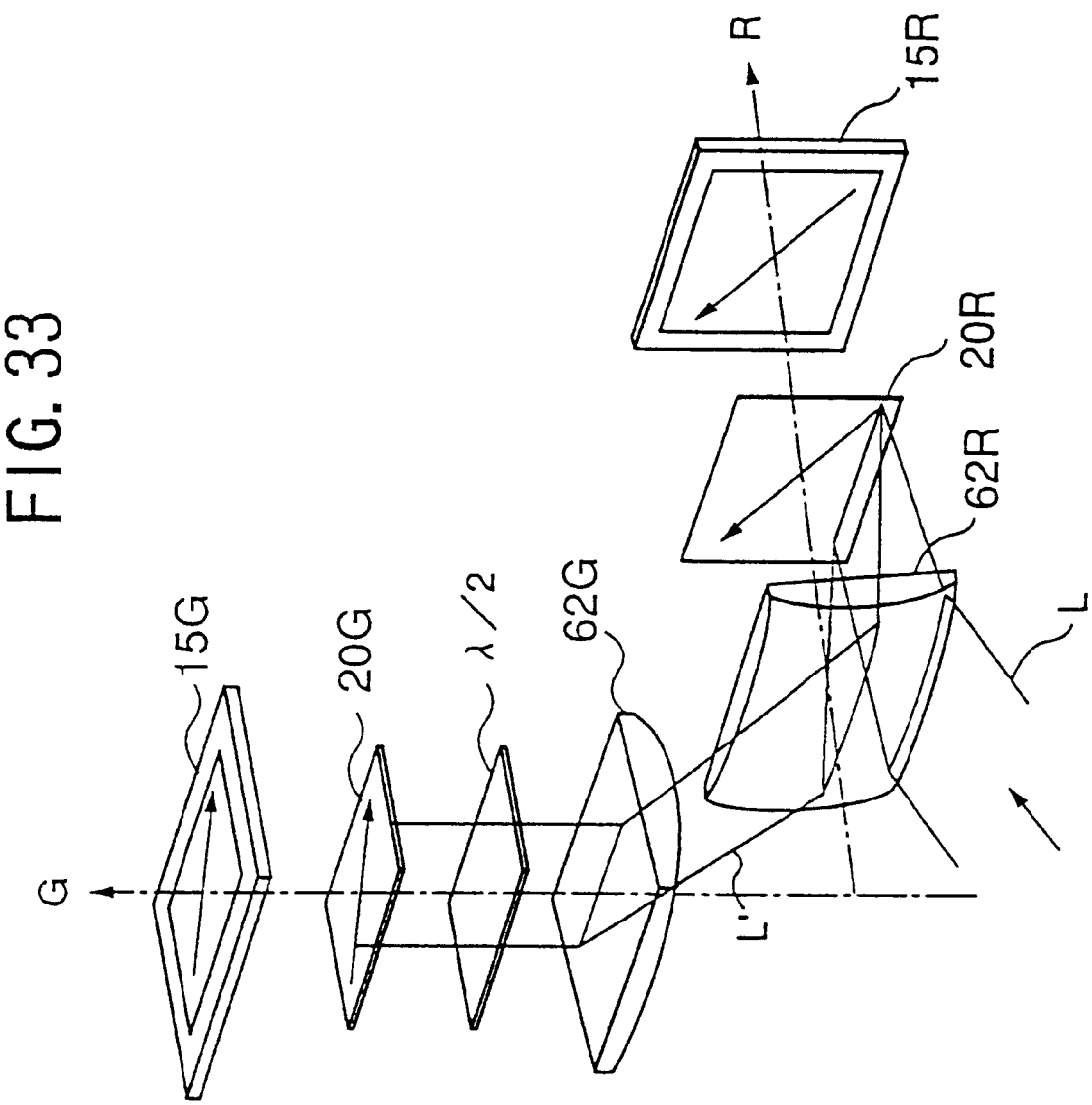
FIG. 33 is a diagram showing the construction of an optical projector according to an eighteenth embodiment of the present invention.

FIG. 33 shows a part of the full color optical projector according to an eighteenth embodiment of the present invention, wherein those parts corresponding to the parts described previously are designated by the same reference numerals and the description thereof will be omitted.

Referring to FIG. 33, the present embodiment is a modification of the embodiment of FIG. 28 in that the absorption-type polarization elements 21R and 21G are omitted from the optical projector of FIG. 28.

As other aspects of the present embodiment are obvious from previous explanations, further description thereof will be omitted.

NINETEENTH EMBODIMENT

Figure 34:
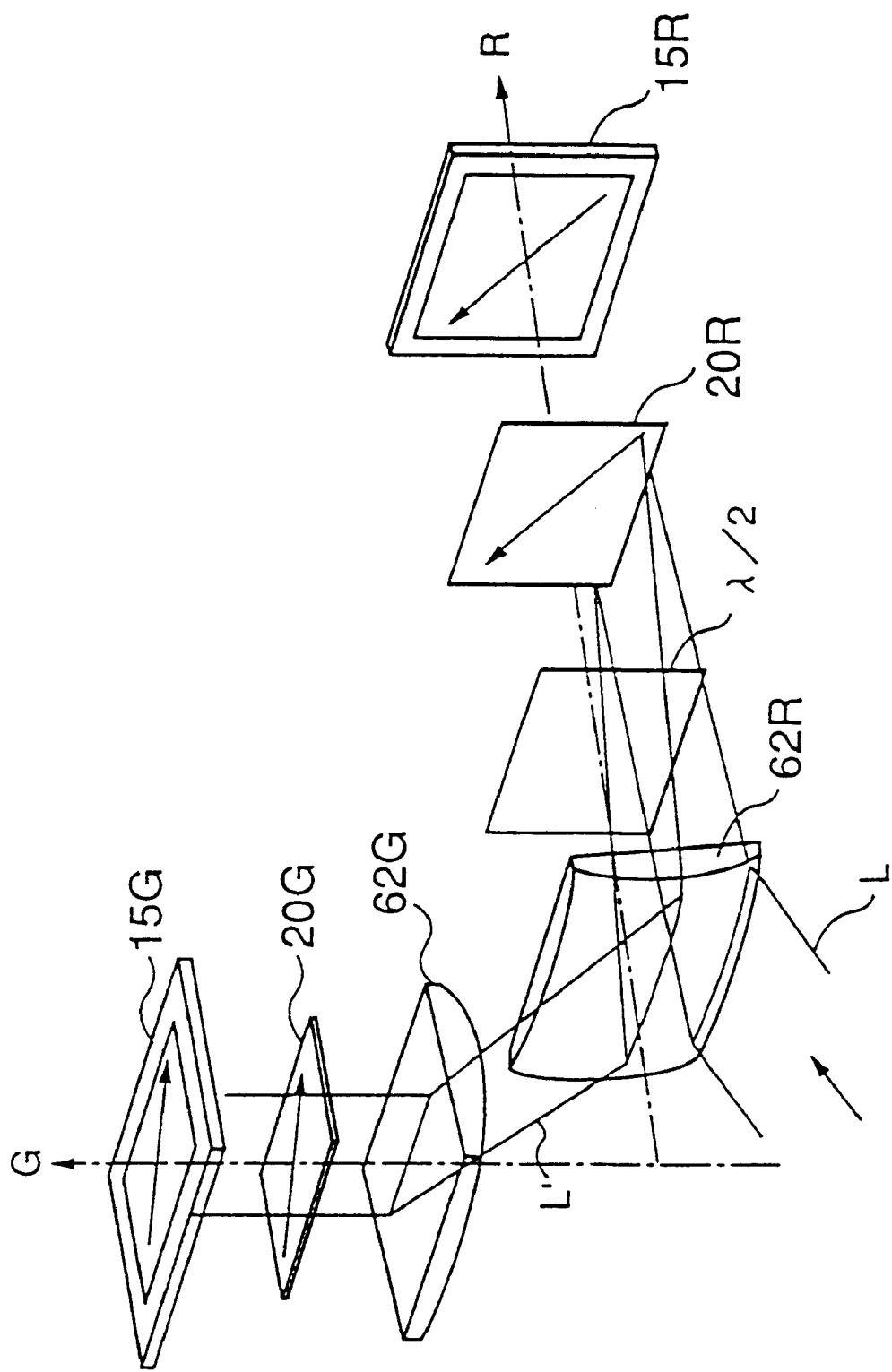
FIG. 34 is a diagram showing the construction of an optical projector according to a nineteenth embodiment of the present invention.

FIG. 34 shows a part of the full color optical projector according to a nineteenth embodiment of the present invention, wherein those parts corresponding to the parts described previously are designated by the same reference numerals and the description thereof will be omitted.

Referring to FIG. 34, the present embodiment is a modification of the embodiment of FIG. 29 and has a construction in which the absorption-type optical polarization elements 21R and 21G are omitted from the optical projector of FIG. 29.

As other aspects of the present embodiment are obvious from previous explanations, further description thereof will be omitted.

TWENTIETH EMBODIMENT

In the ninth through nineteenth embodiments described heretofore, the stray light L' reflected by the reflection-type polarization element 20R forms a divergent beam with a divergent angle $\beta$ and hits the bottom edge of the mirror 75 after passing through the left-half of the light valve 15G as indicated in FIG. 35A, provided that there is no measure taken for interrupting the stray light L'.

On the other hand, the present embodiment avoids the incidence of the stray light L' to the light valve 15G by the construction shown in FIG. 35B.

Referring to FIG. 35B, it should be noted that the polarization element 20R is tilted, in the present embodiment, with an angle $\alpha$ in the left direction-or anti-clockwise direction from a hypothetical vertical plane that is vertical to the path of the optical beam R passing through the light valve 15R. By setting the angle $\alpha$ to be equal to or larger than the foregoing divergent angle $\beta$, ($\alpha \geq \beta/2$), it is possible to eliminate the incidence of the stray light L' to the mirror 75.

It should be noted that the tilt angle $\alpha$ of the polarization element 20R is not limited to the foregoing range but any angle may be possible as long as the reflected stray light L' misses the mirror 75. When the angle $\alpha$ is set large, on the other hand, the apparent direction of the transmission axis of the polarization element 20R as viewed in the direction parallel to the optical beam R, may deviate slightly from the true direction of the transmission axis. In such a case, it is necessary to correct the direction of the transmission axis of the polarization element 20R.

As other aspects of the present embodiment are obvious from previous explanations, further description thereof will be omitted.

TWENTY-FIRST EMBODIMENT

Figure 36:
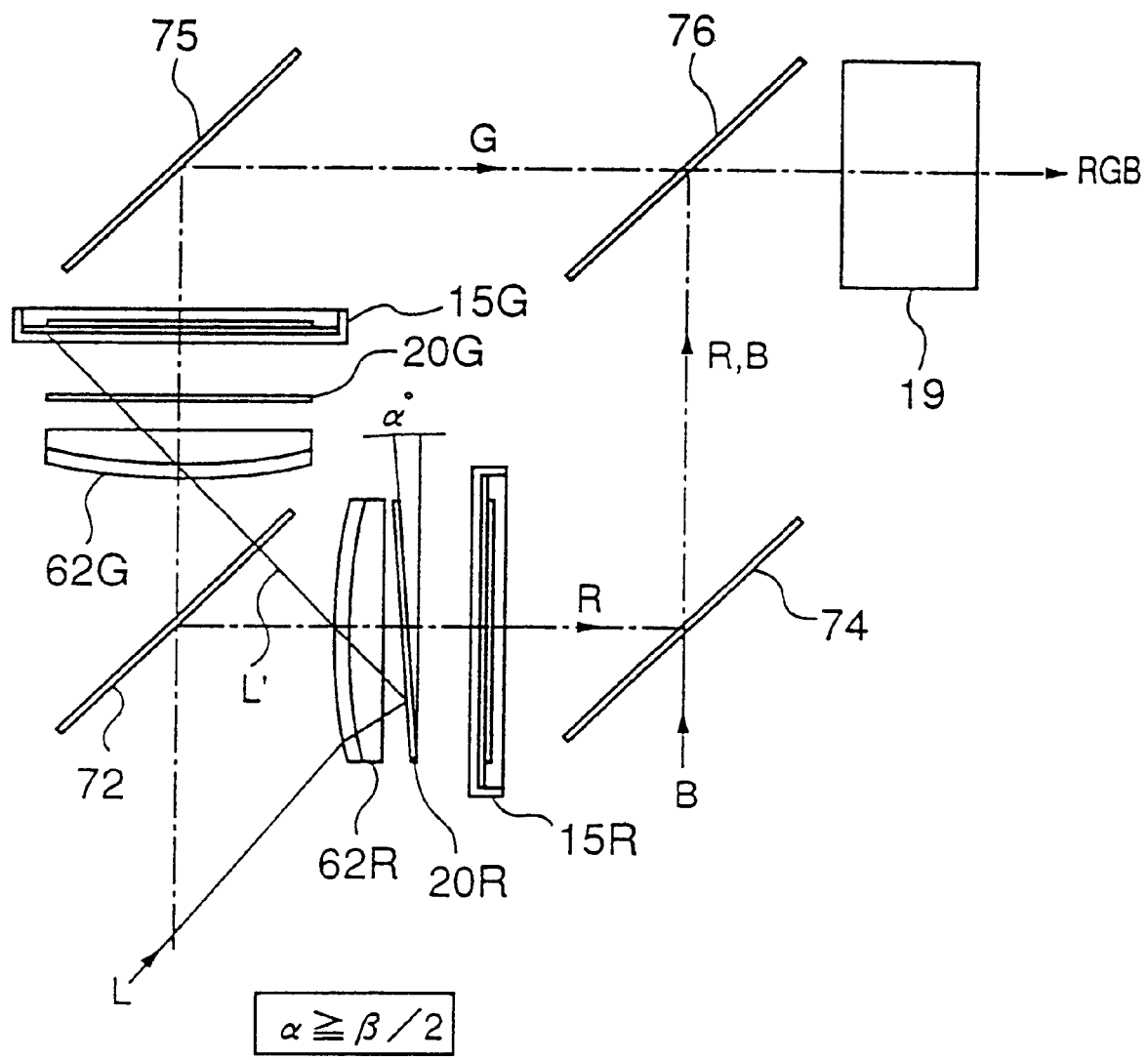
FIG. 36 is a diagram showing the construction of an optical projector according to a twenty-first embodiment of the present invention.

FIG. 36 shows a part of the full color optical projector according to a twenty-first embodiment of the present invention, wherein those parts corresponding to the parts described heretofore are designated by the same reference numerals and the description thereof will be omitted.

Figure 35:
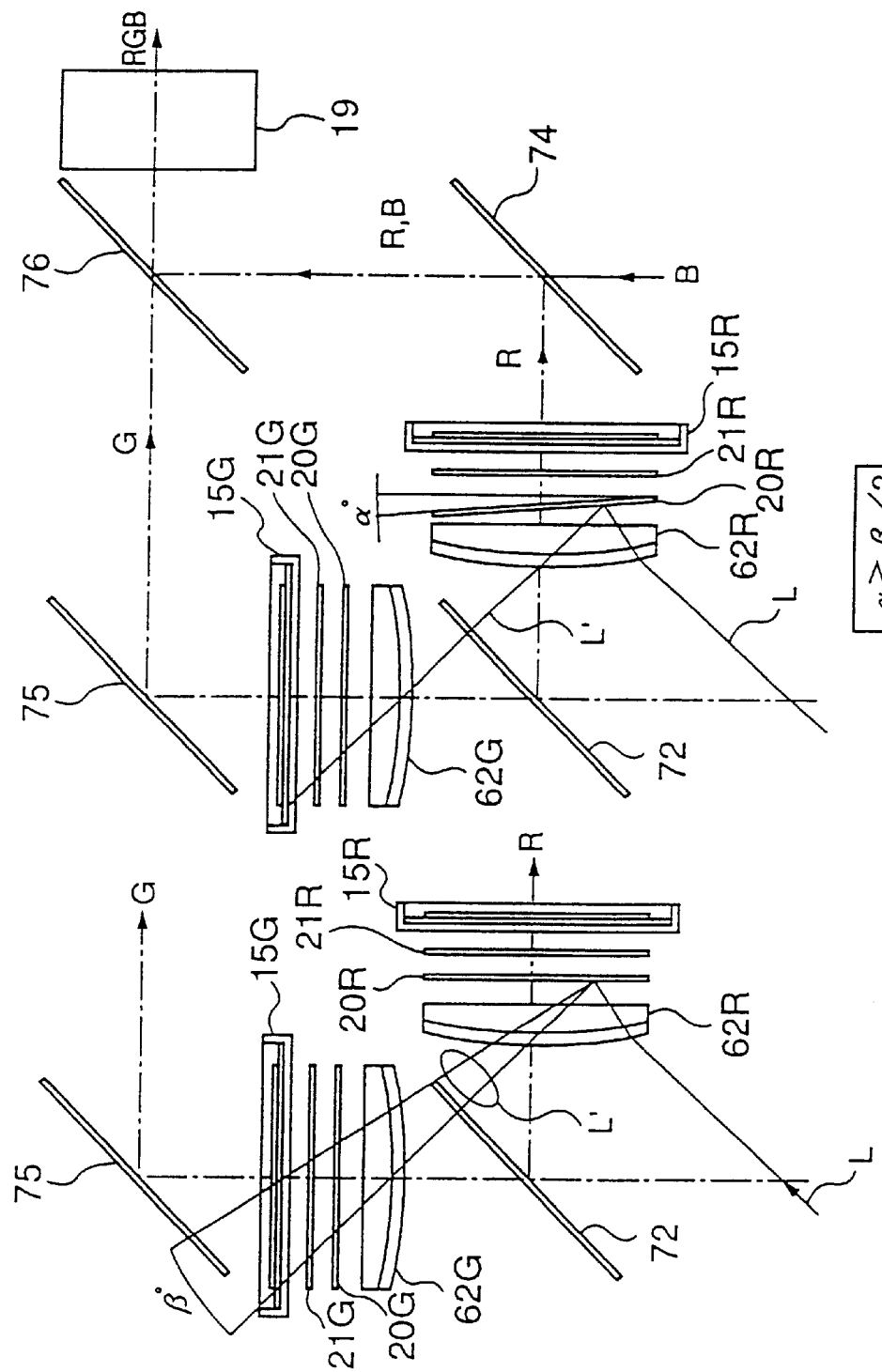
FIGS. 35A and 35B are diagrams showing the construction of an optical projector according to a twentieth embodiment of the present invention.

Referring to FIG. 36, the optical projector of the present embodiment is a modification of the optical projector of FIG. 35 in that the absorption-type polarization elements 21R and 21G are omitted.

As the reflection-type polarization element 20R is tilted by the angle $\alpha$ similarly to the previous embodiment, the stray light L' reflected by the polarization element 20R misses the mirror 75 and the problem of the stray light L' projected on the screen is effectively eliminated.

As other aspects of the present embodiment are obvious from previous explanations, further description thereof will be omitted.

TWENTY-SECOND EMBODIMENT

Figure 37:
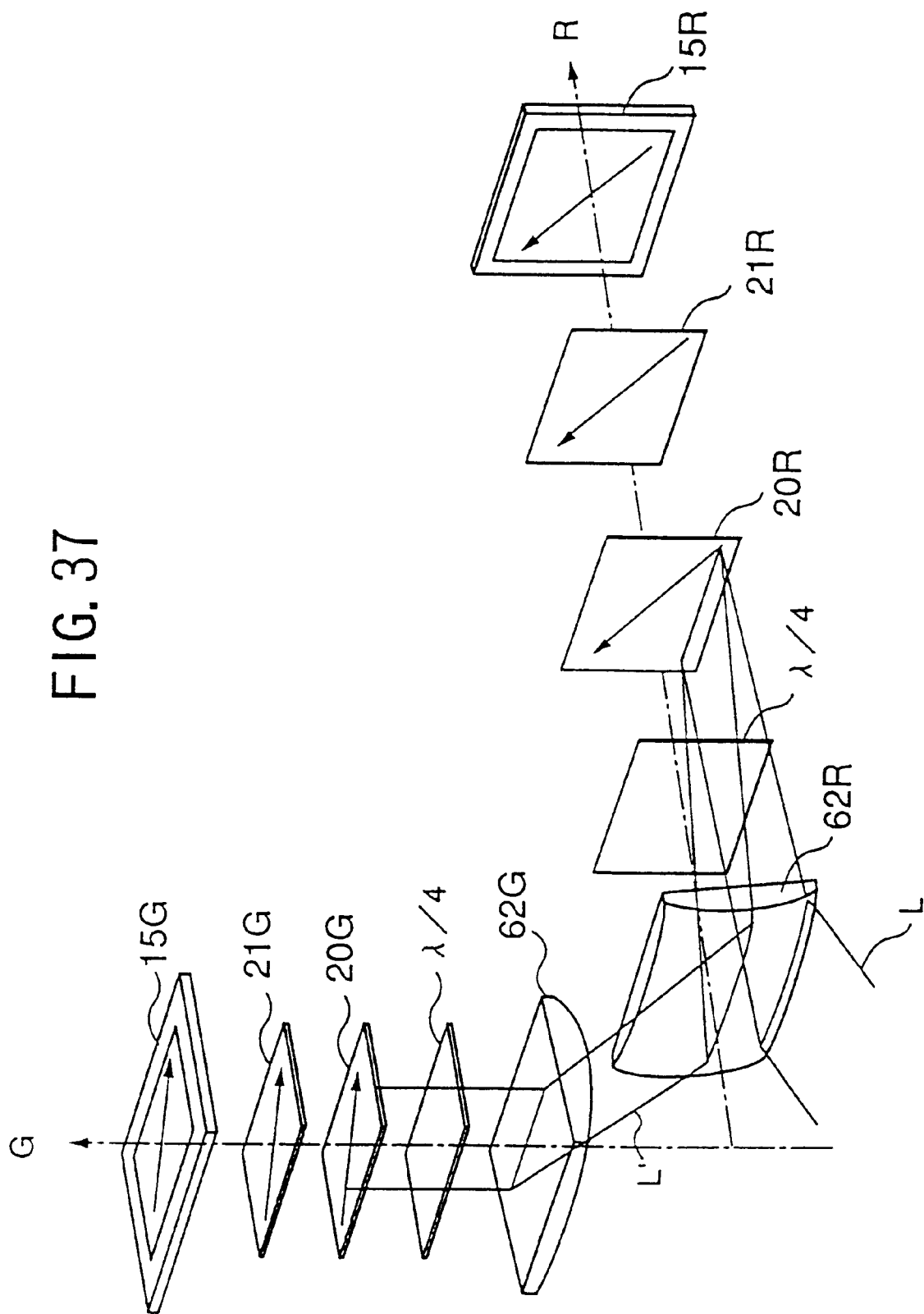
FIG. 37 is a diagram showing the construction of an optical projector according to a twenty-second embodiment of the present invention.

FIG. 37 shows a part of the full color optical projector according to a twenty-second embodiment of the present invention, wherein those parts described previously are designated by the same reference numerals and the description thereof will be omitted.

Referring to FIG. 37, the optical projector of the present embodiment is a modification of the optical projector of FIG. 28 in that a quarter-wavelength retardation film λ/4, which retards the phase of the optical beam passing therethrough by a phase angle of λ/4, is used in place of the half-wavelength retardation film λ/2 between the condenser lens 62G and the reflection-type polarization element 20G. Further, another quarter-wavelength retardation film λ/4 is interposed between the condenser lens 62R and the polarization element 20R, such that the stray light L' reflected by the polarization element 20R experiences a total phase retardation of λ/2.

In the construction of FIG. 37, too, the polarization plane of the stray light L' reflected by the polarization element 20R and passed successively through the two quarter-wavelength retardation films λ/4 intersects the transmission axis of the polarization element 20G or 21G, and the incidence of the stray light L' to the light valve 15G is effectively interrupted.

TWENTY-THIRD EMBODIMENT

Figure 38:
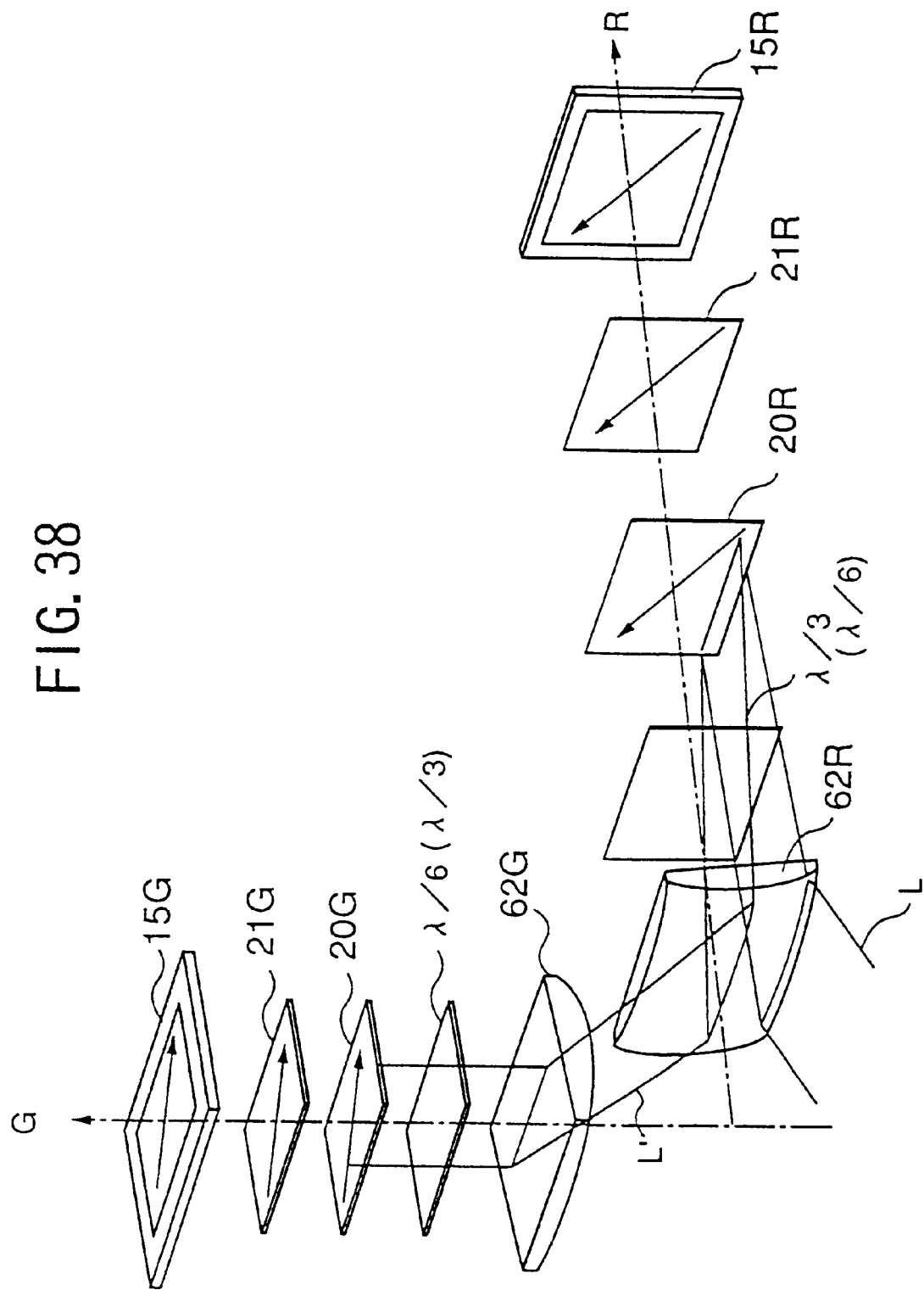
FIG. 38 is a diagram showing the construction of an optical projector according to a twenty-third embodiment of the present invention.

FIG. 38 shows a part of the full color optical projector according to a twenty-third embodiment of the present invention, wherein those parts described previously are designated by the same reference numerals and the description thereof will be omitted.

Referring to FIG. 38, the present embodiment is a modification of the embodiment of FIG. 37 and includes a λ/6 retardation film that causes a retardation of λ/6 in the phase of the optical beam passing therethrough, in place of one of the two quarter wavelength retardation films λ/4 in the construction of FIG. 37, wherein the other of the quarter-wavelength retardation films of FIG. 37 is replaced, in the present embodiment, by a λ/3 retardation film that causes a retardation of λ/3 in the phase of the optical beam passing therethrough.

In the construction of the present embodiment, too, the total retardation of the optical beam reflected by the reflection-type polarization element 20R becomes λ/2, and the polarization plane of the stray light L' intersects, after passing through the retardation films λ/6 and λ/3, perpendicularly with the transmission axis of the polarization element 20G or 21G. Thereby, the stray light L' impinging upon the light valve 15G is effectively interrupted.

In FIG. 38, it should be noted that the retardation films λ/3 and λ/6 may be interchanged as indicated in the brackets.

TWENTY-FOURTH EMBODIMENT

Figure 39:
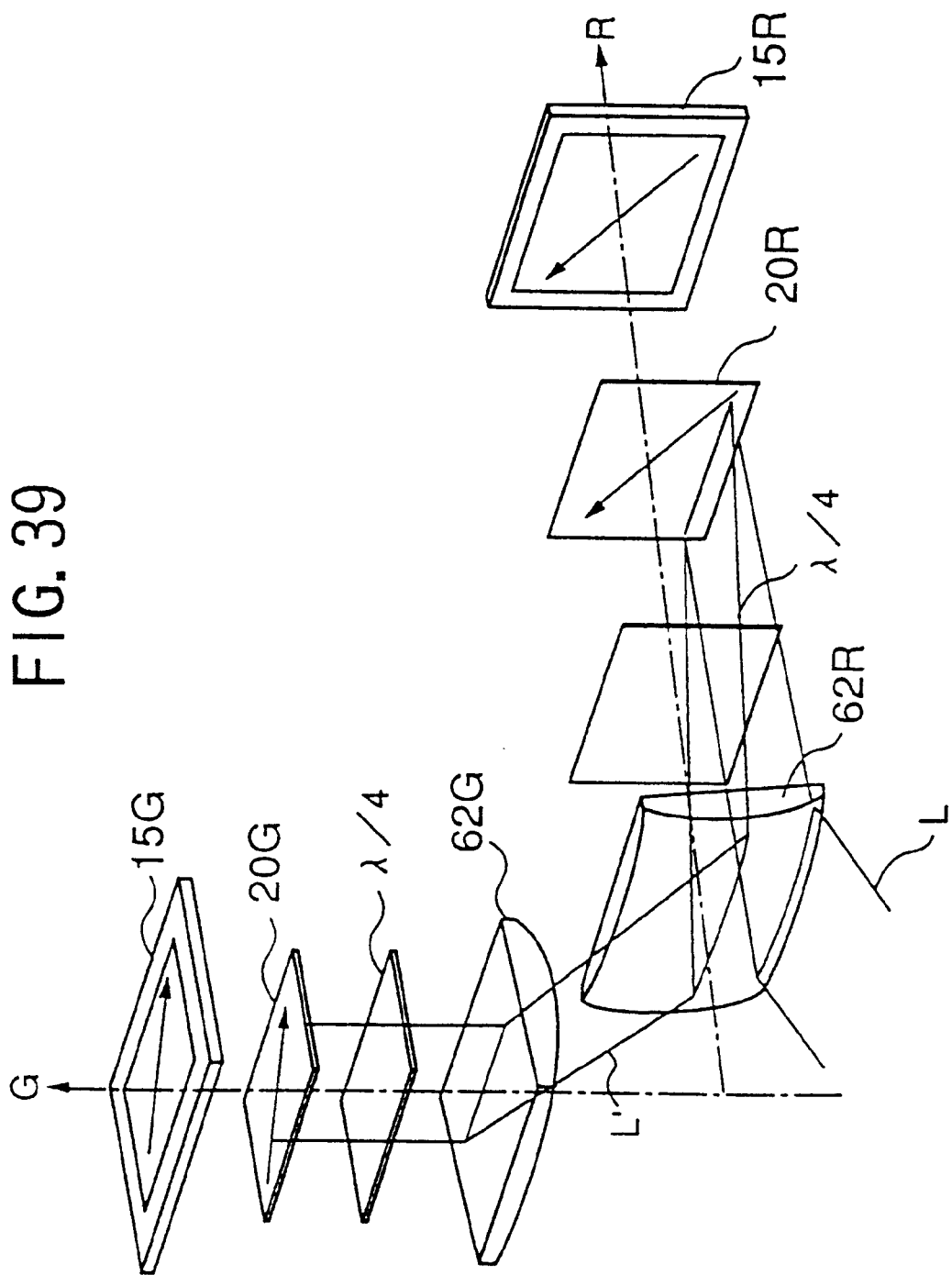
FIG. 39 is a diagram showing the construction of an optical projector according to a twenty-fourth embodiment of the present invention.

FIG. 39 shows a part of the full color optical projector according to a twenty-fourth embodiment of the present invention, wherein those parts described previously are designated by the same reference numerals and the description thereof will be omitted.

Referring to FIG. 39, the optical projector of the present embodiment is a modification of the embodiment of FIG. 37 in that the absorption-type polarization elements 21R and 21G are omitted from the construction of FIG. 37.

In the optical projector of the present embodiment, too, the stray light L' reflected by the polarization element 20R experiences a 90° rotation of the polarization plane upon passage through the two quarter-wavelength retardation films λ/4. Thereby, the stray light L' is effectively interrupted by the polarization element 20G.

TWENTY-FIFTH EMBODIMENT

FIG. 40 shows a part of the full color optical projector according to a twenty-fifth embodiment of the present invention, wherein those parts corresponding to the parts described previously are designated by the same reference numerals and the description thereof will be omitted.

Referring to FIG. 40, the optical projector of FIG. 40 is a modification of the embodiment of FIG. 38 in that the absorption-type polarization elements 21R and 21G are omitted from the construction of FIG. 38.

In the optical projector of FIG. 38, too, the stray light L' reflected by the reflection-type polarization element 20R experiences a 90°0 -rotation of the polarization plane as it passes through the retardation films λ/3 and λ/6 consecutively, and the stray light L' is effectively interrupted by the polarization element 20G. Of course, the retardation films λ/3 and λ/6 may be exchanged.

TWENTY-SIXTH EMBODIMENT

Figure 41A:
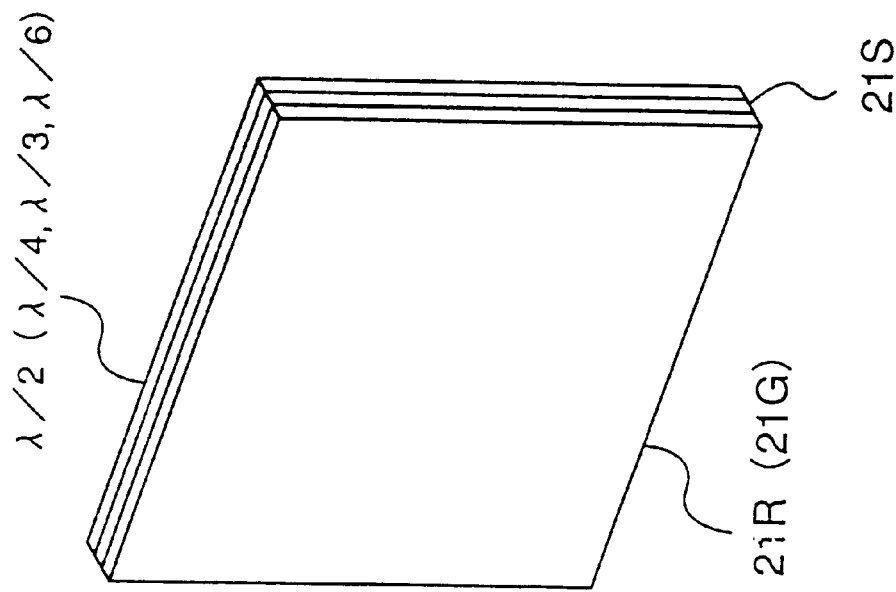
FIGS. 41A and 41B are diagrams showing the construction of polarizers used in an optical projector according to a twenty-sixth embodiment of the present invention.
Figure 41B:
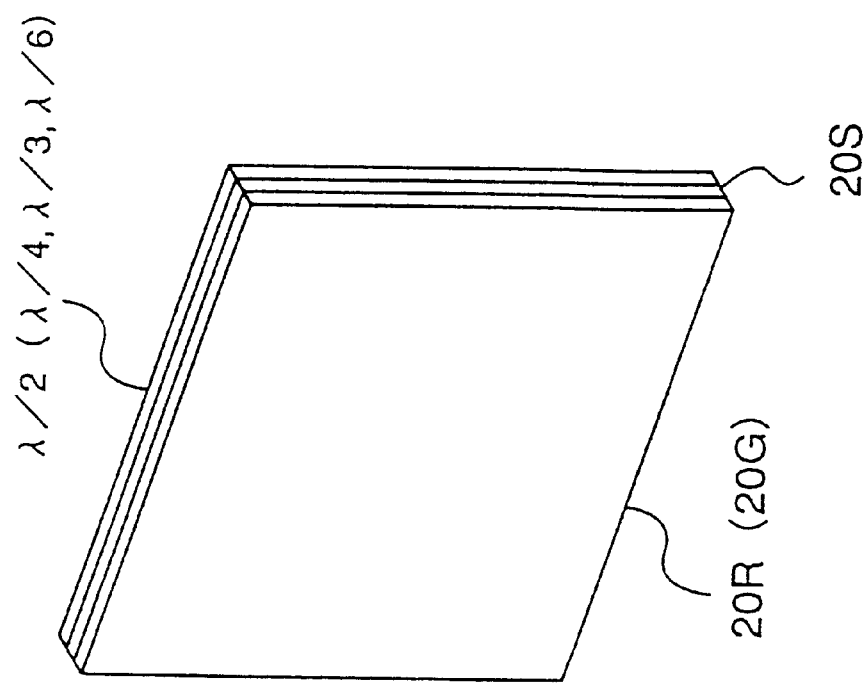

FIGS. 41A and 41B show the construction of a polarization element used in the full color optical projector according to a twenty-sixth embodiment of the present invention, wherein those parts corresponding to the parts described previously are designated by the same reference numerals and the description thereof will be omitted.

Referring to FIG. 41A showing one of the reflection-type polarization elements 20R and 20G, the polarization element is formed on a first side of a glass substrate 20S in an intimate contact therewith, and a retardation film, which may be any one that induces a retardation of λ/2, λ/3, λ/4 or λ/6, is formed on a second, opposite side of the glass substrate 20S also in an intimate contact therewith.

By forming the polarization element and the retardation film as such, the optical loss caused by the reflection at the interface is substantially reduced as compared with the case of the polarization element and the retardation film formed separately with an intervening space.

FIG. 41B shows the construction of the absorption-type polarization element, which may be any of the polarization elements 21R and 21G.

Referring to FIGS. 41B, the polarization element is formed also on the first side of the glass substrate 21S in an intimate contact therewith, similarly to the construction of FIG. 41A, and a retardation film, which may be any one that induces a retardation of λ/2, λ/3 , λ/4 or λ/6, is provided on the second side of the glass substrate 21S also in an intimate contact therewith.

The construction of FIG. 41B, too, is effective for reducing the optical loss caused by the reflection at the interface, as compared with the case where the polarization element and the retardation film are separated from each other by an intervening space.

TWENTY-SEVENTH EMBODIMENT

Figure 42B:
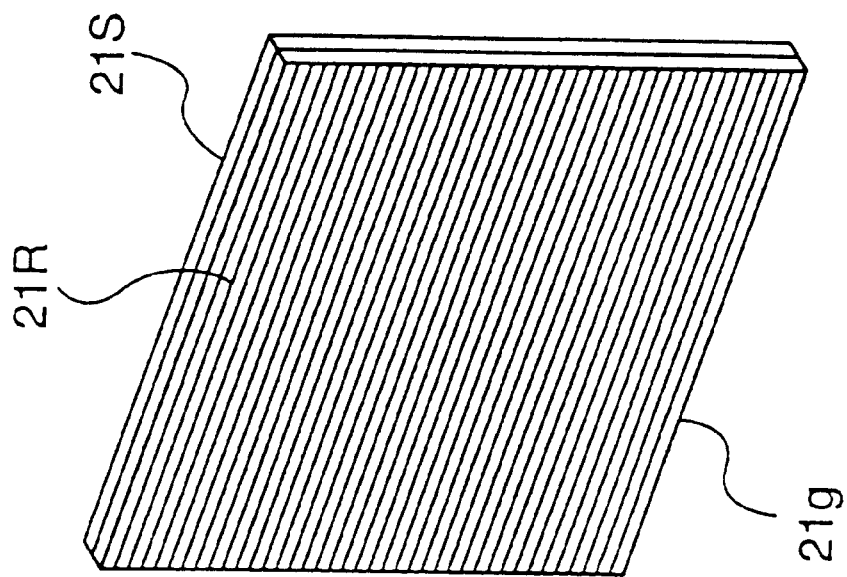
FIGS. 42A and 42B are diagrams showing the construction of polarizers used in an optical projector according to a twenty-seventh embodiment of, the present invention.
Figure 42A:
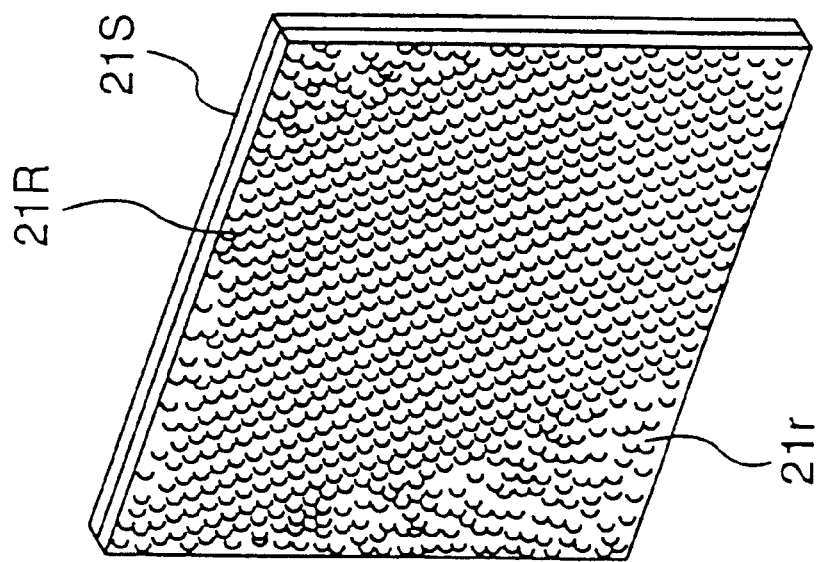

FIGS. 42A and 42B show the construction of the reflection-type polarization element 21R according to a twenty-seventh embodiment of the present invention, wherein those parts corresponding to the parts described previously are designated by the same reference numerals and the description thereof will be omitted.

Referring to FIG. 42A, the polarization element 21R is provided on the glass substrate 21S similarly to the embodiment of FIG. 41A, wherein it should be noted that the polarization element 21R of the present embodiment carries a number of irregular projections and depressions 21r on a reflection surface thereof, such that the reflection of the stray light L' occurs in random or irregular directions. As a result of such random or irregular reflection of the stray light L', the stray light L' enters the light valve 15G in a uniformly diffused state, while the projection of such a uniformly diffused stray light L' on the screen does not cause a problem.

FIG. 42B shows a modification of FIG. 42A, in which grooves 21g are formed uniformly over the polarization element 21R in place of the irregular projections and depressions 21r. In this case, too, the stray light L' is diffused more or less uniformly by the grooves 21g.

TWENTY-EIGHTH EMBODIMENT

Figure 43:
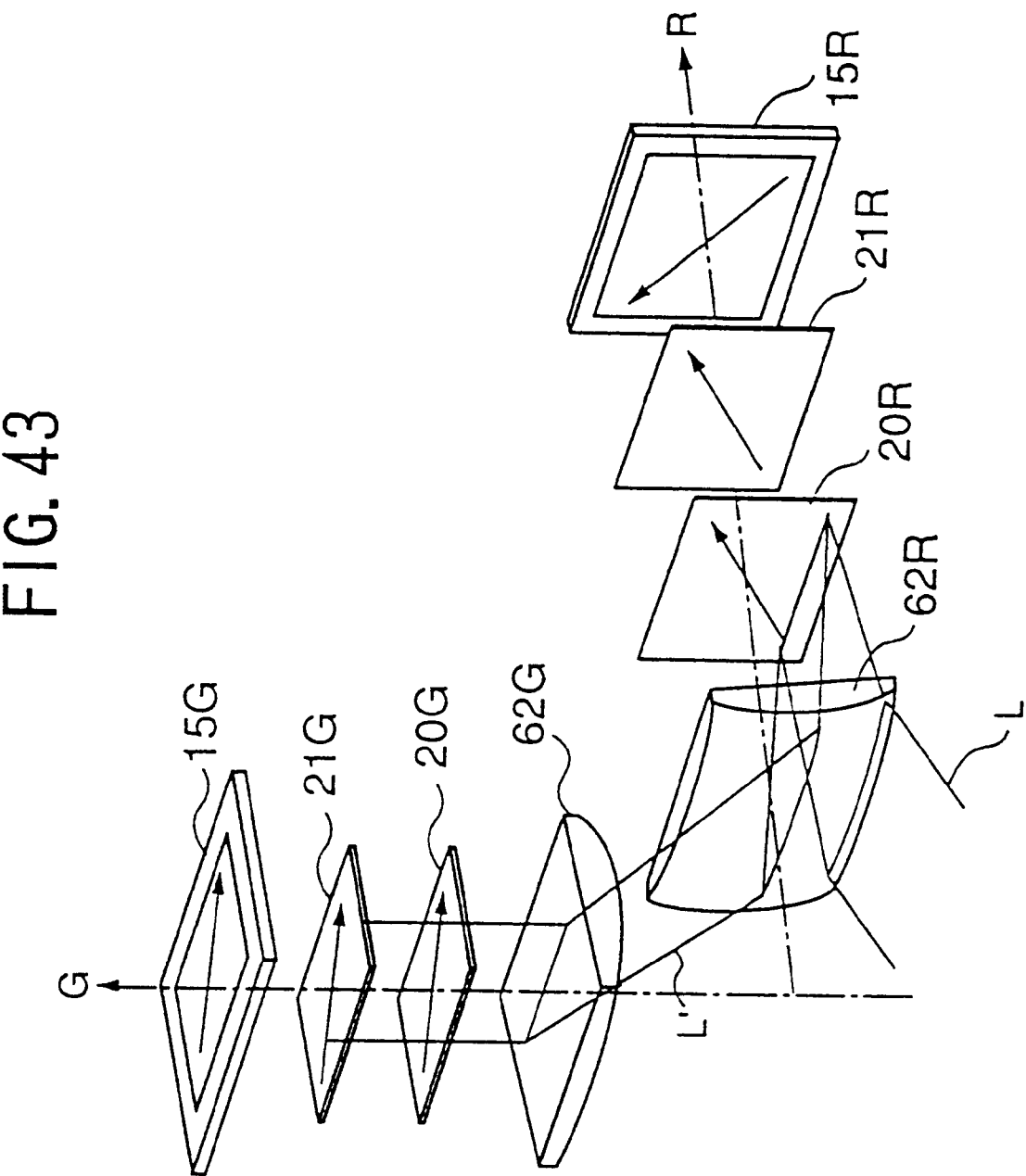
FIG. 43 is a diagram showing the construction of an optical projector according to a twenty-eighth embodiment of the present invention.

FIG. 43 shows a part of the full color optical projector according to a twenty-eighth embodiment of the present invention, wherein those parts corresponding to the parts described previously are designated by the same reference numerals and the description thereof will be omitted.

Referring to FIG. 43, the optical projector of the present embodiment has a construction similar to that of FIG. 25, except that the light valve 15R is rotated by 90° with respect to the light valve 15R of FIG. 25.

In such a construction, it should be noted that the polarization plane of the optical beam incident to the light valve 15R intersects perpendicularly to the transmission axis of the light valve 15R. Thus, the present embodiment, lacking any retardation film between the polarization element 21R and the light valve 15R, has to drive the light valve 15R in a reversal mode to the mode used in the embodiment of FIG. 25. Otherwise, the representation obtained on the screen would be reversed. For example, the light valve 15R of FIG. 43 may be driven in a normally black mode using a normally black mode signal when obtaining a normally white representation on the screen as in the case of FIG. 25.

In the present embodiment, too, the stray light L' is effectively interrupted.

TWENTY-NINTH EMBODIMENT

Figure 44:
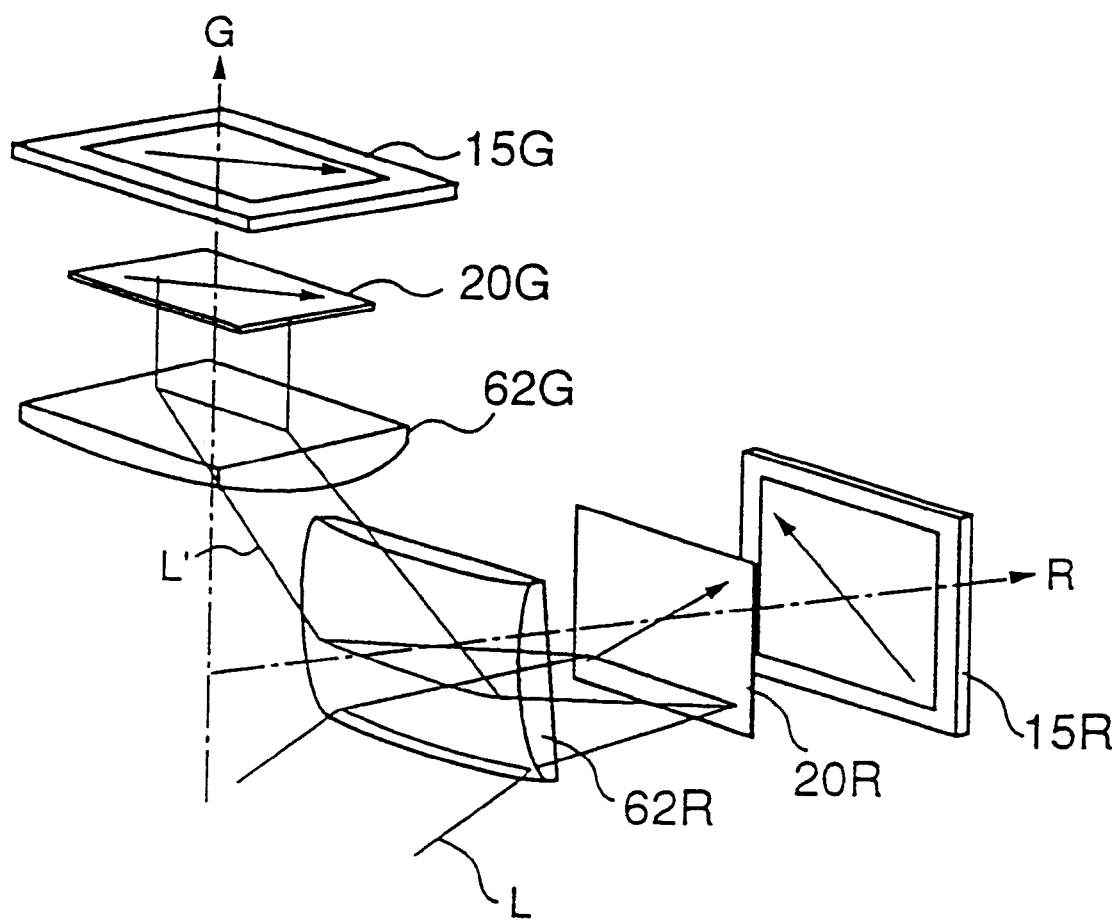
FIG. 44 is a diagram showing the construction of an optical projector according to a twenty-ninth embodiment of the present invention.

FIG. 44 shows a part of the full color optical projector according to a twenty-ninth embodiment of the present invention, wherein those parts corresponding to the parts described previously are designated by the same reference numerals and the description thereof will be omitted.

Referring to FIG. 44, the optical projector of the present embodiment is a modification of the embodiment of FIG. 43 in which the absorption-type polarization elements 21R and 21G are eliminated. Similarly to the embodiment of FIG. 43, the light valve 15R of the optical projector of the present embodiment is driven by a reversed drive signal such as the normally black mode drive signal.

As other aspects of the present embodiment are substantially identical with those of the embodiment of FIG. 43, further description will be omitted.

THIRTIETH EMBODIMENT

Figure 45A:
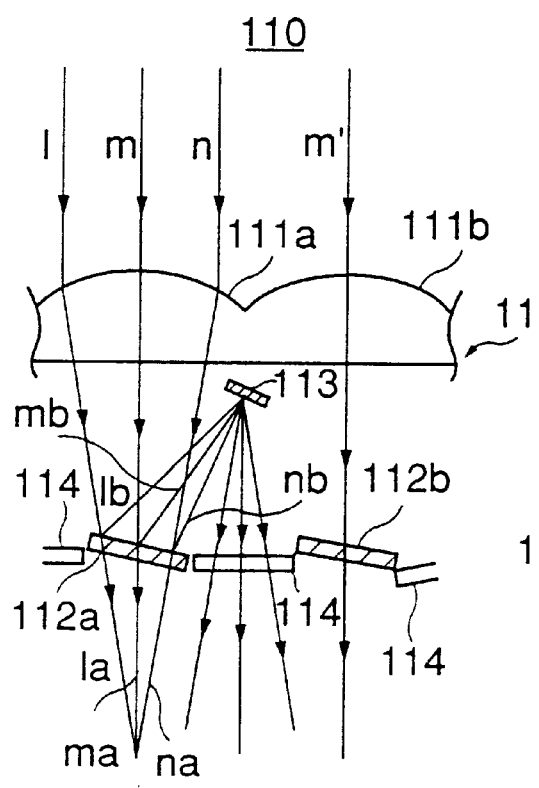
FIGS. 45A and 45B are diagrams showing the construction of a polarization processor according to a thirtieth embodiment of the present invention.

FIG. 45A shows the construction of a polarization processor 110 according to a thirtieth embodiment of the present invention.

In the preceding embodiments, it should be noted that only the polarization component that has passed through the reflection-type polarization element is used for the representation of images, while the polarization components that have been reflected by the reflection-type polarization element has been wasted. This means, that only one-half of the high-power optical source is used for the representation of the images.

The polarization processor 110 of the present embodiment includes an integral optical component 111 that in turn includes therein plano-convex lens elements 111a and 111b so as to intersect the optical paths of rays 1, m and n forming a part of an optical beam incoming from the optical source. Further, the polarization processor 110 includes reflection-type polarization elements 112a and 112b corresponding to the reflection-type polarization element 20 respectively on the optical paths of the optical beams focused by the lens elements 111a and 111b, wherein it should be noted that the reflection-type polarization elements 112a and 112b are provided with a tilting angle with respect to the optical axis of the lens element 111a or 111b.

In such an optical system that includes the lens elements 111a and 111b in the form of the optical component 111, it should be noted that there is inevitably formed an optically ineffective region, which none of the optical beams passed through any of the lens elements 111a and 111b can reach. Thus, in the optical processor 110 of the present embodiment, a mirror 113 is disposed in such an optically ineffective region for reflecting the unnecessary polarization components reflected by the reflection-type polarization element 112a.

The mirror 113 thus provided is adjusted so as to reflect the foregoing unnecessary polarization component to a window region defined between the adjacent reflection-type polarization elements 112a and 112b, and a half-wavelength retardation element 114 is disposed in such a window region so as to retard the phase of the optical beam passing therethrough by about a half-wavelength.

According to such a construction, the necessary polarization components 1a, ma and na included in the incident rays 1, m and n are passed freely through the reflection-type polarization element 111a, while the unnecessary polarization components 1b, mb and nb are deflected, after reflection by the polarization element 112a, by the mirror 113 toward the direction of the retardation element 114. Upon passage through the retardation element 114, the polarization plane of the unnecessary polarization components 1b, mb and nb experience a rotation by about 90°. In other words, the polarization plane of the unnecessary polarization components 1b, mb and nb are now set substantially coincident to the polarization plane of the necessary polarization components 1a, ma and na.

Thus, by using the polarization processor 110 in an optical representation device such as an optical projector, it becomes possible to use the substantially entire optical power of the optical beam produced by the optical source for the representation of images, and a bright, high-quality representation of images is achieved.

Figure 45B:
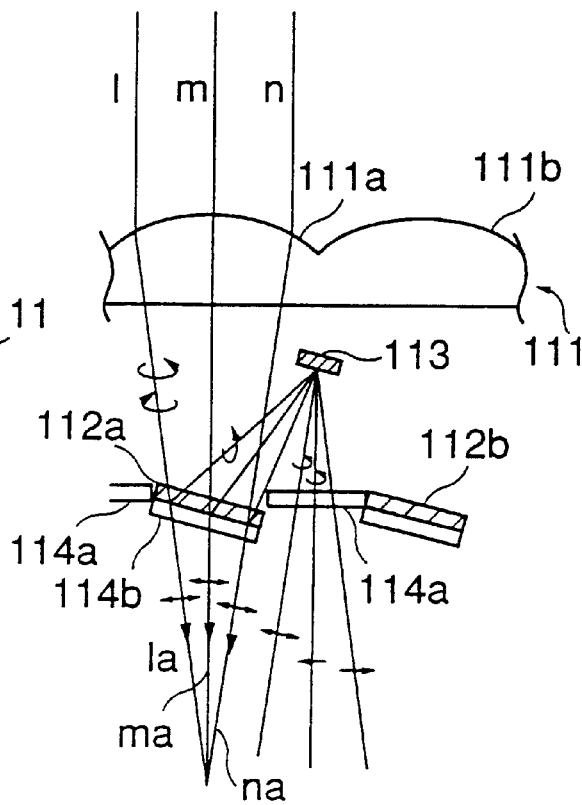

FIG. 45B shows a modification of the polarization processor 110.

Referring to FIG. 45B, there is provided a quarter-wavelength retardation element 114a that induces an optical retardation of about a quarter wavelength in the optical beam passing therethrough, in place of the foregoing half-wavelength retardation element 114. Further, another retardation element 114b is provided for rotating the polarization plane of the necessary polarization components passed through the reflection-type polarization elements 112a and 112b by about 90°. Thus, the construction of FIG. 45B also achieves the desired rotation of the polarization plane of the optical beam reflected by the polarization element 112a and passed through the retardation element 114a to be coincident to the polarization plane of the necessary polarization components 1a, ma and na passed through the polarization element 112a and the quarter-wavelength retardation element 114b.

THIRTY-FIRST EMBODIMENT

Figure 46:
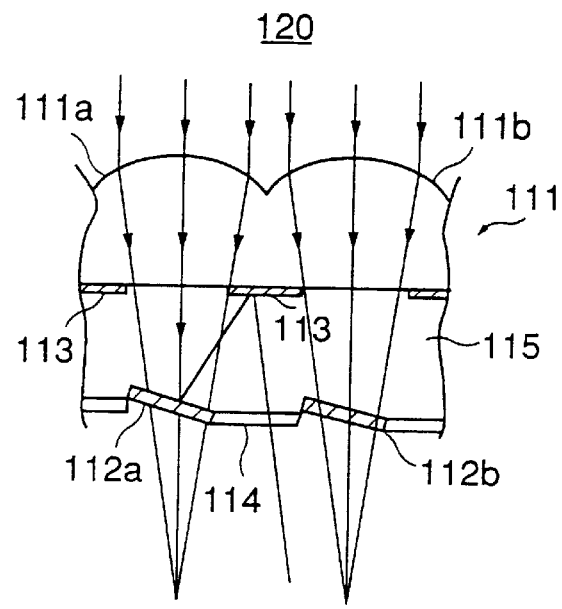
FIG. 46 is a diagram showing the construction. of a polarization processor according to a thirty-first embodiment of the present invention.
Figure 47:
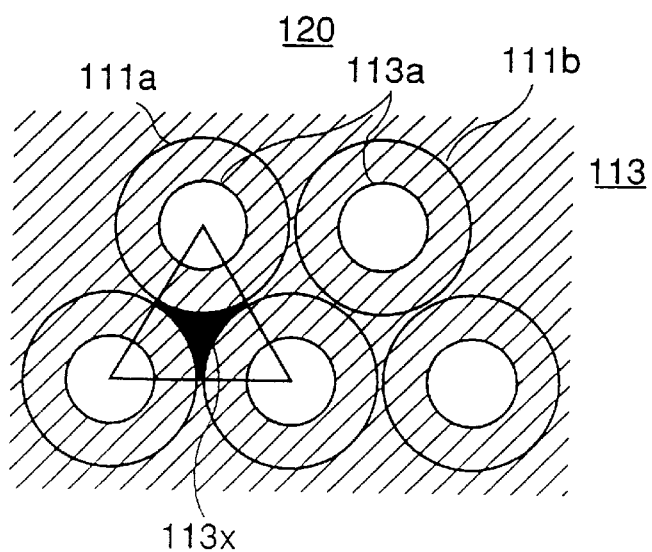
FIG. 47 is a another diagram showing the construction of the polarization processor of the thirty-first embodiment of the present invention.

FIGS. 46 and 47 show the construction of a polarization processor 120 according to a thirty-first embodiment of the present invention.

Referring to FIGS. 46 and 47, the mirror 113 is now held on a planar exit-side surface of the optical component 111 in which the plano-convex lens elements 111a and 111b are integrated, and the reflection-type polarization elements 112a and 112b are provided on a transparent substrate 115 disposed at the foregoing exit-side of the optical component 111. Thereby, the reflection-type polarization elements 112a and 112b are tilted on the transparent substrate 115 with an optimum angle with respect to the optical axis of the lens 111a or 111b such that the unnecessary polarization components reflected by the reflection-type polarization elements 112a and 112b pass through the foregoing half-wavelength retardation element 114 after being reflected by the mirror 113.

In the construction of the present embodiment, it should be noted that the flat exit-side surface of the optical component 111 is covered by a reflection coating forming the mirror 113 as indicated in FIG. 47, and a plurality of openings or pin-holes 113a are formed in the mirror 113 in correspondence to the optical paths of the optical beams focused by the lens elements 111a and 111b. In such a construction, the optical component 111 and the mirror 113 are formed as an integral body, and the fabrication of the polarization processor 120 is facilitated substantially. As indicated in FIG. 47, the lens elements 111a, 111b, . . . are formed in a so-called "closest packed arrangement," and the area of the optically ineffective region 113X is minimized. In other words, the lens arrangement of FIG. 47 provides a maximum optical efficiency.

THIRTY-SECOND EMBODIMENT

Figure 48:
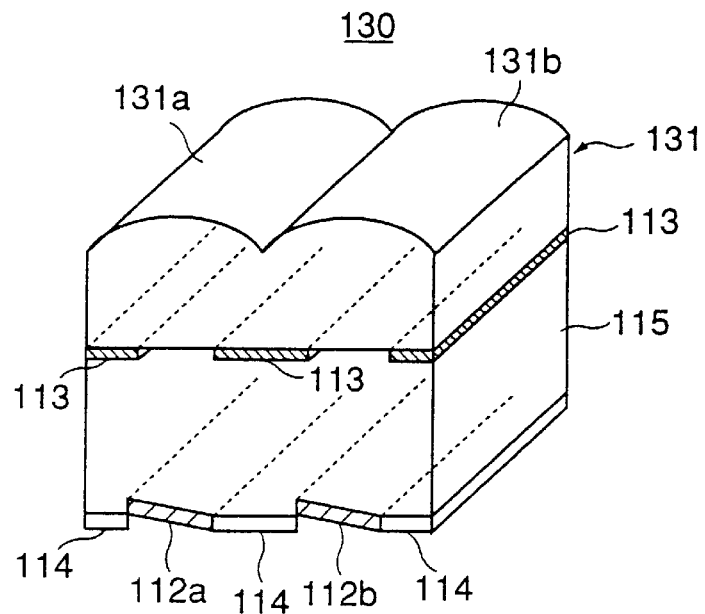
FIG. 48 is a diagram showing the construction of a polarization processor according to a thirty-second embodiment of the present invention.

FIG. 48 shows the construction of a polarization processor 130 according to a thirty-second embodiment of the present invention, wherein those parts corresponding to the parts described previously are designated by the same reference numerals and the description thereof will be omitted.

Referring to FIG. 48, the polarization processor 130 is a modification of the polarization processor 120 of FIG. 46 and uses an optical component 131 that includes therein plano-convex cylindrical lens elements 131a and 131b in place of the optical component 111. The plano-convex cylindrical lens elements 131a and 131b extend parallel with each other, and the mirror 113 is provided on the flat exit-side surface of the optical component 130 in the form of corresponding stripe-shaped patterns. Thus, the mirror pattern 113 is provided in correspondence to the elongated optically ineffective region formed by the cylindrical lens elements 131a and 131b. Further, the reflection-type polarization elements 112a and 112b are formed also in the form of parallel stripes in correspondence to the optical paths of the optical beams focused by the cylindrical lens elements 131a and 131b. In correspondence to the stripe-shaped mirror 113, the quarter-wavelength retardation element 114 on the transparent substrate 115 is provided also in the form of a stripe pattern. Thereby, the reflection-type polarization elements 112a and 112b are tilted with an optimum angle such that the unnecessary polarization components reflected by the reflection-type polarization elements 112a and 112b hit the mirror 113 and pass through the quarter-wavelength retardation element 114 after reflection at the mirror 113.

THIRTY-THIRD EMBODIMENT

Figure 49:
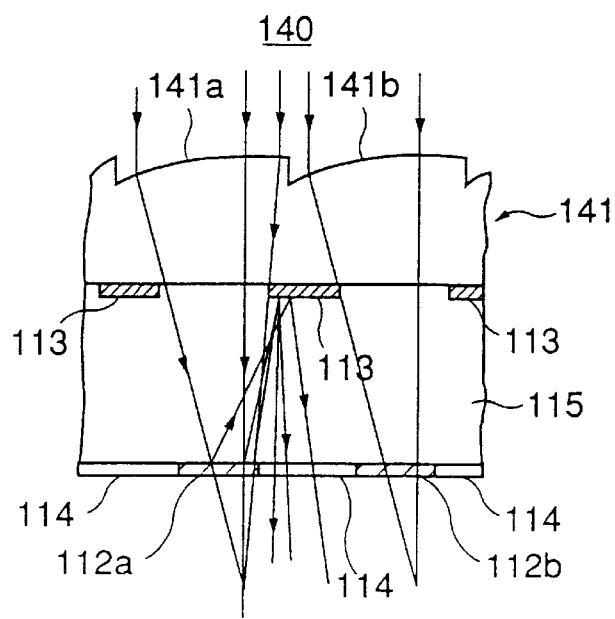
FIG. 49 is a diagram showing the construction of a polarization processor according to a thirty-third embodiment of the present invention.

FIG. 49 shows the construction of a polarization processor 140 according to a thirty-third embodiment of the present invention, wherein those parts corresponding to the parts described previously are designated by the same reference numerals and the description thereof will be omitted.

Referring to FIG. 49, the polarization processor 140 is a modification of the polarization processor 130 of FIG. 48 and uses an optical component 141 including asymmetric cylindrical lens elements 141a and 141b in place of the optical component 131 that includes the symmetric cylindrical elements 131a and 131b, wherein it should be noted that each of the lens elements 141a and 141b is formed of only one-half part of the cylindrical lens element 131a or 131b with respect to the optical axis thereof. Thus, the cylindrical lens element 141a or 141b is asymmetric with respect to the optical axis and the optical beam incident thereto is focused obliquely. Thereby, the unnecessary polarization components reflected by the reflection-type polarization element 112a hit the mirror 113 even when the reflection-type polarization elements 112a and 112b are not tilted with respect to the foregoing optical axis. The unnecessary optical components thus hit the mirror 113 are then caused to pass through the quarter wavelength retardation element 114 disposed between the polarization elements 112a and 112b.

As the reflection-type polarization elements 112a and 112b are not tilted, the fabrication of the polarization processor 140 is further facilitated as compared with the case of the polarization processor 130.

THIRTY-FOURTH EMBODIMENT

Figure 50:
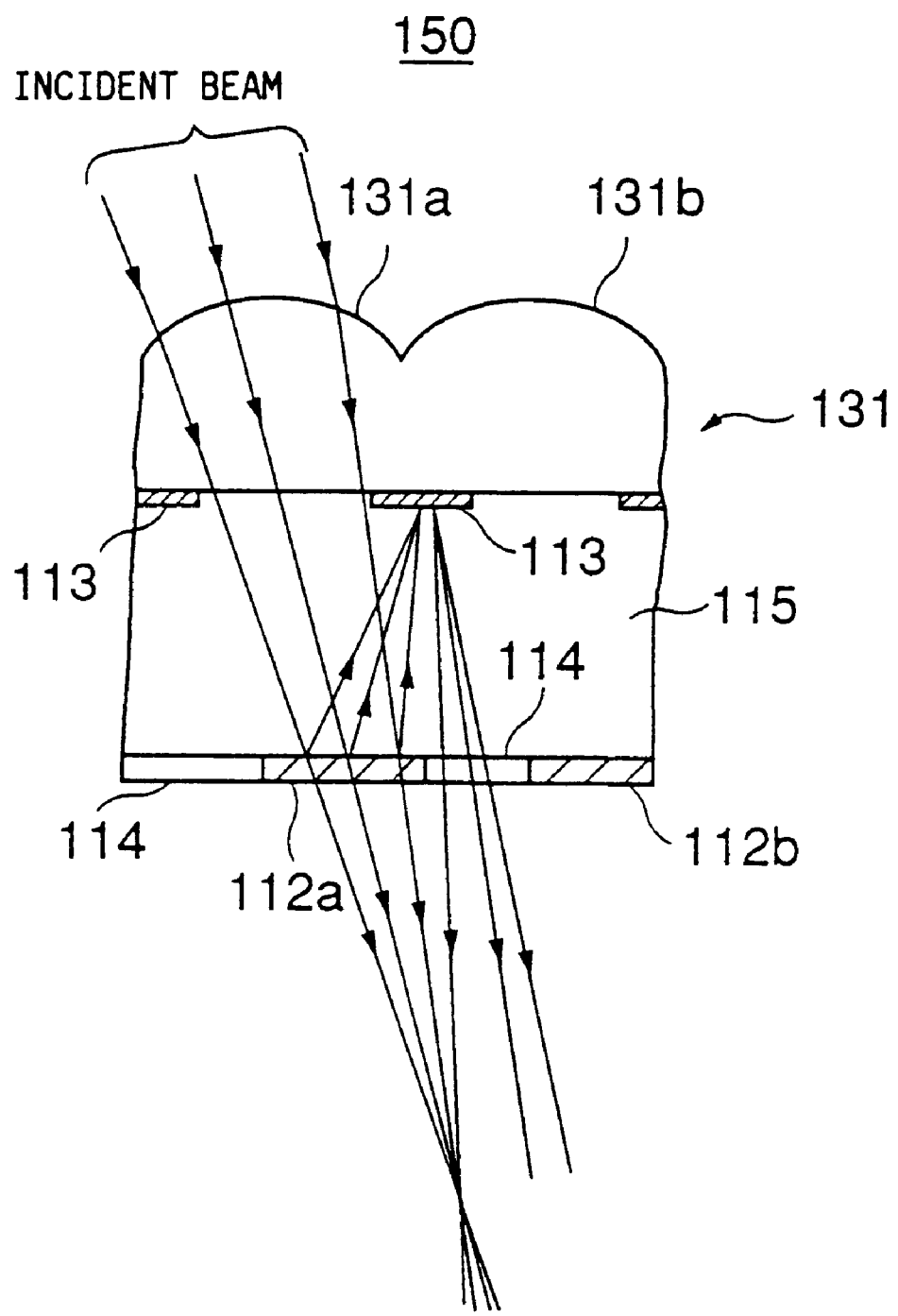
FIG. 50 is a diagram showing the construction of a polarization processor according to a thirty-fourth embodiment of the present invention.

FIG. 50 shows the construction of a polarization processor 150 according to a thirty-fourth embodiment of the present invention, wherein those parts corresponding to the parts described previously are designated by the same reference numerals and the description thereof is eliminated.

Referring to FIG. 50, the polarization processor 150 has a construction similar to that of the polarization processor 130 of FIG. 48, except that the lens elements 131a and 131b are provided with a tilting angle with respect to the optical path of the incident optical beam. Further, the reflection-type polarization elements 112a and 112b are provided on the transparent substrate 115 perpendicularly to the optical axes of the lens elements 131a and 131b.

In such a construction, the incident optical beam comes in obliquely to the optical axes of the elements 131a and 131b even when the tilting angle of the reflection-type polarization elements 112a and 112b is zero. Thereby, the unnecessary polarization components reflected by the reflection-type polarization elements 112a and 112b are caused to pass through the quarter-wavelength element 114 after reflection by the mirror 113.

THIRTY-FIFTH EMBODIMENT

Figure 51:
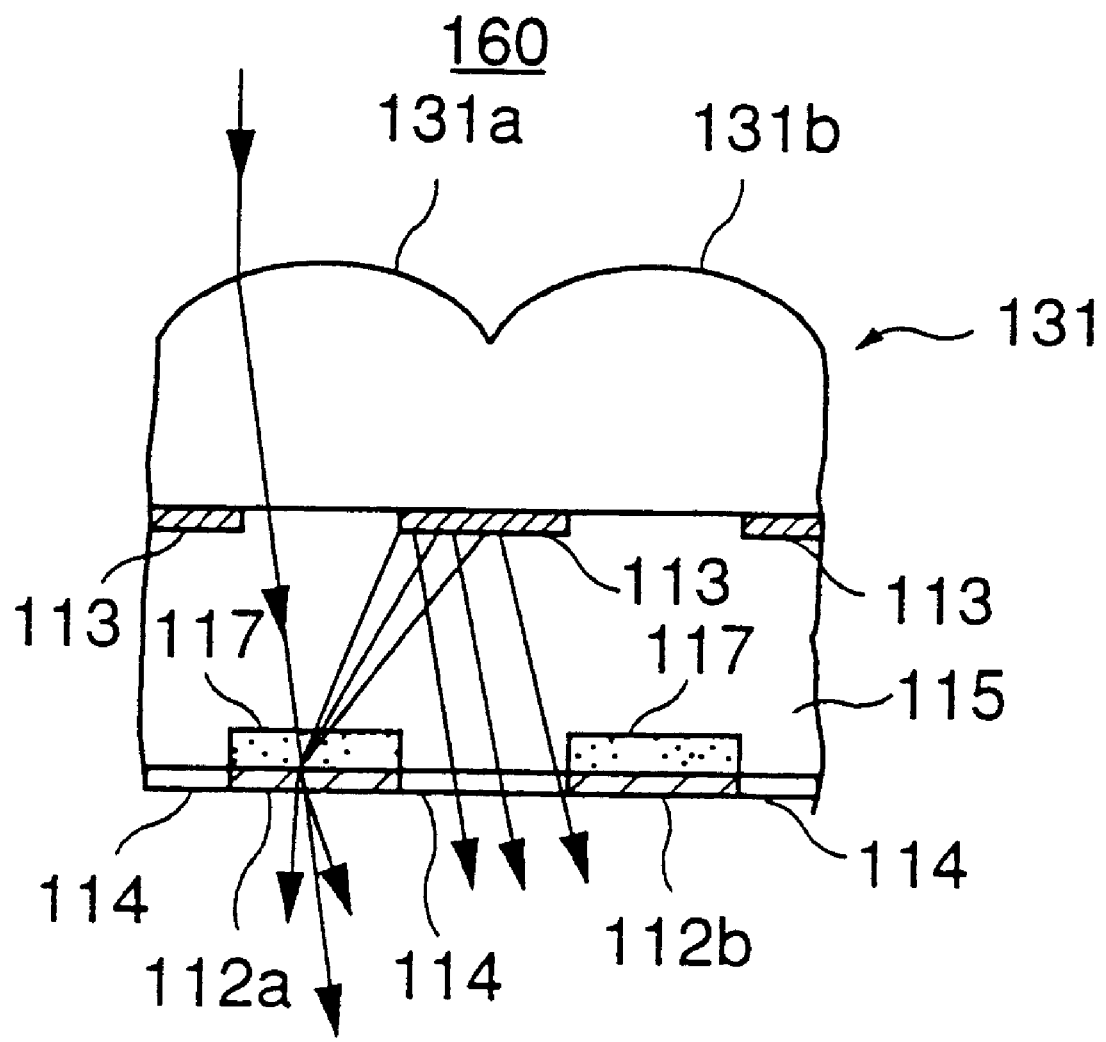
FIG. 51 is a diagram showing the construction of a polarization processor according to a thirty-fifth embodiment of the present invention.

FIG. 51 shows the construction of a polarization processor 160 according to a thirty-fifth embodiment of the present invention, wherein those parts corresponding to the parts described previously are designated by the same reference numerals and the description thereof will be omitted.

Referring to FIG. 51, the polarization processor 160 has a construction similar to that of the polarization processor 150 of FIG. 50 except that an optical scattering element 117 is provided on each of the reflection-type polarization elements 112a and 112b. By providing the scattering elements 117, the unnecessary polarization components 112a and 112b are directed to the mirror 113 and hence to the quarter-wavelength retardation element 114 with reliability.

THIRTY-SIXTH EMBODIMENT

Figure 52:
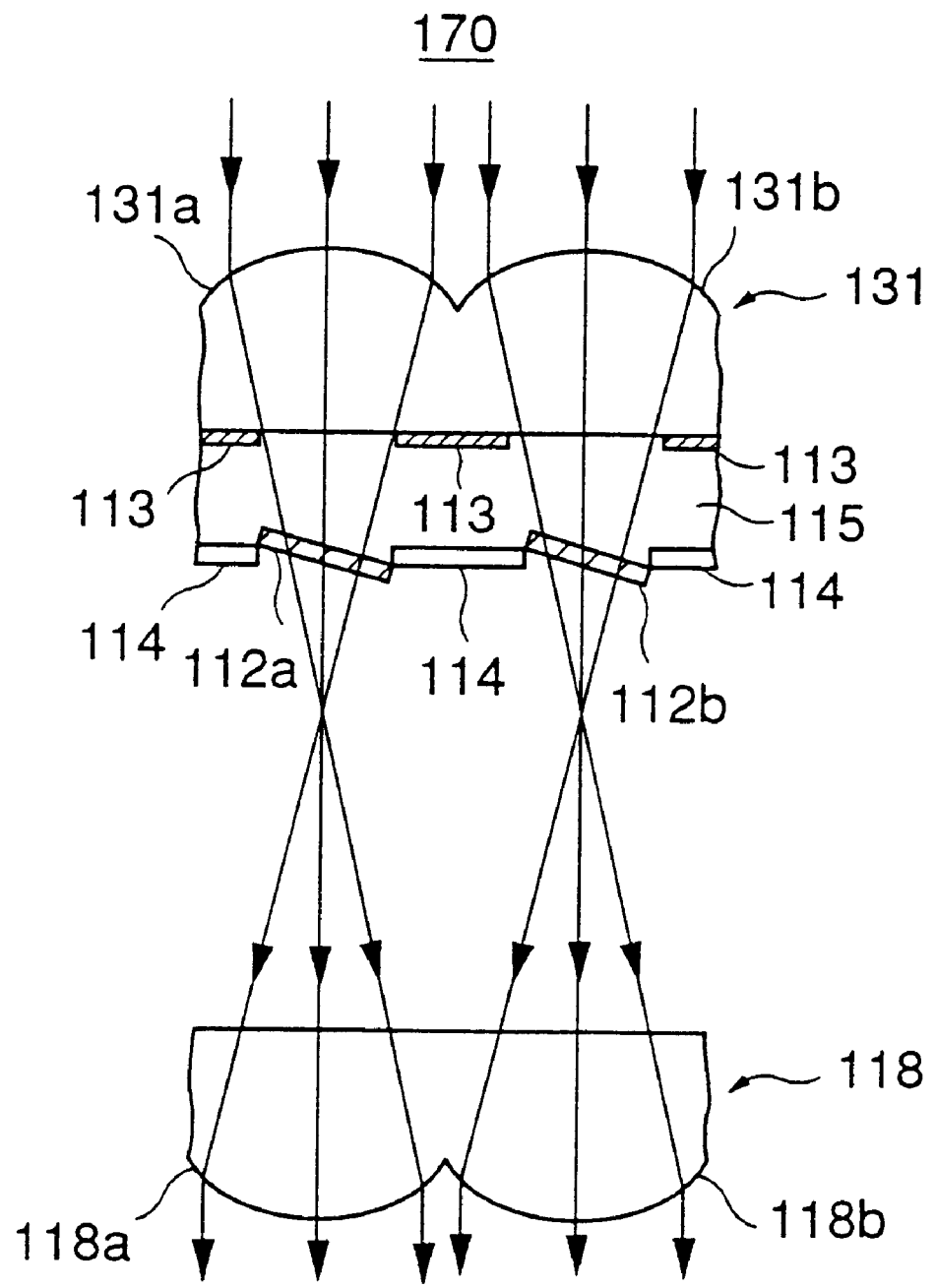
FIG. 52 is a diagram showing the construction of a polarization processor according to a thirty-sixth embodiment of the present invention.

FIG. 52 shows the construction of a polarization processor 170 according to a thirty-sixth embodiment of the present invention, wherein those parts corresponding to the parts described previously are designated by the same reference numerals and the description thereof will be omitted.

Referring to FIG. 52, the polarization processor 170 has a construction similar to that of the polarization processor 130 of FIG. 48, except that an optical component 118 including therein lens elements 118a and 118b as an integral part thereof, is disposed such that the lens elements 118a and 118b are aligned respectively on the optical paths of the optical beams passed through the lens elements 131a and 131b.

By disposing the optical component 118, the optical beam exiting the polarization processor 170 are converted more or less to a parallel optical beam. A similar construction is applicable alto to the polarization processor 120 of FIG. 46 that uses the array 111 of ordinary plano-convex lenses in place of the cylindrical lenses.

THIRTY-SEVENTH EMBODIMENT

Figure 53:
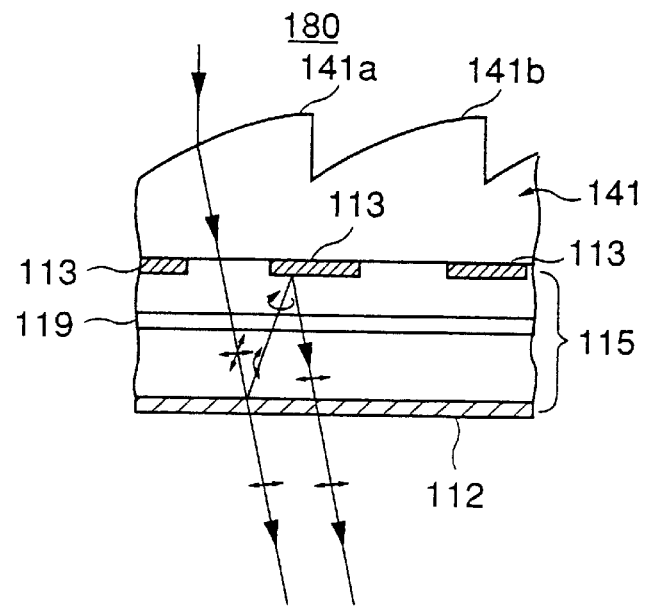
FIG. 53 is a diagram showing the construction of a polarization processor according to a thirty-seventh embodiment of the present invention.

FIG. 53 shows the construction of a polarization processor 180 according to a thirty-seventh embodiment of the present invention, wherein those parts corresponding to the parts described previously are designated by the same reference numerals and the description thereof will be omitted.

Referring to FIG. 53, the polarization processor 180 is a modification of the polarization processor 140 of FIG. 49, wherein it should be noted that the reflection-type polarization element 112 continuously covers the bottom surface or exit-side surface of the transparent substrate 115 without interruption, and the substrate 115 further includes therein a quarter-wavelength retardation element 119 in the form of a film such that the retardation element 119 extends continuously in a parallel relationship to the reflection-type polarization element 112.

In such a construction, it should be noted that the optical beam incident to the lens element 141a and reflected by the reflection-type polarization element 112 is converted to a circularly polarized beam upon passage through the quarter-wavelength element 119 toward the mirror 113. The circularly polarized beam thus formed is further converted to a linearly polarized beam upon passage through the retardation element 119 for the second time toward the reflection-type polarization element 112 after being reflected by the mirror 113, wherein the linearly polarized beam thus obtained has a polarization plane rotated by about 90° with respect to the initial polarization plane and passes through the reflection-type polarization element 112.

The polarization processor 180 of FIG. 53 is particularly advantageous for reducing the cost owing to the simple construction.

THIRTY-EIGHTH EMBODIMENT

Figure 54A:
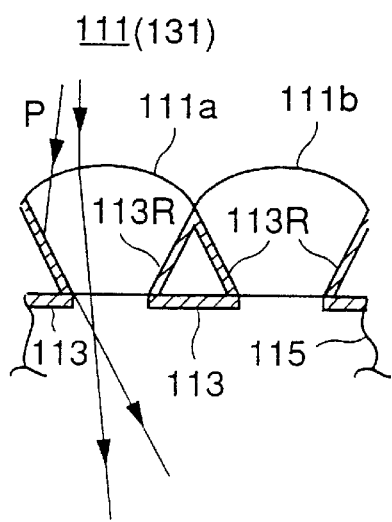
FIGS. 54A and 54B are diagrams showing a part of the polarization processor according to a thirty-eighth embodiment of the present invention.
Figure 54B:
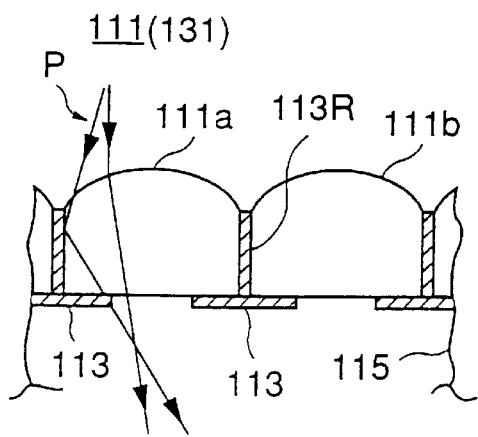

FIGS. 54A and 54B show a modification of the optical component 111 according to a thirty-eighth embodiment of the present invention.

Referring to FIGS. 54A and 54B, each of the plano-convex lens elements 118a and 118b forming the optical component 111 has a side wall covered by a reflective coating that forms a continuation of the mirror 113, wherein the reflective coating thus formed reduces the optical beam components or rays that otherwise would reach the optically ineffective region and interrupted by the mirror 113.

In the construction of FIG. 54A, the side walls of the lens elements 118a and 118b are tilted, and the construction is thought more effective for reducing the rays interrupted by the mirror 113 in the optically ineffective region as compared with the construction of FIG. 54B in which the side walls are vertical, while the construction of FIG. 54B is far easier to fabricate.

It should be noted that the construction of FIG. 54A or 54B for covering the side walls of the lens elements by a reflective coating is applicable also to the optical component 131 that includes a cylindrical lens array.

THIRTY-NINTH EMBODIMENT

Figure 55:
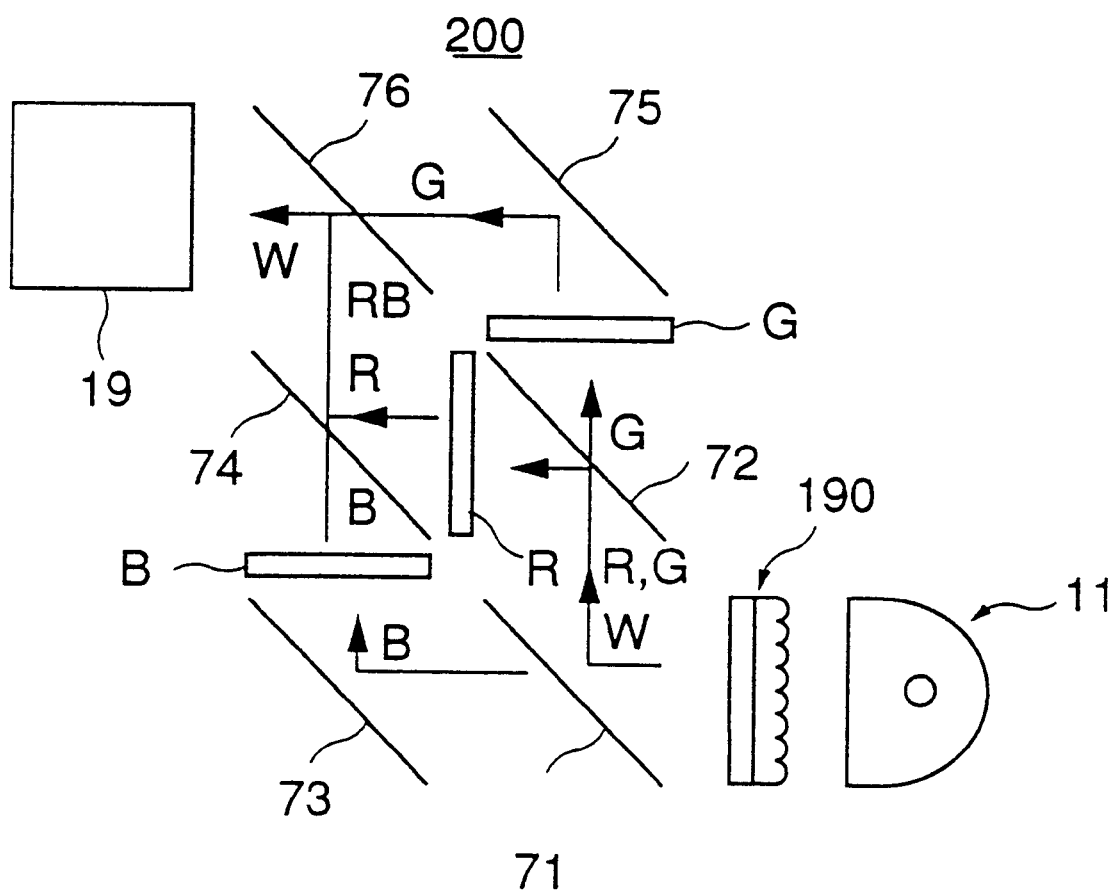
FIG. 55 is a diagram showing the construction of a polarization processor according to a thirty-ninth embodiment of the present invention.

FIG. 55 is a diagram showing the construction of an optical projector 200 according to a thirty-ninth embodiment of the present invention in which a polarization processor 190, which may be any of the polarization processors 110–180, is used in combination with the optical projector 70 described previously with reference to FIG. 15. Thus, those parts corresponding to the parts described previously are designated by the same reference numerals and the description thereof will be omitted.

Referring to FIG. 55, the polarization processor 190 is disposed at the exit side of the polarization processor 190 between the optical source 11 and the dichroic mirror 71. By disposing the polarization processor 190 in this manner, substantially the entire optical energy produced by the optical source 11 is converted to the optical beam having the predetermined, desired polarization plane. Thereby, the luminance of the image that is projected on a screen not illustrated by the projection optical system 19 is improved significantly.

As other aspects of the construction of FIG. 55 is apparent from the previous explanation, further description will be omitted. In FIG. 55, it should be noted that each of the light valves 15R, 15G and 15B includes an incident-side polarization element and an exit-side polarization element, wherein the polarization plane of the incident-side polarization element is set coincident to the polarization plane of the polarized optical beam produced by the polarization processor 190.

FORTIETH EMBODIMENT

Figure 56:
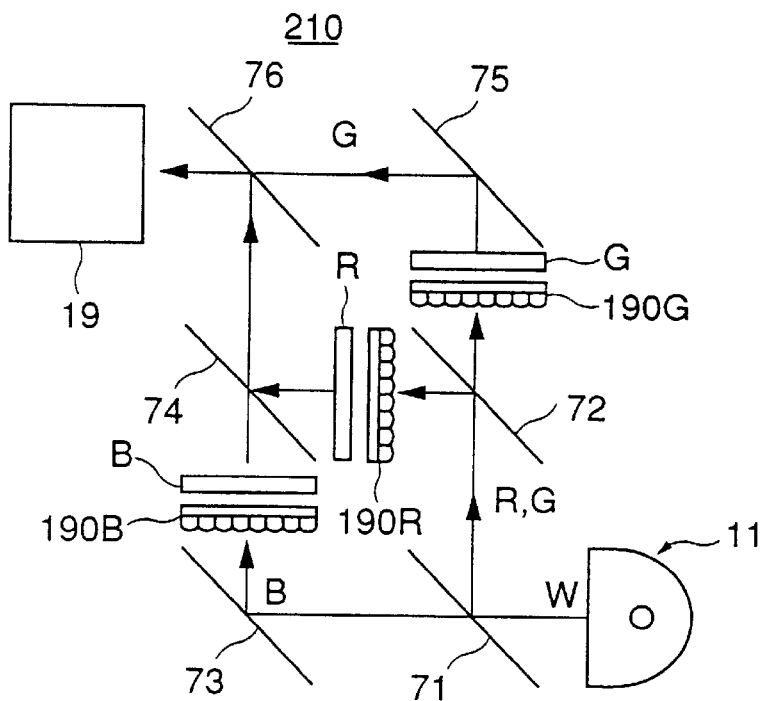
FIG. 56 is a diagram showing the construction of an optical projector according to a fortieth embodiment of the present invention.

FIG. 56 shows the construction of an optical projector 210 according to a fortieth embodiment of the present invention, wherein those parts corresponding to the parts described previously are designated by the same reference numerals and the description thereof will be omitted.

Referring to FIG. 56, the optical projector 210 has a construction similar to that of the optical projector 200 except that each of the light valves 15R, 15G and 15B carry corresponding polarization processors 190R, 190G and 190B respectively. In such a construction, the polarized optical beam produced by a polarization processor such as the polarization processor 190R impinges directly to the corresponding light valve 15R, and thus, it is possible to eliminate the incident side polarization element of the light valve.

As other aspects of the present embodiment is apparent from the previous explanation, further description will be omitted.

FORTY-FIRST EMBODIMENT

In the description heretofore, the description of the polarization processor has been made in relation to an optical projector. However, the application of the polarization processor that uses a reflection-type polarization element is by no means limited to such a high-power optical projector but is effective also in a liquid crystal display device of the direct-view type for increasing the brightness of the display.

Figure 57:
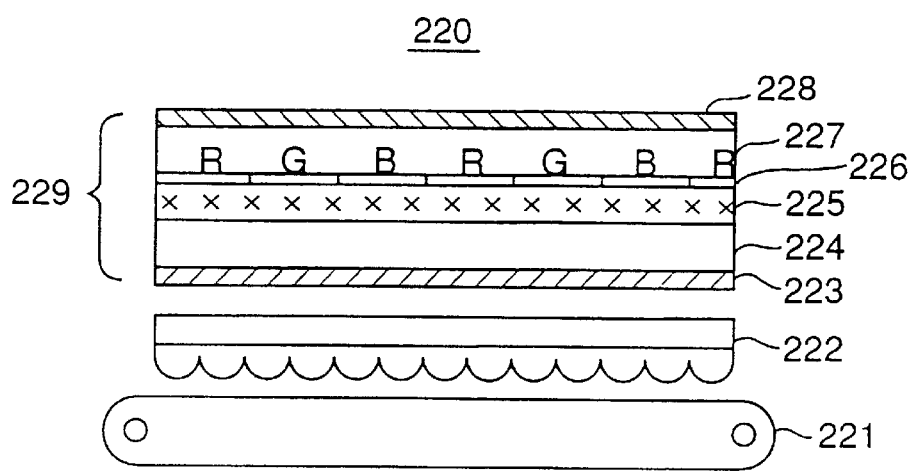
FIG. 57 is a diagram showing the construction of a direct-view-type liquid crystal display device according to a forty-first embodiment of the present invention.

FIG. 57 shows the construction of a direct-view type liquid crystal display device 220 that uses the polarization processor of the present invention.

Referring to FIG. 57, the liquid crystal display device 220 includes a planar light source 221 and a liquid crystal panel 229 disposed so as to face the planar light source 221, wherein the liquid crystal panel 229 includes a pair of opposing glass substrates 224 and 227 that sandwich a liquid crystal layer 225 therebetween. Further, a polarizer 223 is provided on the surface of the lower glass substrate 224 that faces the planar light source 221, while an analyzer 228 is provided on the upper glass substrate 227. The analyzer 228 has an absorption axis perpendicular to the absorption axis of the polarizer 223 as usual in the art. Further, the substrate 227 carries, on the surface that faces the liquid crystal layer 225, an array of color filters 226. Further, the glass substrates 224 and 227 carry, on the surface thereof that face the confined liquid crystal layer 225, various molecular alignment films and electrodes as usual in the art.

It should be noted that the liquid crystal display device 220 of FIG. 57 further includes a polarization processor 222, which may be any of the polarization processors 110–180, between the planar light source 221 and the liquid crystal panel 229, wherein the transmission axis of the polarizer 223 is set so as to be coincident to the polarization plane of the optical beam from the polarization processor 222 perpendicularly. As a result, substantially entire optical energy of the planar optical source 221 is converted to the polarized optical beam having the polarization plane coincident to the transmission axis of the polarizer 223, and the brightness of representation of the liquid crystal display device is improved significantly.

FORTY-SECOND EMBODIMENT

Figure 58:
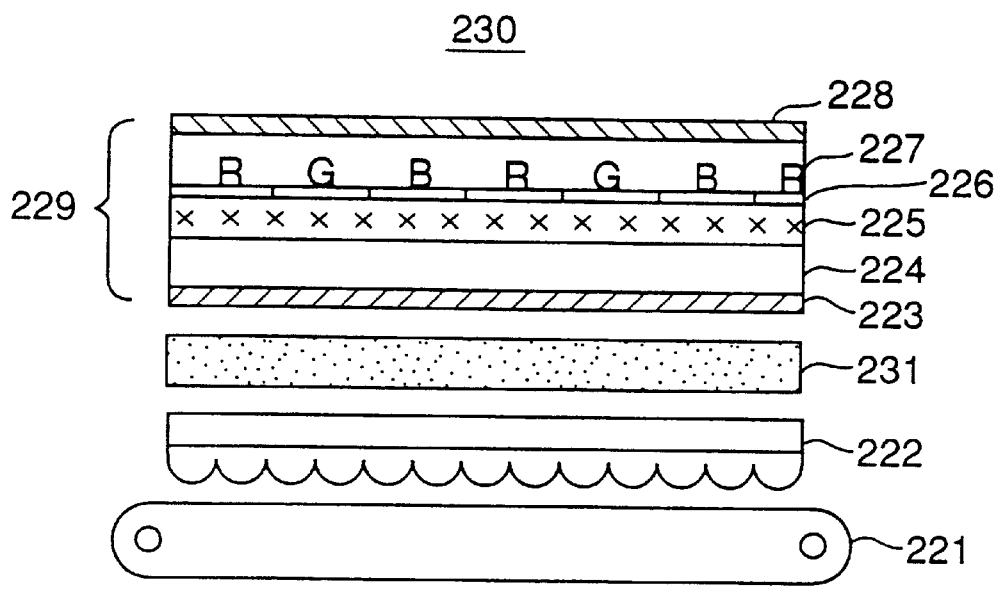
FIG. 58 is a diagram showing the construction of a direct-view-type liquid crystal display device according to a forty-second embodiment of the present invention.

FIG. 58 shows the construction of a direct-view-type liquid crystal display device 230 according to a forty-second embodiment of the present invention, wherein those parts corresponding to the parts described previously are designated by the same reference numerals and the description thereof will be omitted.

Referring to FIG. 58, the liquid crystal display device 230 has a construction similar to that of the liquid crystal display device 220 of FIG. 57 except that a scatter plate 231 is disposed between the polarization processor 222 and the liquid crystal panel 229 for causing a scattering in the polarized optical beam produced by the polarization processor 222. By providing the scattering plate 231, a uniform illumination of the liquid crystal panel 229 is facilitated.

In any of the direct-view-type liquid crystal display devices 220 and 230, the improvement of the brightness, achieved as a result of the polarization processor 222, in turn allows the use of an optical source of smaller optical power, while the use of such a smaller optical source allows an increased duration of operation, when the liquid crystal display device is used for a portable information processing apparatus, while using a limited battery power.

FORTY-THIRD EMBODIMENT

In any of the foregoing embodiments, there can be a case in which the reflection-type polarization elements, formed of a stacking of liquid crystal layers, suffer from a deterioration of the organic liquid crystal layers caused by a ultraviolet component contained in the incident optical beam. This problem becomes particularly conspicuous when the reflection-type polarization is used against a high power optical source such as a W lamp.

Figure 59:
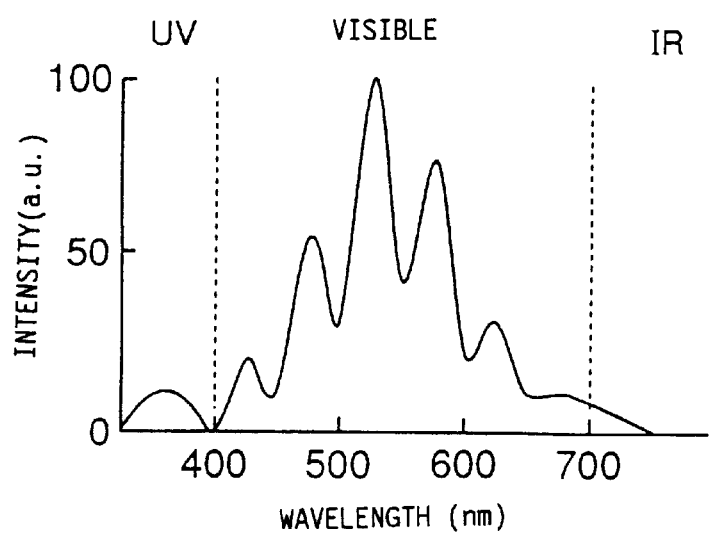
FIG. 59 is a diagram showing the spectrum of a while beam emitted from a conventional optical source.

FIG. 59 shows the spectrum of a W lamp.

Referring to FIG. 59, it will be noted that the spectrum of the W lamp includes ultraviolet components designated by UV in the wavelength range of about 400 nm or shorter, visible components in the wavelength range between 400 nm and 700 nm, and infrared components designated by IR in the wavelength range of about 700 nm or longer, the proportion of the UV components reaches as much as several percents.

Figure 60:
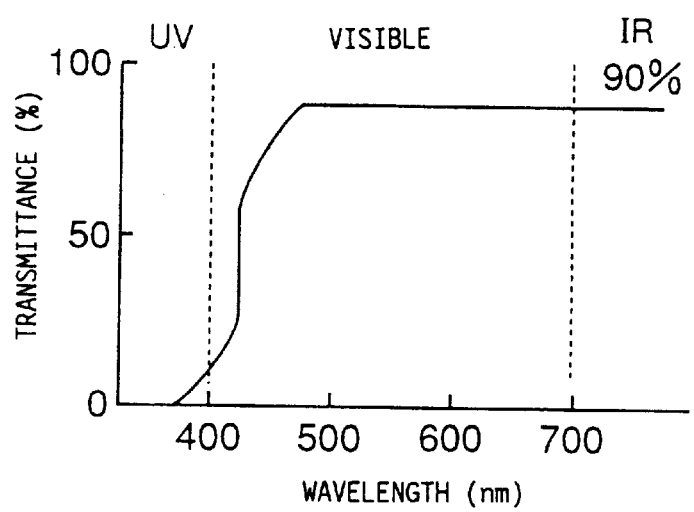
FIG. 60 is a diagram showing the characteristics of a ultraviolet-cut filter.

Thus, the present embodiment uses a UV(ultraviolet)-cut filter having a transmission spectrum shown in FIG. 60 between the optical source and the reflection-type polarization element for eliminating the UV-components, wherein the UV-cut filter eliminates more than 99% of the UV-components by reflection. The UV-cut filter may have a multilayered structure in which an $SiO_2$ film and an $Al_2O_3$ film are stacked alternately. As a result of the use of the UV-cut filter, the amount of the UV-components passed through the UV-cut filter is suppressed below 1%.

Figure 61:
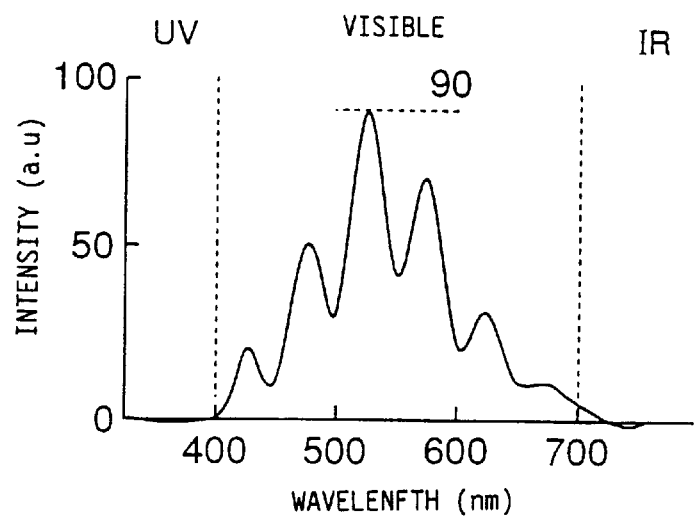
FIG. 61 is a diagram showing the spectrum obtained when the white optical beam of FIG. 59 is processed by the ultraviolet-cut filter of FIG. 60.

FIG. 61 shows the spectrum of the optical beam produced by the W lamp with the spectrum of FIG. 59 and processed by the UV-cut filter of FIG. 60. As is shown clearly in FIG. 61, the optical beam passed through the UV-cut filter is substantially free from the UV-components. Further, it should be noted that the transmission characteristics of a multilayered filter is not affected by the polarization of the incident optical beam.

Figure 62:
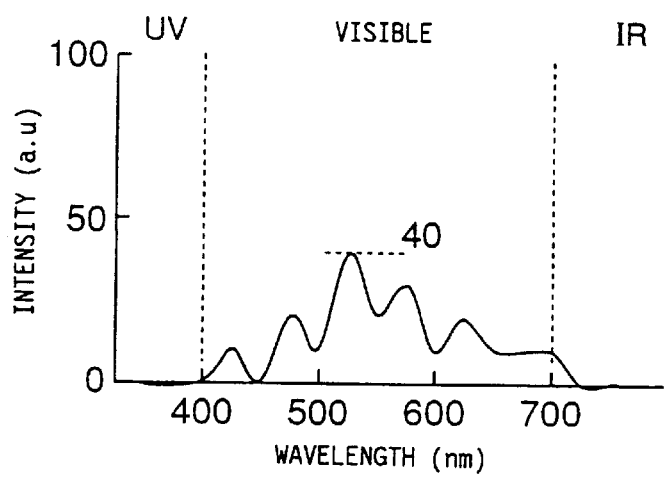
FIG. 62 is a diagram showing the spectrum obtained when the optical beam having the spectrum of FIG. 59 is passed through a reflection-type polarization element.

Further, FIG. 62 shows the spectrum obtained when the optical beam having the spectrum of FIG. 61 is passed through a reflection-type polarization element.

Figure 63:
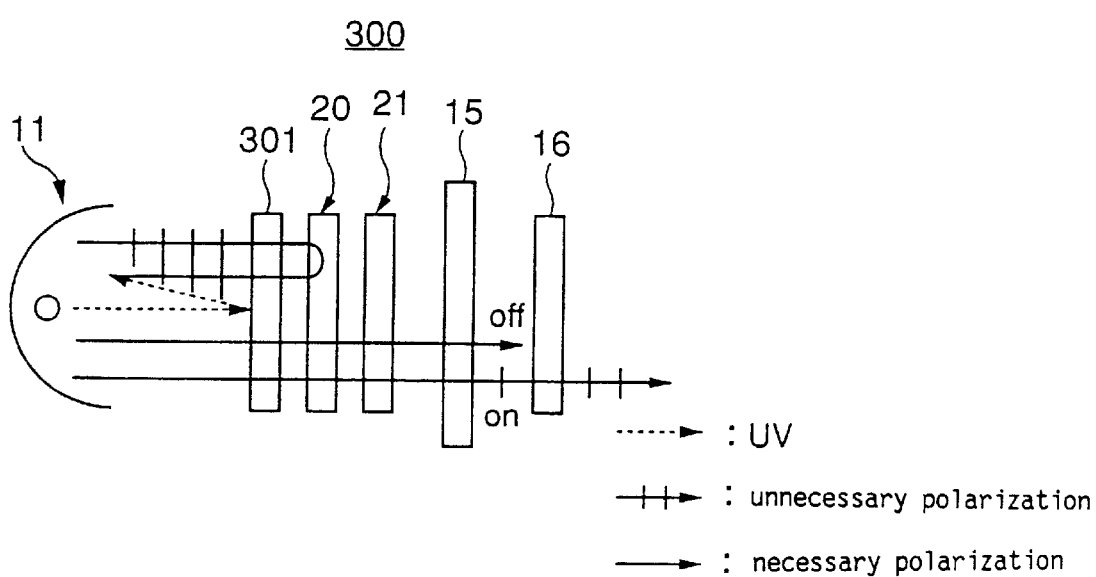
FIG. 63 is a diagram showing the construction of an optical projector according to a forty-third embodiment of the present invention.

FIG. 63 shows the construction of an optical projector 300 according to a forty-third embodiment of the present invention, wherein those parts corresponding to the parts described previously are designated by the same reference numerals and the description thereof will be omitted.

Referring to FIG. 63, the optical projector 300 has a construction similar to that of the optical projector of FIG. 1 except that a UV-cut filter 301 of the multilayered construction is disposed between the optical source 11 and the reflection-type polarization element 20. The UV-cut filter 301 has a spectrum similar to that of FIG. 60 and reflects the UV-components having the wavelength of about 400 nm or less in the direction of the optical source. As a result, the deterioration of the reflection-type polarization element 20 by the UV-components is successfully avoided.

As other aspects of the optical projector 300 are substantially identical to those of the optical projector of FIG. 1, further description thereof will be omitted.

FORTY-FOURTH EMBODIMENT

Figure 64:
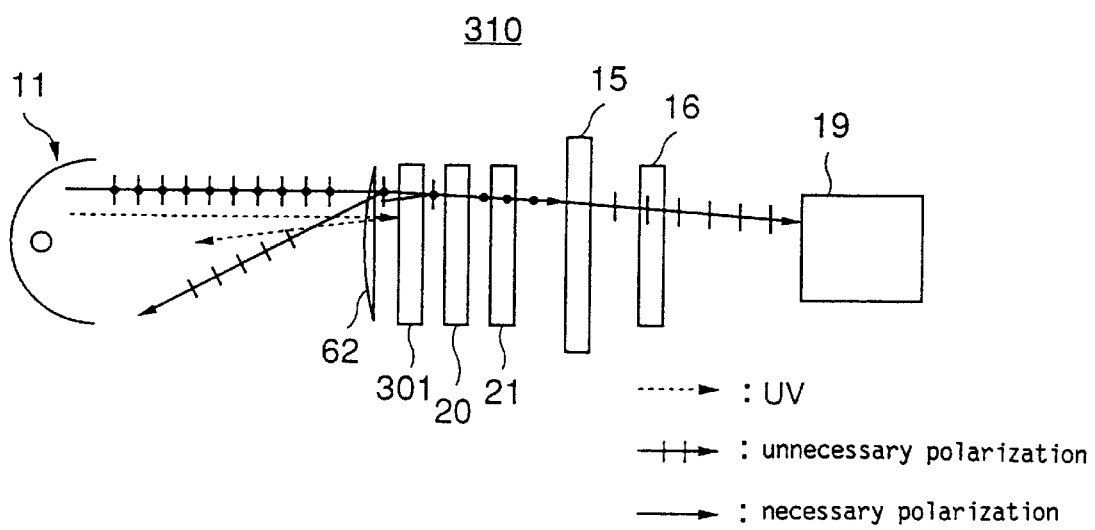
FIG. 64 is a diagram showing the construction of an optical projector according to a forty-fourth embodiment of the present invention.

FIG. 64 shows the construction of an optical projector 310 according to a forty-fourth embodiment of the present invention, wherein those parts corresponding to the parts described previously are designated by the same reference numerals and the description thereof will be omitted.

Referring to FIG. 64, the optical projector 310 has a construction similar to that of the optical projector of FIG. 13 except that the multilayered UV-cut filter 301 used in the construction of FIG. 63 is provided between the lens 62 and the reflection-type polarization element 20. By providing the lens 62 in the construction of the optical projector 310, not only the problem of the UV-deterioration of the reflection-type polarization element 20 is avoided but also the problem of temperature rise of the optical source 11 by the unnecessary polarization components that returns to the optical source 11 through the filter 301 after reflection by the reflection-type polarization element 20.

FORTY-FIFTH EMBODIMENT

Figure 65:
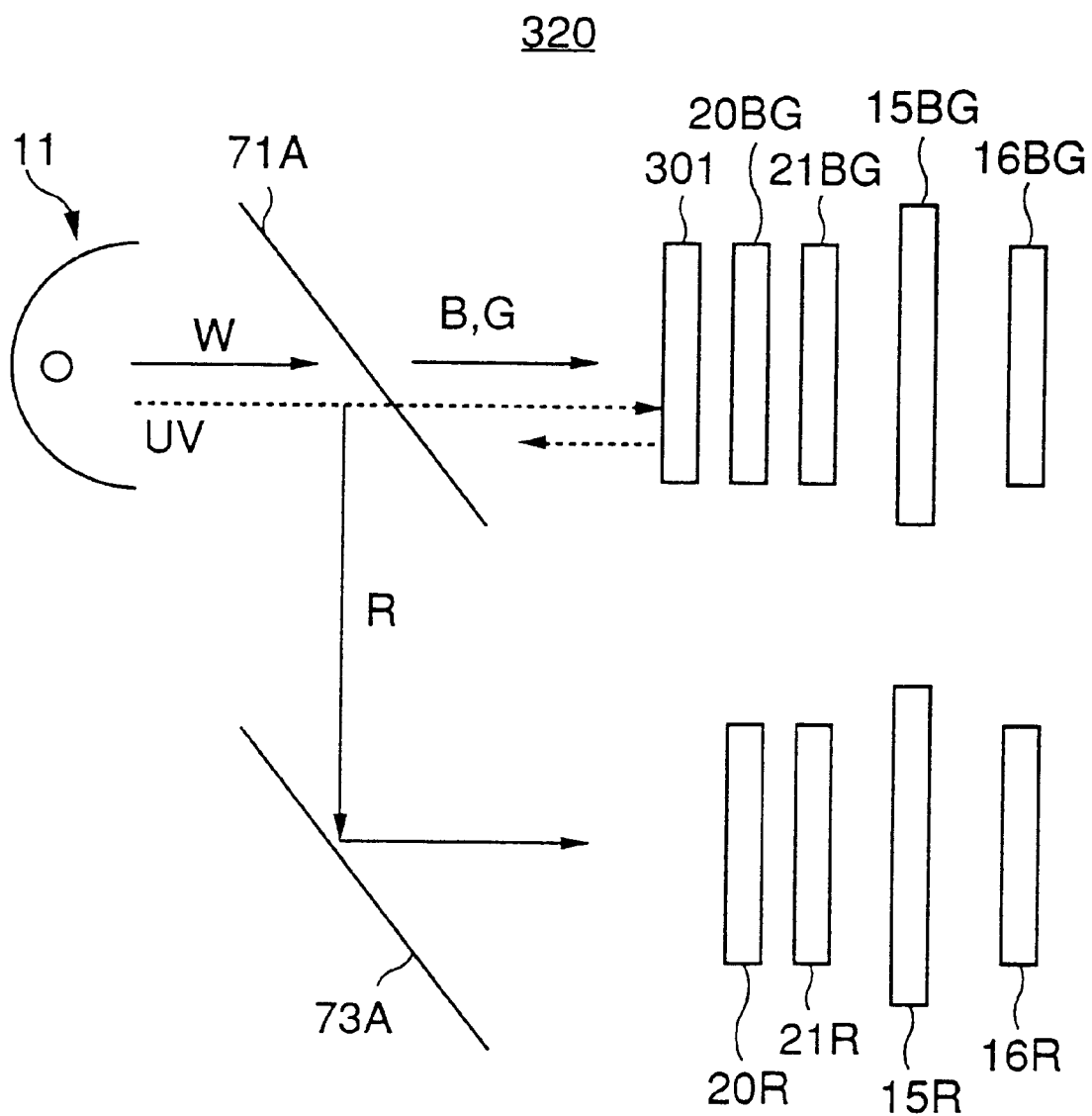
FIG. 65 is a diagram showing the construction of an optical projector according to a forty-fifth embodiment of the present invention.

FIG. 65 shows the construction of an optical projector 320 according to a forty-fifth embodiment of the present invention, wherein those parts corresponding to the parts described previously are designated by the same reference numerals and the description thereof will be omitted.

Referring to FIG. 65, the optical projector 320 is a modification of the optical projector 70 of FIG. 15 and has a construction such that the white optical beam produced by the optical source 11 and containing therein the UV-components are directed to a dichroic mirror 71A for a selective deflection of the red component beam R. The red component beam R thus deflected is then caused to pass through the reflection-type polarization element 20R and the absorption-type polarization element 21R consecutively and reaches the optical spatial modulation element 15R for optical spatial modulation. After passing through the optical spatial modulation element 15R, the red component beam R passes through the exit side polarization element 16R and reaches the projection lens 19 not shown, after passing through a synthesizing optical system, of which illustration is also omitted.

On the other hand, the blue component beam B, the green component beam G and the ultraviolet component UV are all caused to pass through the dichroic mirror 71A straight and reach the UV-cut filter 30, wherein the UV-components are selectively reflected. Thereby, only the blue component beam B and the green component beam G reach an optical spatial modulator 15BG for optical spatial modulation after passing through a reflection-type polarization element 20BG and an absorption type polarization element 21BG. The optical beam thus modulated spatially is then passed through an exit-side polarization element 16BG and reach the projection lens 19 not shown, after passing through the synthetic optical system not shown.

In the present embodiment, it should be noted that the UV-cut filter 301 is provided only at a selected location behind the color separation optical system. Thereby, the construction of the optical projector is simplified.

FORTY-SIXTH EMBODIMENT

Figure 66:
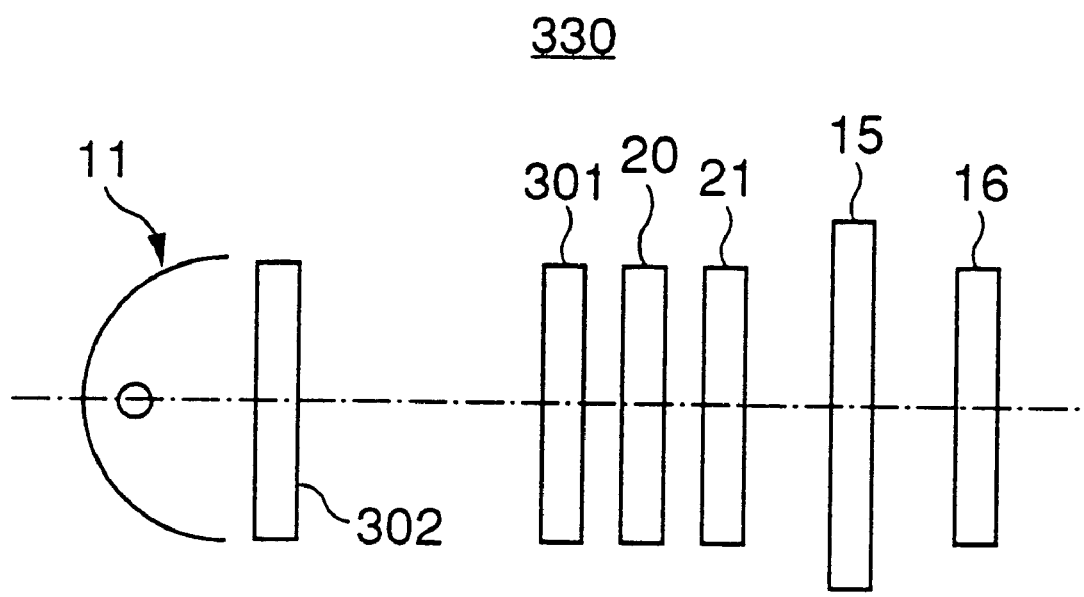
FIG. 66 is diagram showing the construction of an optical projector according to a forty-sixth embodiment of the present invention.

FIG. 66 shows the construction of an optical projector 330 according to a forty-sixth embodiment of the present invention, wherein those parts corresponding to the parts described previously are designated by the same reference numerals and the description thereof will be omitted.

Referring to FIG. 66, the optical projector 330 is a modification of the optical projector 300 of FIG. 63 and includes another UV-cut filter 302 adjacent to an optical output opening or optical outlet of the optical source so as to face the foregoing UV-cut filter 301. By constructing the optical projector 330 in this manner, the filtration of the UV-components is made twice by the UV-cut filters 301 and 302. Assuming that each of the UV-cut filters 301 and 302 reflects 99% of the UV-components, the foregoing double UV-filter construction reflects 99.9% of the UV-components.

In the present embodiment, it is also possible to use more than two UV-cut filters. Thereby, the intensity of the UV-components leaking from the reflection-type polarization element 20 reduces with the power of N, where N is the number of the UV-cut filters thus cascaded.

FORTY-SEVENTH EMBODIMENT

Figure 67:
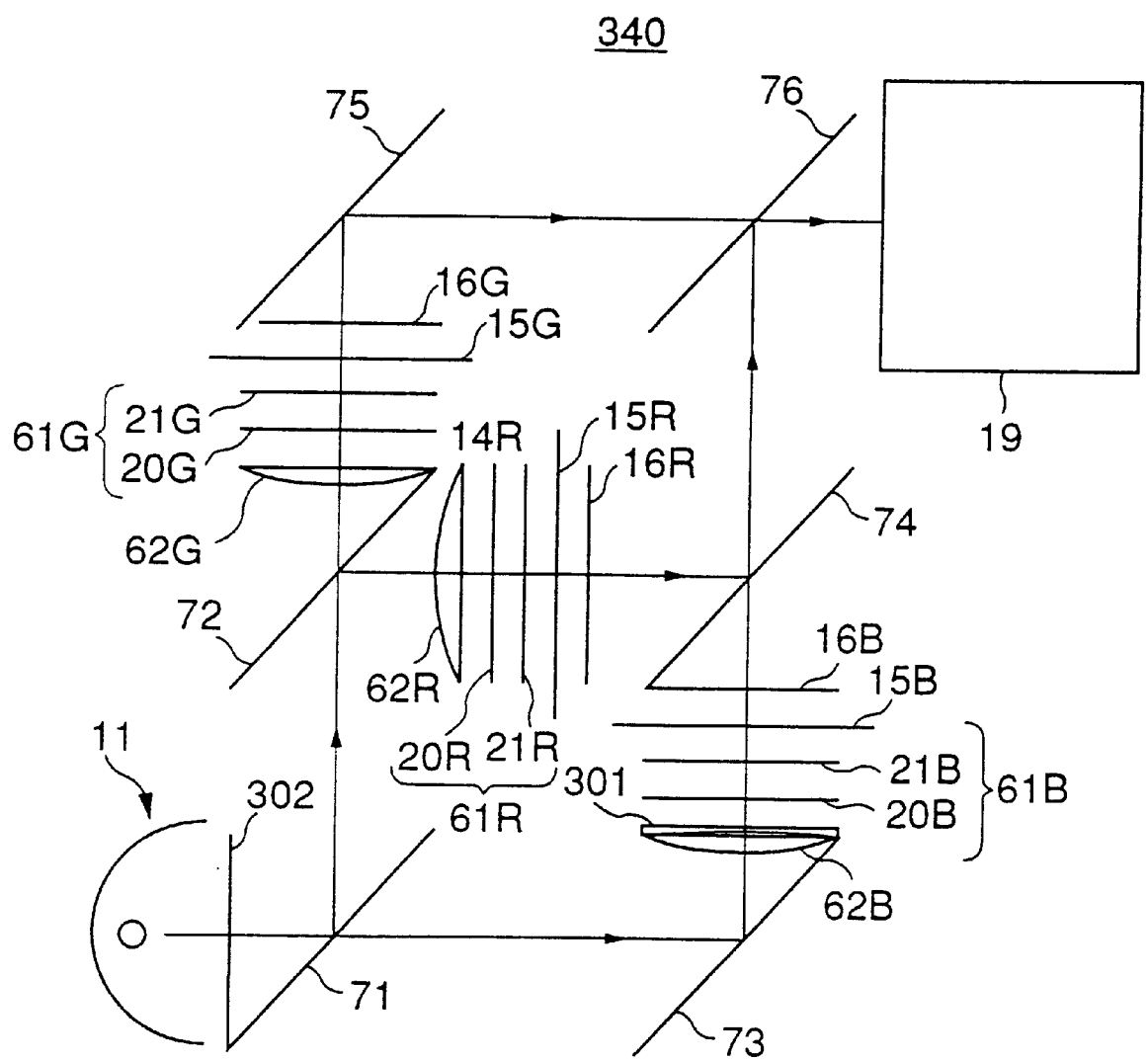
FIG. 67 is a diagram showing the construction of an optical projector according to a forty-seventh embodiment of the present invention.

FIG. 67 shows the construction of an optical projector 340 according to a forty-seventh embodiment of the present invention, wherein those parts corresponding to the parts described previously are designated by the same reference numerals and the description thereof will be omitted.

Referring to FIG. 67, the optical projector 340 is a modification of the optical projector of FIG. 15 and includes the UV-cut filter 302 at the optical outlet of the optical source 11. Further, the UV-cut filter 301 is provided behind the condenser lens 62B so as to face the reflection-type polarization element 20B.

In the construction of FIG. 67, it should be noted that the UV-components in the white optical beam produced by the optical source 11 are primarily reflected by the filter 302, while the UV-components that have passed through the filter 302 are reflected by the filter 301 behind the condenser lens 62B, when the UV-components have reached the filter 301 together with the blue component beam B, after passing through the dichroic mirror 71 and being reflected by the mirror 73. As a result, the reflection-type polarization element 20B is substantially free from exposure to the UV-components.

On the other hand, the red and green component beams R and G deflected by the dichroic mirror 71 are substantially free from the UV-components, and there is no need for forming a UV-cut filter on the condenser lens 62G or 62R.

According to the construction of FIG. 65, the problem of UV-induced deterioration of the reflection-type polarization element is effectively avoided without complicating the structure of the optical projector.

FORTY-EIGHTH EMBODIMENT

FIG. 68 shows the construction of an optical projector 350 according to a forty-eighth embodiment of the present invention, wherein those parts corresponding to the parts described previously are designated by the same reference numerals and the description thereof will be omitted.

Referring to FIG. 68, the optical projector 350 is a modification of the optical projector 330 of FIG. 66 in that the UV-cut filter 302 at the optical outlet of the optical source 11 is formed of a pair of identical UV-cut filters 302a and 302b disposed with a mutual separation generally equal to the diameter L of the optical outlet.

FIG. 69A shows the reflection of the UV-components by the foregoing UV-cut filters 302a and 302b for the case in which the filters 302a and 302b are disposed with a reduced mutual separation.

Referring to FIG. 69A, the UV-components are reflected repeatedly between the filter 302a and the filter 302b, wherein the UV-components pass through the filter 302a or 302b with a predetermined proportion such as 0.01% each time the UV-components are reflected. With increasing number of reflections, the leakage of the UV-components increases.

In the case of FIG. 69B in which the filters 302a and 302b are disposed with an increased mutual separation, on the other hand, the number of multiple reflections is reduced, and hence the leakage of the UV-components.

Figure 70:
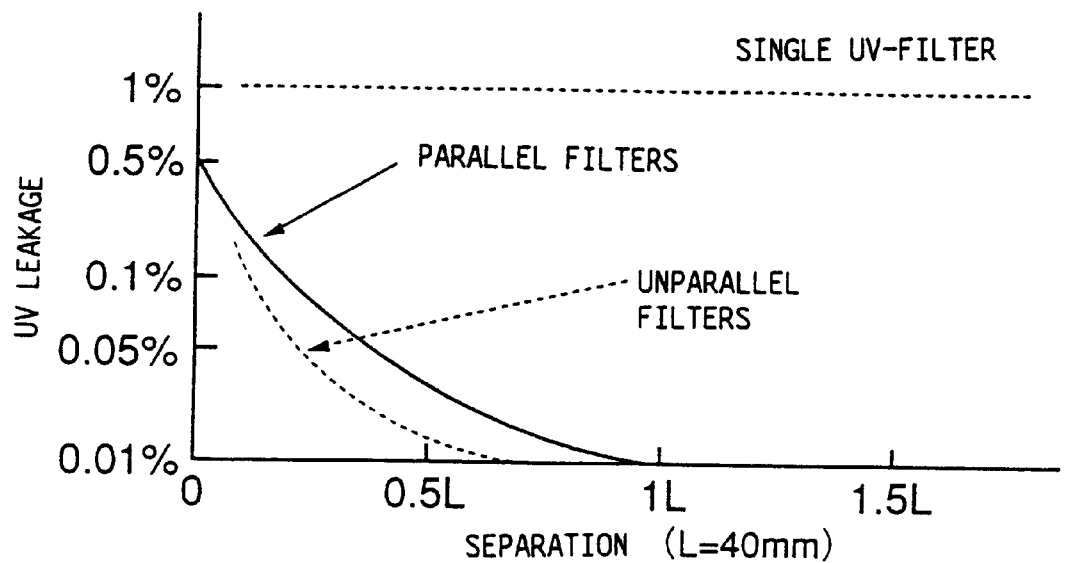
FIG. 70 is another diagram explaining the action of the ultraviolet-cut filter used in the construction of FIG. 68.

FIG. 70 shows the leakage of the UV-components from the filter 302b when the distance between the filters 302a and 302b are changed variously.

Referring to FIG. 70, it will be noted that the leakage of the UV-component decreases with increasing distance between the filter 302a and the filter 302b and reaches more or less zero when the distance becomes substantially identical to the size L of the optical outlet of the optical source 11.

FORTY-NINTH EMBODIMENT

Figure 71:
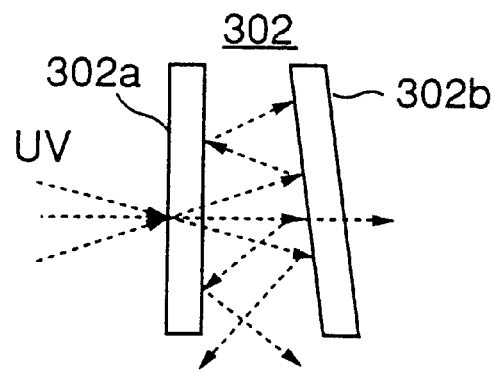
FIG. 71 is a diagram showing the construction of a ultraviolet-cut filter according to a forty-ninth embodiment of the present invention.

FIG. 71 shows another construction of the UV-cut filter 302 formed of the filters 302a and 302b.

Referring to FIG. 71, it should be noted that the filter 302b is tilted with respect to the filter 302a. As a result of such a tilted construction, the UV components reflected between the filters 302a and 302b are directed laterally and escape laterally from the space defined by the filters 302a and 302b. As a result, the leakage of the UV-components from the filter 302 is reduced substantially by tilting the filters 302a and 302b as indicated in FIG. 70 by a broken line, even when the distance between the filters 302a and 302b is reduced.

FIFTIETH EMBODIMENT

Figure 72A:
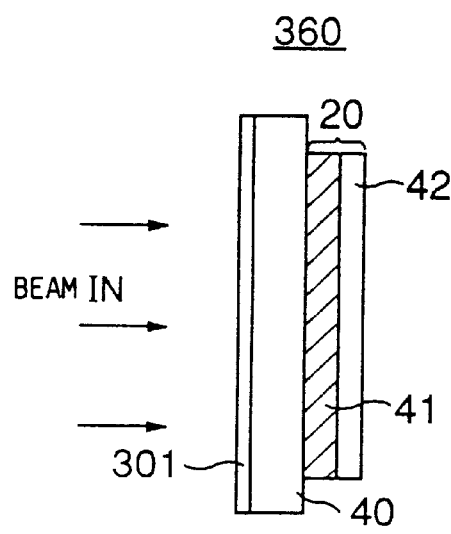
FIGS. 72A and 72B are diagrams showing the construction of a ultraviolet-cut filter according to a fifties embodiment of the present invention.
Figure 72B:
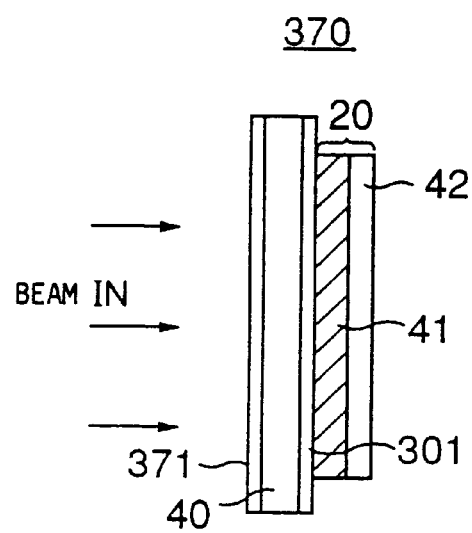

FIGS. 72A and 72B show the construction of reflection-type polarization elements 360 and 370 according to a fiftieth embodiment of the present invention, wherein those parts corresponding to the parts described previously are designated by the same reference numerals and the description thereof will be omitted.

Referring to FIG. 72A, the reflection-type polarization element 360 is a modification of the reflection element 20 of FIG. 2A and carries the UV-cut filter 301 directly on the incident-side of the glass substrate 40 that forms a part of the reflection-type polarization element 20. As the filter 301 is formed of an alternate repetition of an $SiO_2$ film and an $Al_2O_3$ film, the formation of the filter 301 on the glass substrate 40 is carried out without problem.

In the example of FIG. 72B, the reflection-type polarization element 370 carries the UV-cut filter 301 on the exit-side of the glass substrate 40, such that the UV-cut filter is sandwiched by the substrate 40 and the liquid crystal layer 41. Further an anti-reflection film 371 is provided on the incident-side of the glass substrate 370.

In any of the constructions of FIGS. 72A and 72B, the UV-cut filter 301 is provided on the glass substrate 40 in an intimate contact therewith, and the problem of optical loss that may be caused by the free surface of the filter 301 is successfully avoided.

FIFTY-FIRST EMBODIMENT

Figure 73A:
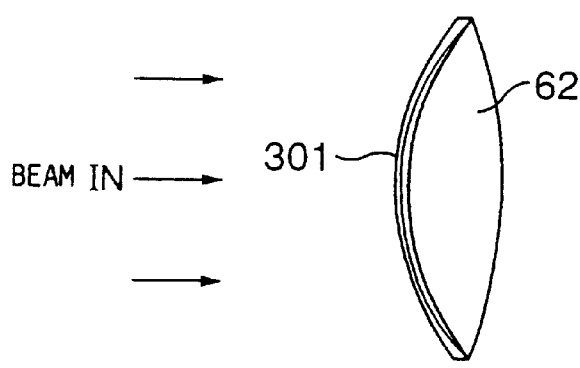
FIGS. 73A and 73B are diagrams showing the construction of a ultraviolet-cut filter according to a fifty-first embodiment of the present invention.
Figure 73B:
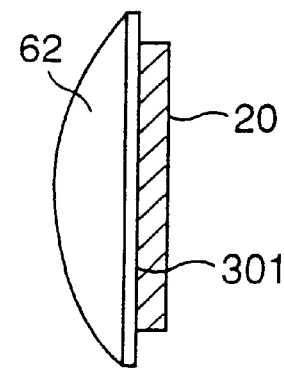

FIGS. 73A and 73B show examples of the UV-cut filter according to a fifty-first embodiment of the present invention, wherein those parts corresponding to the parts described previously are designated by the same reference numerals and the description thereof will be omitted.

Referring to FIG. 73A, the UV-cut filter 301 is provided on an incident-side of a lens 62, which may be any of the condenser lenses 62R, 62G and 62B, in the form of an alternate coating of an $SiO_2$ film and an $Al_2O_3$ film. In the example of FIG. 73B, on the other hand, the filter 301 is provided on the planar surface of a plano-convex lens 62 such that the filter 301 is sandwiched by the lens 62 and the reflection-type polarization element 20. The constructions of FIGS. 73A and 73B are also effective for eliminating the problem of optical loss caused by the free surface of the UV filter 301.

FIFTY-SECOND EMBODIMENT

Hereinafter, a polarization device 400 according to a fifty-second embodiment of the present invention will be described, wherein the polarization device 400 is a modification of the polarization device 110 of FIGS. 45A and 45B described previously.

Figure 74:
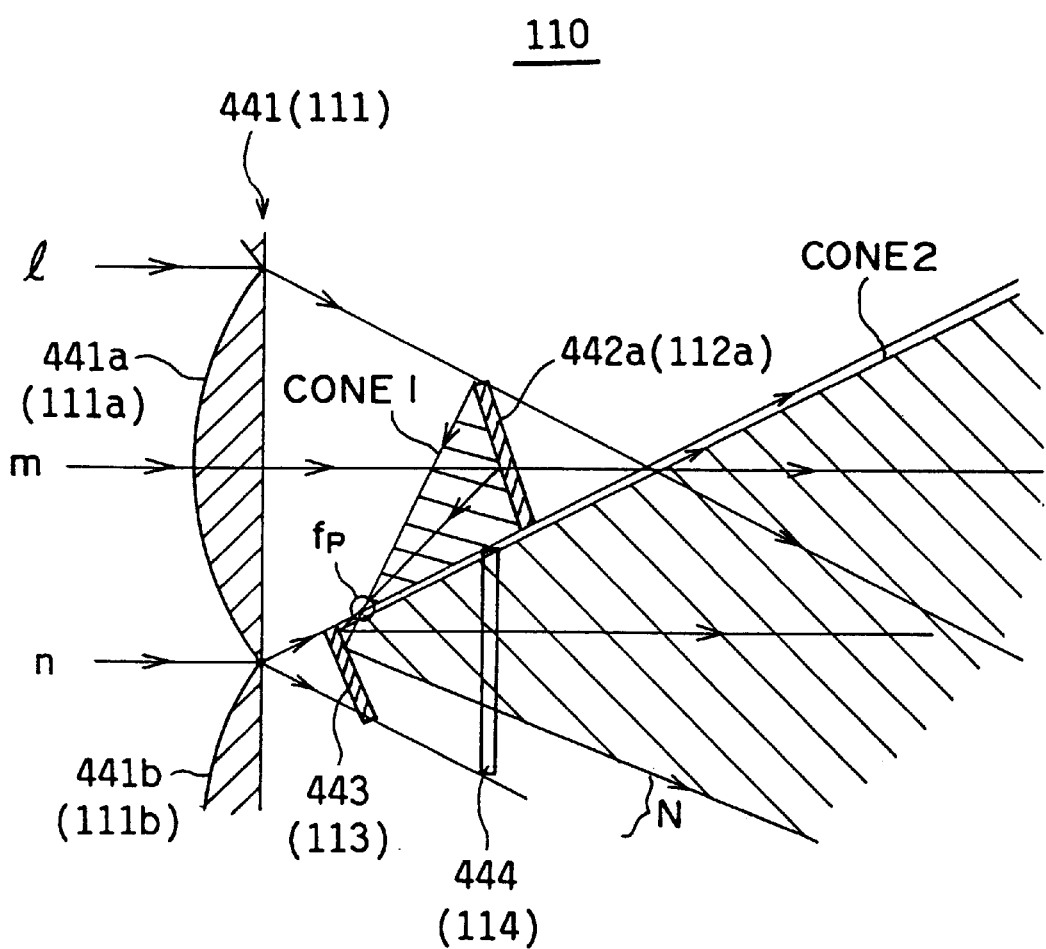
FIG. 74 is a diagram explaining the problem addressed by a fifty-second embodiment of the present invention.

FIG. 74 explains the problems of the polarization device 110 of FIG. 45A.

In the reflection-type polarization device 110 of FIG. 45A or 45B, the efficiency of the polarization device is certainly improved with respect to the optical loss by utilizing the reflected polarization components that are otherwise discarded, as explained before. On the other hand, there can be a situation in the polarization device 110 as indicated in FIG. 4, depending on the positional relationship of the reflection-type polarization elements 42a and 42b, that the overlapping of the linear-polarization component converted from the reflected circular-polarization component and the linear-polarization component passed through the reflection-type polarization component may deviate from the ideal relationship. In such a case, the optical intensity distribution of the linear-polarization component obtained by the polarization device 110 may become non-uniform as explained below. In FIG. 74, those parts described previously are designated by the same reference numerals and the description thereof will be omitted.

Referring to FIG. 74, the polarization device corresponds to the polarization device 110 of FIG. 45A and includes a lens array 441 corresponding to the integral optical component 111 described previously, wherein the lens array 441 includes convex lens elements 441a and 441b corresponding to the convex lens elements 111a and 111b of FIG. 45A. Further, the polarization device of FIG. 74 includes a reflection-type polarization element 442a corresponding to the reflection-type polarization element 112a or 112b of FIG. 45A and a mirror 443 corresponding to the mirror 113. Further, the polarization device of FIG. 74 includes a half-wavelength retardation element 444 corresponding to the half-wavelength retardation element 114 of FIG. 45A.

In the polarization device 110 of FIG. 74, the circular polarization components 1b, nb and mb hit the mirror 43 along the optical cone CONE1 represented by hatching, wherein it will be noted that the position of the reflection-type polarization element 442a is offset from the optimum position on the optical axis of the lens 441a in the example of FIG. 74. In such a case, the foregoing circular-polarization components hit only a part of the mirror 43, and thus, there is formed a gap region N between the optical cone CONE1 described previously and an optical cone CONE2 formed by the linear-polarization component converted from the reflected circular-polarization component. It should be noted that no optical beam reaches the gap region N, and thus, the gap region N causes a non-uniformity in the intensity distribution of the optical beam produced by the polarization device 110. It should be note that the foregoing optical cone CONE2 and the gap region N correspond to the optically ineffective region of the optical component 441 including the lens 441a and 441b.

Figure 75:
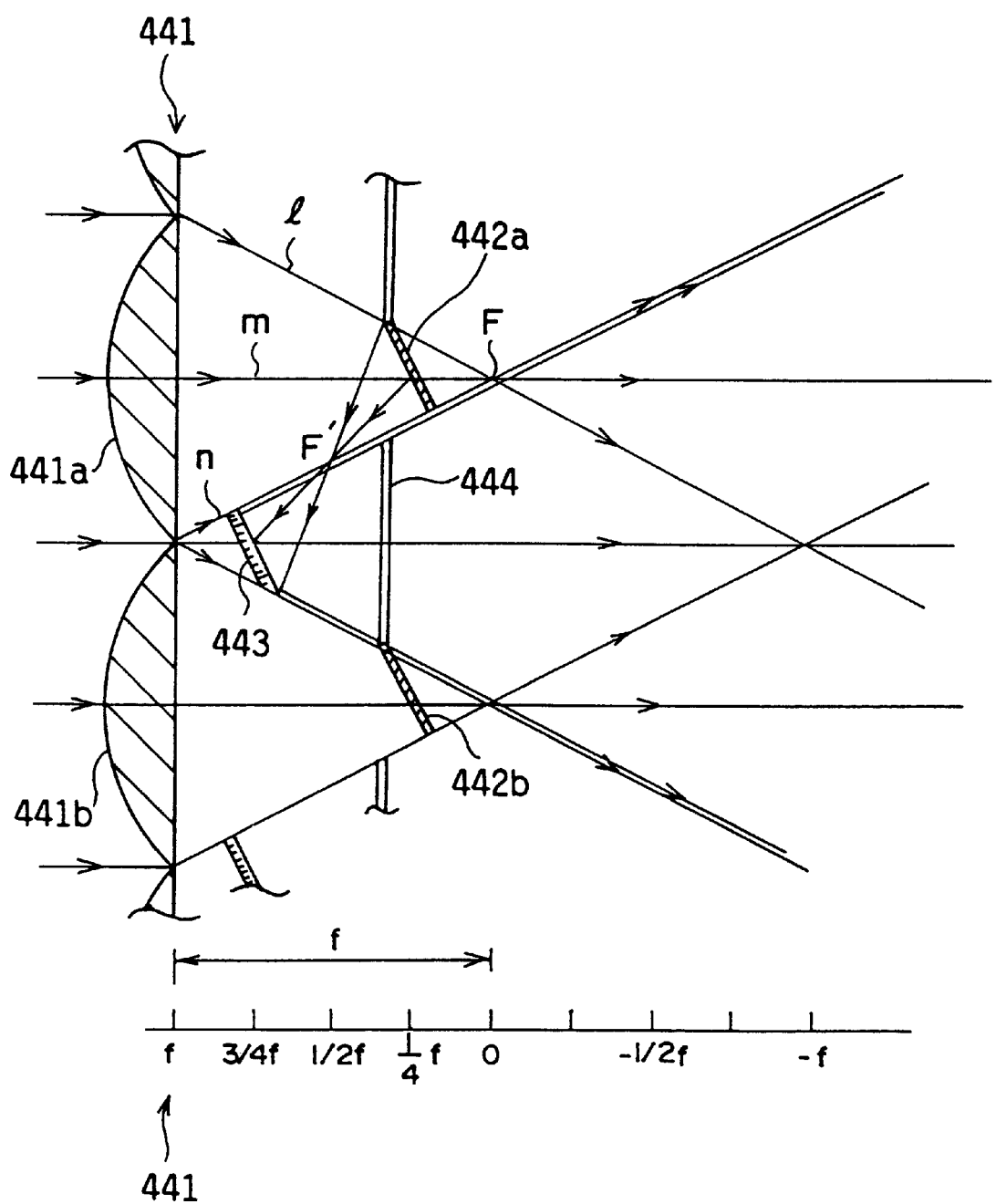
FIG. 75 is a diagram showing the construction of a polarization device according to a fifty-second embodiment of the present invention.

FIG. 75 shows the construction of the polarization device 400 according to the present embodiment.

Referring to FIG. 75, the polarization device 400 includes, in addition to the lens array 441 formed of the convex lens elements 441a and 441b, reflection-type polarization elements 442a and 442b respectively on the optical axes of the convex lens elements 441a and 441b, wherein the reflection-type polarization element 442a has a size set so as to intercept substantially the entire rays 1, m and n constituting the optical beam focused by the convex lens element 441a. Thereby, the reflection-type polarization element 442a reflects the unnecessary circular-polarization component while allowing to pass therethrough the necessary linear-polarization component.

It should be noted that the reflection-type polarization element 442a is disposed with a tilt angle with respect to the optical axis such that the reflected circular-polarization component hits the mirror 443 provided in the optically ineffective region formed between the lens 441a and the lens 441b. The mirror 443 has a maximum allowable size under the constraint that the mirror 443 does not interrupt the optical beam focused by the lens 441a or 441b and reflects the circular polarized component reflected by the reflection-type polarization element 442a, wherein the circular polarized component thus reflected by the mirror 443 travels along the optically ineffective region in the form of a divergent optical beam.

The divergent optical beam thus produced is then caused to pass through a half-wavelength retardation film 444 and is converted to a linear polarization beam having a polarization plane substantially coincident to the linear polarization beam passed through the reflection-type polarization element 442a.

In the foregoing construction of the polarization device 400, it should be noted that the reflection-type polarization element 442a is disposed on the optical axis of the lens 441a at a position determined such that all the rays in the circular polarization component reflected by the reflection-type polarization element 42a impinge upon respective points on the reflection surface of the mirror 443. In the illustrated example, the reflection-type polarization element 442a is disposed at a distance within the distance f/2 as measured from the focal point F of the lens 441a, more precisely, the reflection-type polarization element 442a is disposed at the distance of f/4 from the foregoing focal point F, wherein f represents the focal length of the lens 441a. By disposing the reflection-type polarization element 442a as such, the position of the mirror 443 is determined on the foregoing optical axis of the lens 441a at the position offset from the focal point F with a distance of 3f/4 in the direction toward the lens array 441.

In the construction of FIG. 75, it should also be noted that, because of the fact that the reflection-type polarization element 442a is provided at the position offset from the focal point F by the distance f/4, the reflection-type polarization element 442a has a size of P/4 when viewed in the direction of the optical axis, wherein P represents the pitch of the lenses 441a and 441b. In this case, the mirror 443 also takes the size of P/4 when viewed in the direction parallel to the foregoing optical axis.

In the present embodiment it is also possible to determine the position of the reflection-type polarization element 442a on the optical axis such that the reflection-type polarization element 442a is located before or behind the focal point F within the distance of ±f/2. Thereby, the mirror 443 should be located at the position, on the central axis of the optically ineffective region extending parallel to the optical axis, between the lens array 441 and the focal point F.

According to the present embodiment, substantially the entirety of the circular polarization component, which is reflected by the reflection-type polarization element, is caused to travel through the optically ineffective region between the lens 441a and the lens 441b in the form of the divergent optical beam as a result of the reflection by the mirror 443 provided at the center of the optically ineffective region between the lens 441a and the lens 441b. Thus, by converting the divergent optical beam thus formed into the linear-polarization optical beam having the desired polarization plane, the polarization device 400 of the present embodiment successfully minimizes the optical loss. As the linearly polarized optical beam thus converted from the unnecessary circular polarization component fills the optically ineffective region of the lens array 441, the polarization device 400 of the present embodiment improves the uniformity of optical intensity distribution substantially.

FIFTY-THIRD EMBODIMENT

Figure 76A:
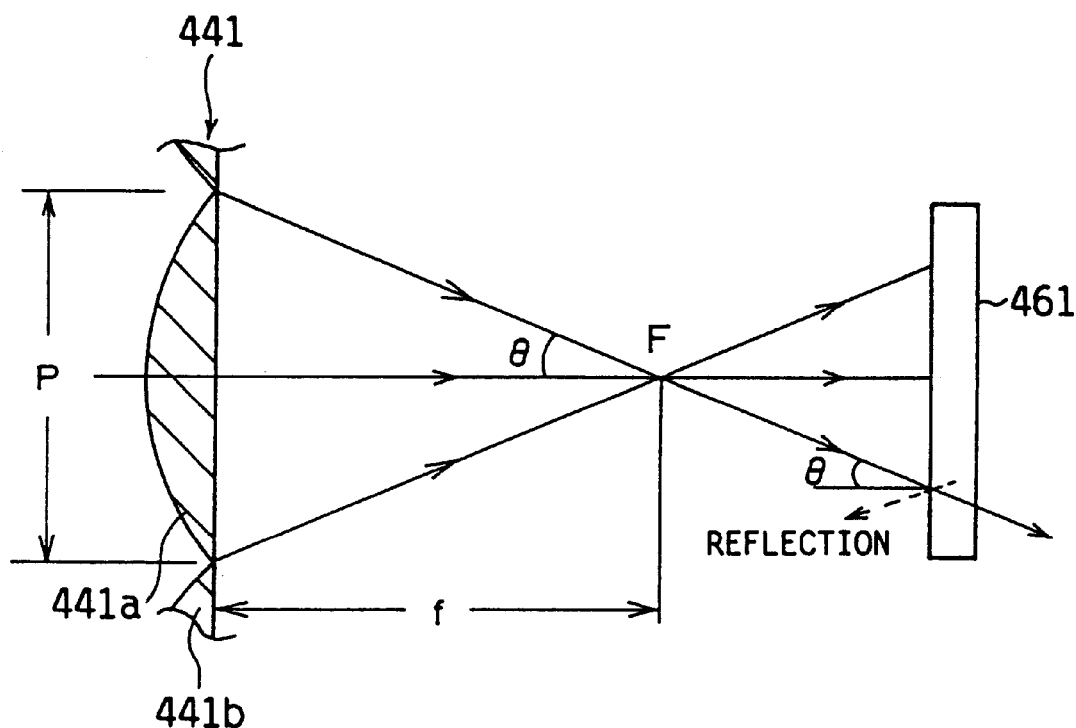
FIGS. 76A and 76B are diagrams showing the construction of a polarization device according to a fifty-third embodiment of the present invention.
Figure 76B:
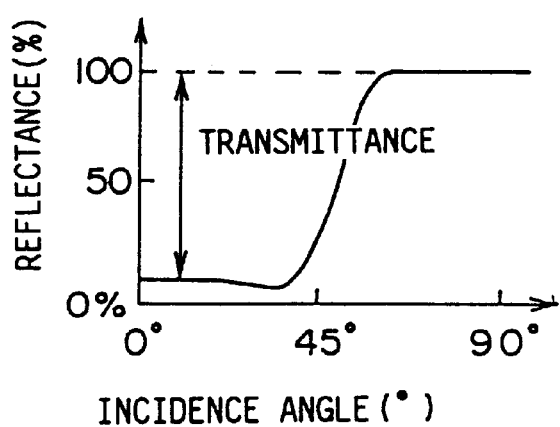

FIGS. 76A and 76B show the construction of a polarization device 460 according to a fifty-third embodiment of the present invention, wherein those parts corresponding to the parts described previously are designated by the same reference numerals and the description thereof will be omitted. In FIGS. 76A and 76B, those parts not essential to the subject matter of the present embodiment is omitted from illustration for the sake of simplicity.

Referring to FIG. 6A, it should be noted that the linear-polarization optical beam passed through the lens 441a of the polarization device 460 impinges on an optical component 461 with an incident angle θ given by the relationship of tan θ=P/2f, wherein P and f are defined already. The optical component 461 may be a liquid crystal panel.

FIG. 76B shows the reflectance at the surface of the optical component 461, wherein it should be noted that the surface reflectance of the optical component 461 increases sharply when the incidence angle θ exceeds about 45°. In other words, most of the linear polarization optical beam focused by the lens 441a or 441b is reflected at the surface of the optical component 461 when the incidence angle θ exceeds about 45°. This, when the lens 441a or 441b having the focal length f is to be used for the lens array 441, it is desirable to set the foregoing pitch P such that the incidence angle θ becomes smaller than about 45°. Particularly, the reflection at the surface of the optical component 61 is effectively suppressed by setting the pitch P and the focal length f so as to satisfy the relationship P×f/2≦1.

FIFTY-FOURTH EMBODIMENT

Figure 77:
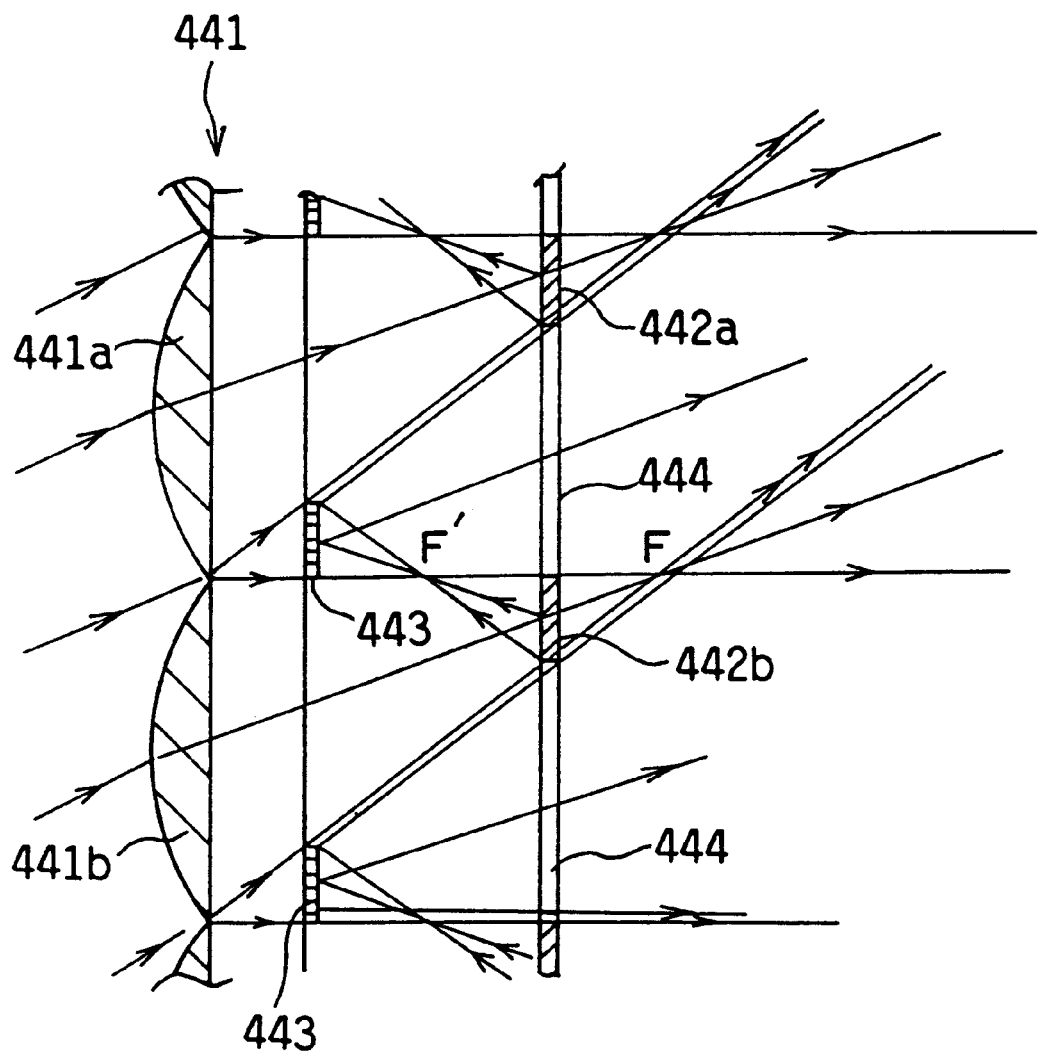
FIG. 77 is a diagram showing the construction of a polarization device according to a fifty-fourth embodiment of the present invention.

FIG. 77 shows the construction of a polarization device 470 according to a fifty-fourth embodiment of the present invention, wherein those parts corresponding to the parts described previously are designated by the same reference numerals and the description thereof will be omitted.

Referring to FIG. 77, the polarization device 470 includes the reflection-type polarization elements 441a and 441b such that the polarization elements 441a and 441b are aligned together with the retardation film 444 on a plane perpendicular to the optical axis of the lens 441a or 441b. Further, the mirror 44s is formed on another plane parallel to the foregoing plane at the side of the lens array 441.

In the construction of FIG. 77, the incident optical beam impinges obliquely upon the polarization device 470 with respect to the optical axis of the lens 441a or 441b and the desired linear-polarization component in the incident optical beam is separated by the reflection-type polarization element 442a or 442b similarly to the polarization device 400 of FIG. 75. In the polarization device 470, it should be noted that the desired linear-polarization component exits obliquely from the polarization device 470.

On the other hand, the unnecessary circular-polarization component is reflected by the reflection-type polarization element 442a obliquely toward the mirror 443 that corresponds to the polarization element 442a, wherein it should be noted that the mirror 443 is provided in the optically ineffective region formed by the lens 441a and 441b and reflects the reflected unnecessary circular-polarization component further such that the unnecessary circular-polarization component travels along the foregoing optically ineffective region. It should be noted that the optically ineffective region is formed, in the example of FIG. 77, between a pair of adjacent convergent optical beams focused respectively by the lens element 441a and the lens element 441b. The unnecessary circular polarization component traveling through the foregoing optically ineffective region is then converted to a linear polarization component having the desired polarization plane upon passage through the half-wavelength retardation film 444. As noted already, the linear-polarization beam component thus produced exits from the polarization device 470 obliquely together with the linear-polarization beam component passed through the reflection-type polarization element 442a or 442b.

FIFTY-FIFTH EMBODIMENT

Figure 78:
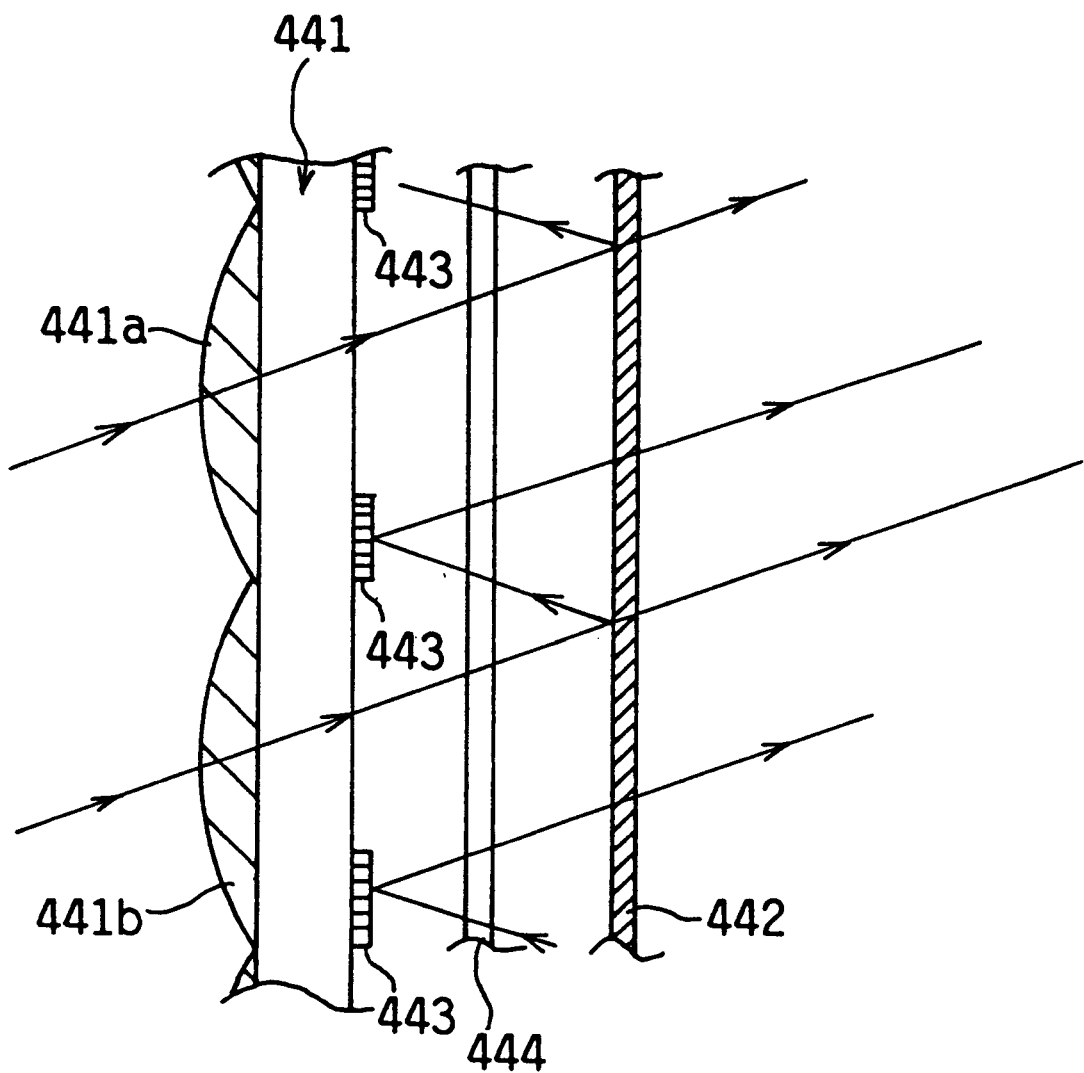
FIG. 78 is a diagram showing the construction of a polarization device according to a fifty-fifth embodiment of the present invention.

FIG. 78 shows the construction of a polarization device 480 according to a fifty-fifth embodiment of the present invention, wherein those parts corresponding to the parts described previously are designated by the same reference numerals and the description thereof will be omitted.

Referring to FIG. 78, the polarization device 480 receives the incident optical beam obliquely with respect to the to the lens array 441 including therein the lens elements 441a and 441b similarly to the polarization device 470, wherein the polarization device 480 of the present embodiment replaces the reflection-type polarization elements 442a and 442b of the device 470 of FIG. 77 with a single reflection-type polarization plate 442. Associated with this, the retardation film 444 is now located at a position between the reflection-type polarization plate 442 and the mirror 443 and the retardation induced by the retardation film 444 is now changed from the half-wavelength retardation to the quarter-wavelength retardation.

In the construction of FIG. 78, it should be noted that the optical path of the optical beam through the polarization device 480 is identical with the optical path in the polarization device 470, while it should be noted that, in relation to the fact that the retardation film 444 is provided between the reflection-type polarization plate 442 and the mirror 443, the unnecessary circular polarization component reflected by the reflection-type polarization plate 442 passes the retardation film 444 twice. Each time the unnecessary circular polarization component passes through the retardation film 444, it undergoes an optical phase retardation. Thus, the optical phase retardation of the retardation film 444 is set to a quarter-wavelength ($\lambda/4$).

Figure 79A:
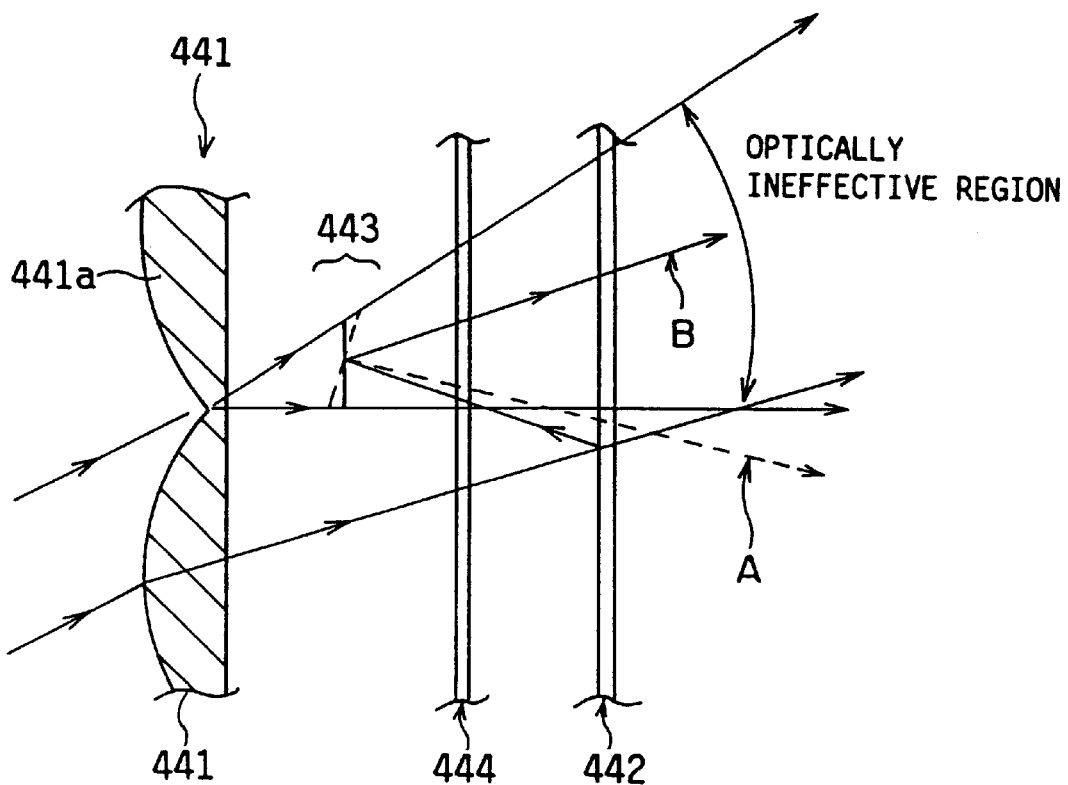
FIGS. 79A and 79B are diagrams explaining the function of the polarization device of FIG. 78.
Figure 79B:
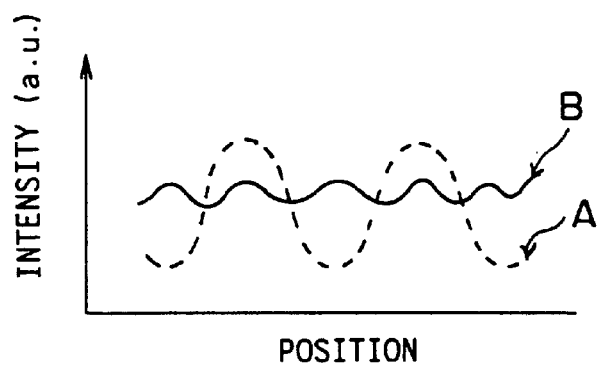

FIGS. 79A and 79B represent the variation of intensity distribution induced in the linear polarization optical beam produced by the polarization device 480 for the case in which the direction of the mirror 443 is not appropriate.

Referring to FIG. 79A, the unnecessary circular-polarization component reflected by the mirror 443, and hence the linear polarization component converted from the foregoing unnecessary circular polarization component, is caused to travel through the optically ineffective region along a central part thereof as indicated in FIG. 79A when the mirror 443 is disposed on a plane perpendicular to the optical axis of the lens element 441a or the lens element 441b such that the mirror 443 extends parallel to the reflection-type polarization plate 442 or the retardation film 444 as represented in FIG. 79A by a continuous line.

In such a case, the linear-polarization component converted from the unnecessary circular-polarization component travels parallel to the linear polarization component passed through the reflection-type polarization plate 442, wherein the linear-polarization component thus converted complements the linear polarization component passed through the reflection-type polarization plate 442. Thereby, the intensity distribution of the linear-polarization optical beam produced by the polarization device 480 becomes more or less uniform as represented in FIG. 79B by the curve B. It should be noted that the optical intensity distribution of FIG. 79B represents the optical intensity distribution observed on the optical component such as liquid crystal panel disposed at the downstream side of the polarization device 480.

In the case the mirror 443 is tilted from the optimum angle as represented in FIG. 79A by a broken line, on the other hand, the optical intensity distribution becomes non-uniform as represented in FIG. 79B by the curve A.

FIFTY-SIXTH EMBODIMENT

Figure 80A:
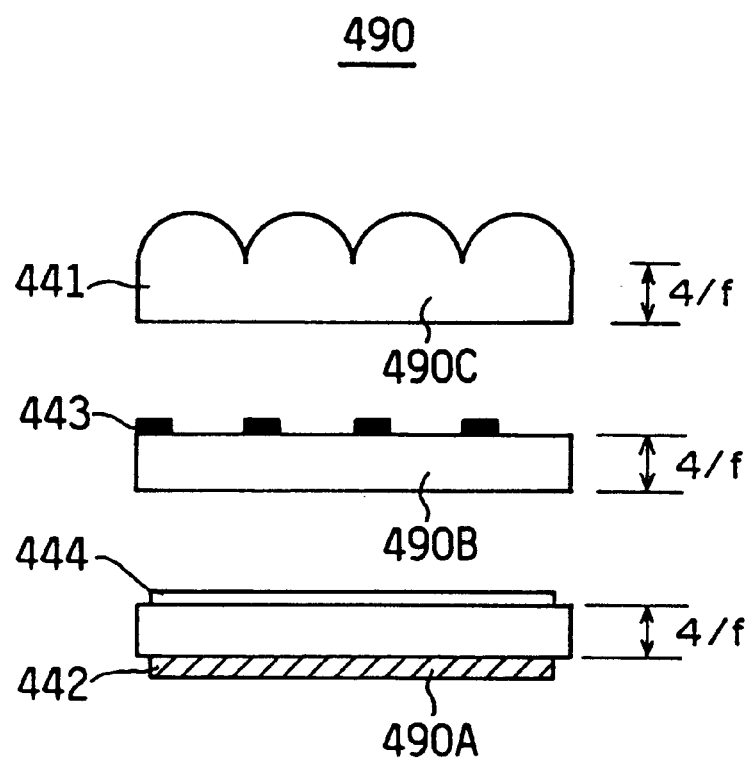
FIGS. 80A and 80B are diagrams showing the construction of a polarization device according to a fifty-sixth embodiment of the present invention.
Figure 80B:
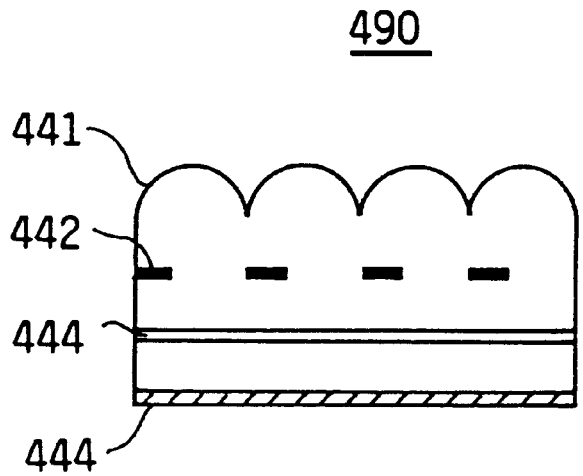

FIGS. 80A and 80B show the construction of a polarization device 490 according to a fifty-sixth embodiment of the present invention, wherein those parts corresponding to the parts described previously are designated by the same reference numerals and the description thereof fill be omitted.

Referring to FIGS. 80A and 80B, the polarization device 490 has a construction substantially identical with the polarization device 480 of the previous embodiment except that the reflection-type polarization element 442 and the retardation film 444 are provided on top and bottom surfaces of a transparent glass substrate 490A having a thickness of f/4 and that the mirror 443 is now provided on the upper principal surface of a transparent glass substrate 490B having a thickness of f/4. Further, there is provided transparent glass substrate 490C on the transparent glass substrate 490B wherein the glass substrate 490C carries thereon the lens array 441. The glass substrates 490A–490C are stacked with each other and adhered as represented in FIG. 80B by an adhesive having a refractive index identical with the refractive index of the glass substrate.

According to the present embodiment, the polarization device 490 thus formed has a sold construction and has an advantageous feature that unwanted reflection caused at the free surface of the optical elements is effectively eliminated. Further, the polarization device 490 has an advantageous feature of eliminating the necessity of adjustment and is easy for fabrication with low cost.

It is obvious in the construction of FIGS. 80A and 80B that the retardation film 444 may be provided on the bottom surface of the substrate 490B and the mirror 443 on the bottom surface of the substrate 490C. Further, it is not necessary that all the substrates 490A–490C are bonded with each other, but only two of them may be bonded.

While not illustrated, it is also possible to form the retardation film 444 uniformly on the lower surface of the glass substrate 490C and form the reflection-type polarization element 442 on the retardation film 444 thus formed uniformly. In this case, the intermediate substrate 490B may be omitted. By bonding the substrates 90A and 90C by an adhesive layer having an identical refractive index, it is possible to eliminate unnecessary reflection from the free surface.

FIFTY-SEVENTH EMBODIMENT

Figure 81A:
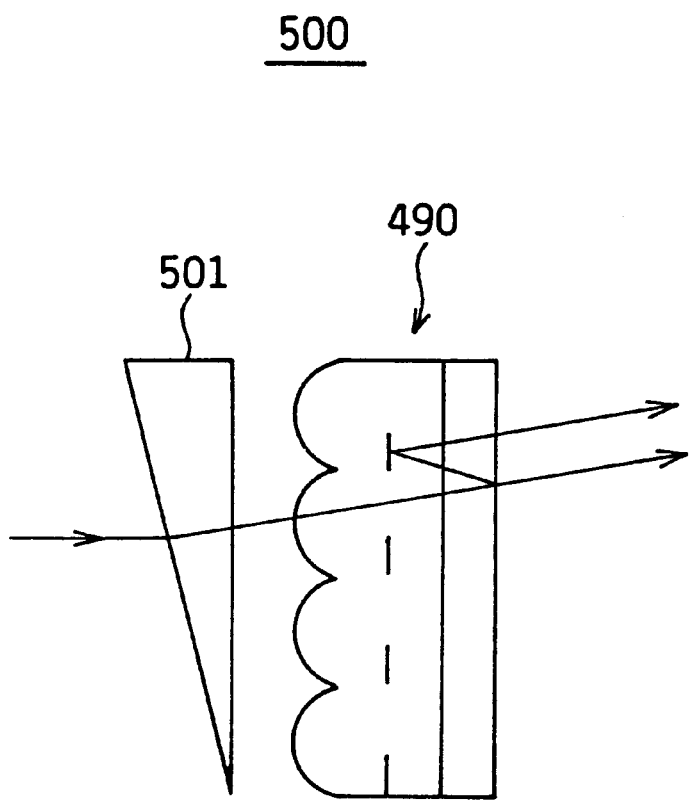
FIGS. 81A and 81B are diagrams showing the construction of a polarization device according to a fifty-seventh embodiment of the present invention.
Figure 81B:
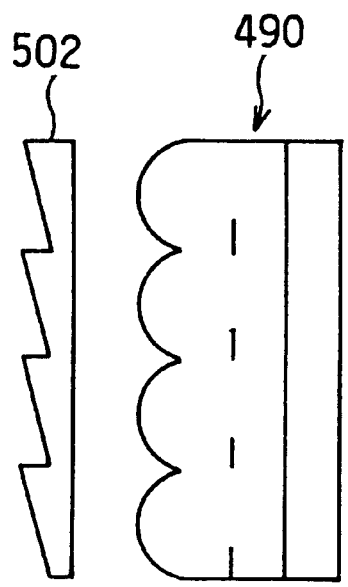

FIGS. 81A and 81B show the construction of a polarization device 500 according to a sixth embodiment of the present invention, wherein those parts corresponding to the parts described previously are designated by the same reference numerals and the description thereof will be omitted.

Referring to FIG. 81A, the polarization device 500 of the present embodiment includes a prism 501 having a single oblique surface before the polarization device 490 such that the incoming optical beam is deflected with respect to the optical axis of the polarization element 500 in the polarization device 490. As a result of this, it is no longer necessary to dispose the entirely of the polarization device 500 to be oblique with respect to the optical path of the incoming optical beam. In other words, the polarization device 500 may disposed such that the principal surface of any of the substrates 490A–490C is perpendicular to the optical path of the incoming optical beam.

FIG. 81B shows a modification of the polarization device 500 of FIG. 81A.

Referring to FIG. 81B, it will be noted that the prism 501 having a single oblique edge surface is replaced by a prism 502 having a plurality of oblique surfaces. By using the prism 502, the overall thickness of the prism 502 is reduced, and hence the overall size of the polarization device.

In the present embodiment, it is also possible to use a hologram causing a diffraction in the incoming optical beam, in place of the foregoing prism 501 or 502.

FIFTY-EIGHTH EMBODIMENT

Figure 82A:
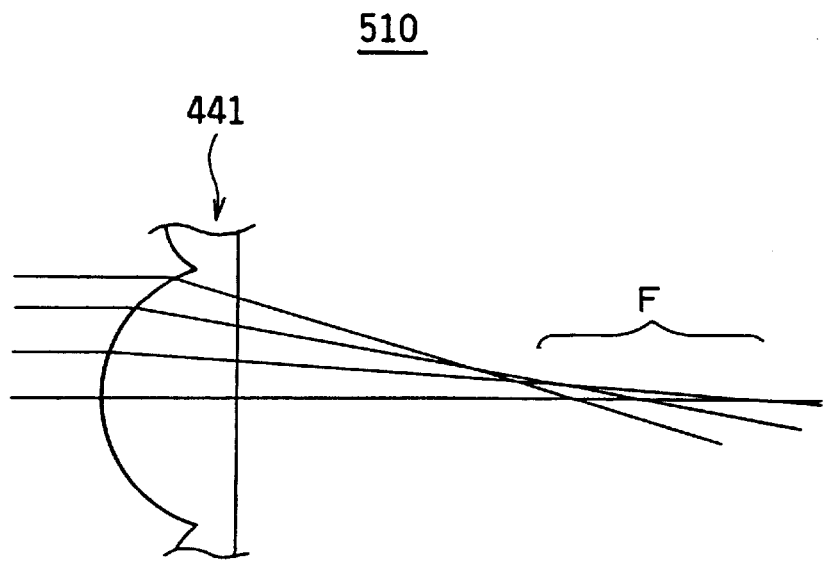
FIGS. 82A and 82B are diagrams showing the construction of a polarization device according to a fifty-eighth embodiment of the present invention.
Figure 82B:
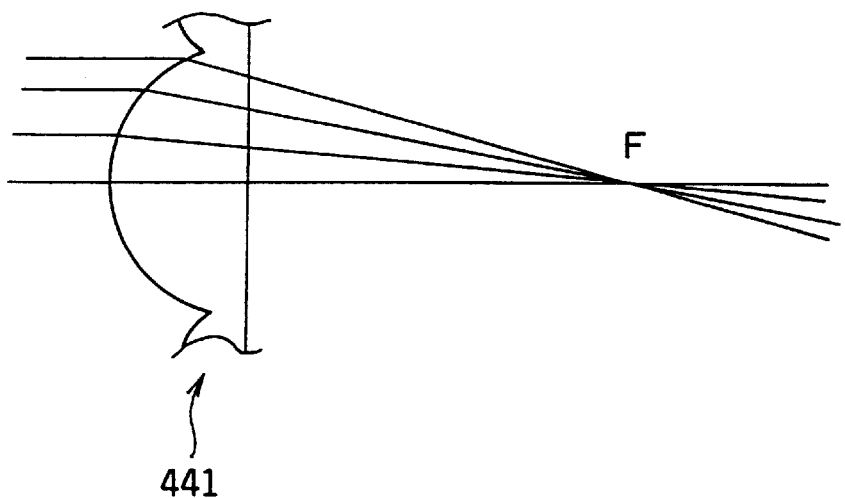

FIGS. 82A and 82B show the construction of a polarization device 510 according to a fifty-eighth embodiment of the present invention, more specifically the construction of the lens array 441 used therein, wherein those parts corresponding to the parts described previously are designated by the same reference numerals and the description thereof will be omitted.

FIG. 82A shows an example of using a spherical lens for the lens element in the lens array 441.

Referring to FIG. 82A, it should be noted that the rays of the optical beam focused by such a spherical lens converge with each other in the vicinity of a focal point F but not at a single point.

In the case of FIG. 82B in which a non-spherical lens is used for the lens element of the lens array 441, the rays of the incident optical beam are focused at a single point coincident to the focal point F. As the ray path in the polarization device provides a profound effect on the intensity distribution of the linear-polarization beam in the polarization device of the present invention as explained before, it is desirable to use the nonspherical lens of FIG. 82B for the lens array 441 rather than using the spherical lens of FIG. 82A.

FIFTH-NINTH EMBODIMENT

Figure 83A:
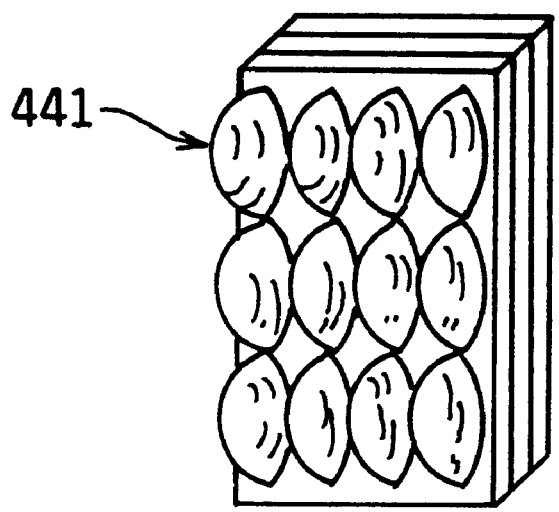
FIGS. 83A and 83B are diagrams showing the construction of a polarization device according to a fifty-ninth embodiment of the present invention.
Figure 83B:
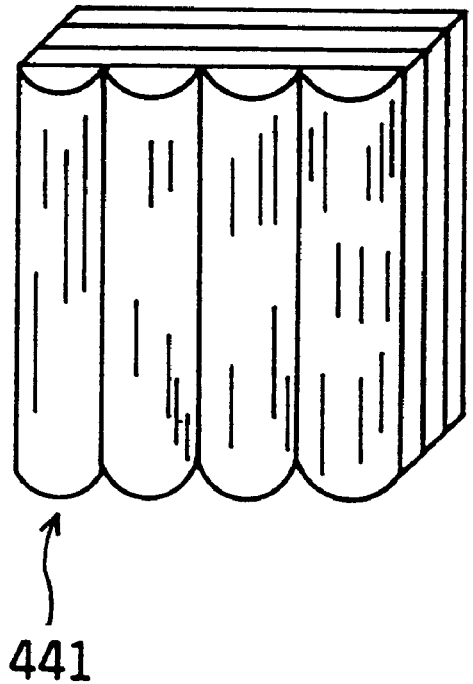

FIGS. 83A and 83B show the construction of a polarization device 520 according to a fifty-ninth embodiment of the present invention and a modification thereof.

Referring to FIG. 83A, the polarization device 520 has a construction similar to that of the polarization device 490 described previously, wherein it can be seen that the lens array 441 includes a two-dimensional array of lens elements. The lens array 441 is formed easily by a molding of a transparent resin.

FIG. 83B shows an example of the lens array 441 that includes a one-dimensional array of cylindrical lenses aligned side by side. The lens array 441 of FIG. 83B is also produced easily by a molding process of a transparent resin.

In the case the cylindrical lens is used, it should be noted that the incident optical beam is focused on the reflection-type polarization element in the form of parallel line segments. In such a case, the optical density on the polarization element is reduced as compared with the case of using the lens array of FIG. 83A in which the incident optical beam is focused in the form of dots, and the problem of degradation of the liquid crystal in the reflection-type polarization element is successfully avoided particularly in the case a very powerful optical source is used for producing the incident optical beam.

Otherwise, the construction of the polarization device 520 is identical with that of the polarization device of 490 described previously, and further description of the polarization device 520 will be omitted.

SIXTIETH EMBODIMENT

Figure 84A:
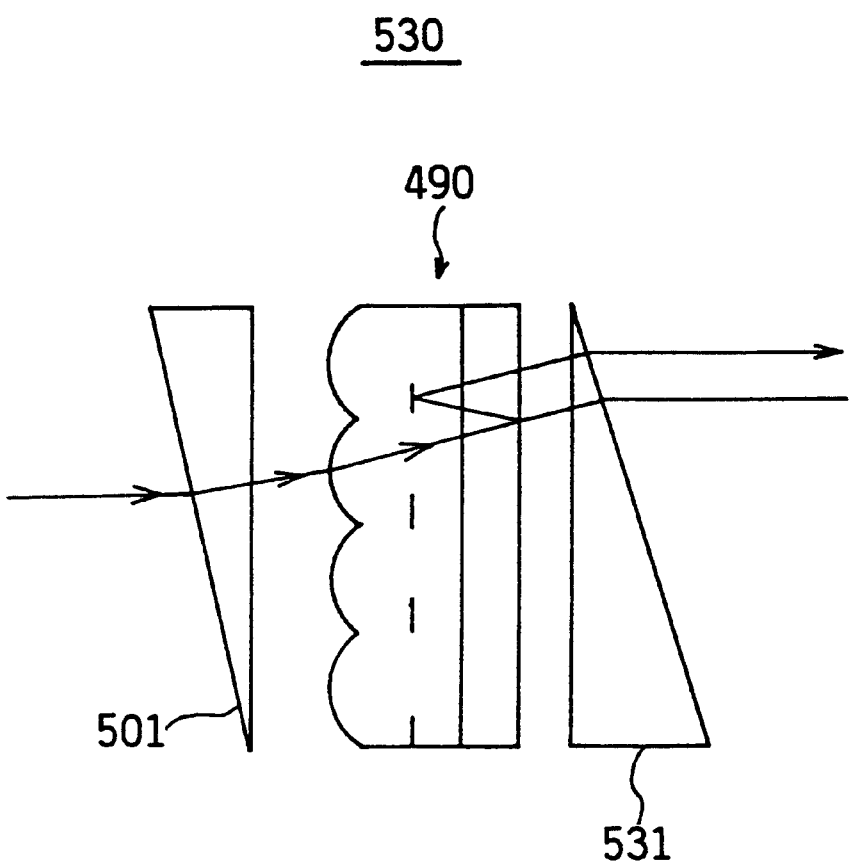
FIGS. 84A and 84B are diagrams showing the construction of a polarization device according to a sixtieth embodiment of the present invention.
Figure 84B:
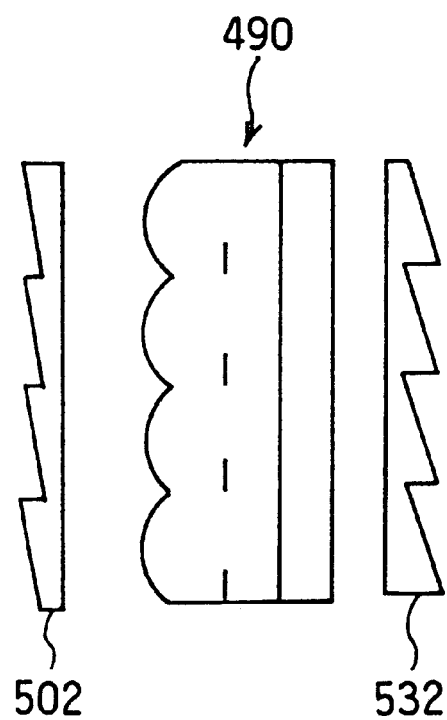

FIGS. 84A and 84B show the construction of a polarization device 530 according to a sixtieth embodiment of the present invention and a modification thereof, wherein those parts corresponding to the parts described previously are designated by the same reference numerals and the description thereof will be omitted.

Referring to FIG. 84A, the polarization device 530 has a construction similar to that of the polarization device 500 described with reference to FIGS. 81A and 81B. Thus, the polarization device 530 includes the polarization device 490 of FIG. 80B and the prism 501 at the incidence side of the polarization device 490, wherein it should be noted that the polarization device 530 further includes another prism 531 having a single sloped edge surface at the exit side of the polarization device 490 for deflecting the linearly polarized optical beam exited from the polarization device 490 such that the optical path of the linearly polarized optical beam thus exited from the polarization device 530 becomes parallel with respect to the optical path of the incident optical beam.

It should be noted that the construction of FIG. 84A is also useful for aligning the direction of the optical path of the optical beam exiting from the polarization device 530 parallel with the direction of the optical path of the incident optical beam, even in such a case in which the prism 501 at the incident side is omitted and the incident optical beam hits the polarization device 490 obliquely. Generally, the linearly polarized optical beam exits from the polarization device 490 obliquely when the incident optical beam hits the polarization device 490 obliquely, wherein there are cases in which the direction of the exiting optical beam does not coincide with the direction of the incident optical beam. By using the prism 531 at the exit side of the polarization device 490, it becomes possible to align the direction of the incident optical beam and the direction of the exit optical beam, even in such a case.

The construction of FIG. 84B may be regarded as a modification of the construction of FIG. 81B in which a prism 532 is provided at the exit side of the polarization device 490, wherein the prism 532 carries a plurality of sloped edge surfaces thereon. By using the prism 532, it becomes possible to reduce the thickness of the prism and hence the polarization device 530 as compared with the construction of FIG. 84A that uses the prism 531.

In the device of FIG. 84B, it is also possible to use a hologram for the prism 532, similarly to the embodiment of FIG. 81B.

SIXTY-FIRST EMBODIMENT

FIGS. 85A–85C show the construction of a polarization optical source 540 according to a sixty-first embodiment of the present invention, wherein those parts corresponding to the parts described previously are designated by the same reference numerals and the description thereof will be omitted.

Referring to FIG. 85A, the polarization optical source 540 is formed of a high power optical source 541 including a point optical source 541A and a parabolic reflector 541B, wherein the polarization optical source 540 further includes a polarization device 542 disposed in the optical path of the optical beam produced by the high power optical source 541. The point optical source 541A may be formed of an arc lamp such as a metal halide lamp, a xenon lamp or a high-power mercury lamp, while the polarization device 542 has a construction substantially identical with the polarization device 490 in the cross-sectional view taken so as to surround the optical axis of the optical source 540. In the foregoing cross-sectional view, the substrates 490A, 490B and 490C are stacked to form the polarization device 542.

In the plan view, on the other hand, the polarization device 542 includes a number of cylindrical lenses 542A arranged radially about the optical axis coincident to the symmetry axis of the parabolic mirror 541, wherein the cylindrical lenses 542A are formed on the glass substrate 490C. Associated with the radial arrangement of the cylindrical lenses 542A, it should be noted that the mirrors 43 are arranged also radially in correspondence to the optically ineffective regions formed by the radially arranged cylindrical lenses 542A.

In the polarization optical source 540 having such a construction, the high-power optical beam produced by the point optical source 541A and reflected by the parabolic mirror 541B enters the polarization device 542 and reaches the reflection-type polarization elements 442 formed on the substantially entire bottom surface of the glass substrate 490C, wherein only the linear-polarization component having the desired plane of polarization passes through the polarization elements 442 and exits from the polarization device 542.

On the other hand, the remaining polarization components are reflected by the foregoing reflection-type polarization elements 442 and are caused to pass through the quarter-wavelength film 444 formed at the interface between the substrate 490A and the substrate 490B. After passing through the quarter-wavelength film 444, the remaining polarization components are reflected by the mirrors 443 and are caused to pass through the quarter-wavelength film 444 again in the opposite direction. Thereby, the remaining polarization components are converted to the linear-polarization beam having the desired plane of polarization, and the linear polarization beam thus converted exits from the polarization device 542 after passing through the reflection-type polarization element 442 at the bottom surface of the substrate 490A.

In the polarization optical source 540, it should be noted that the point optical source 541A disposed at the focal point of the parabolic mirror 541B is not exactly a point optical source but produces an arc 541a having a non-infinitesimal, finite arc length in the axial direction of the parabolic mirror 541B. In the typical case, the arc length reaches as much as 3–5 mm and the optical beam produced by the parabolic mirror 541B has a divergent angle $\theta$ of typically ±6° in the plane of the axis of the parabolic mirror 541B.

In the front view, on the other hand, the arc 541a has a very small diameter of 1–2 mm as represented in FIG. 15C, wherein FIG. 15C shows the high-power optical source 541 as viewed from the direction of the symmetry axis of the parabolic mirror 541B. In such a case, the divergent angle $\Phi$ of the optical beam in the circumferential direction after the reflection by the parabolic mirror 541B has a value of about 2.5°, which is substantially smaller than the foregoing divergent angle $\theta$.

In the polarization device such as the polarization device 490 of FIG. 80B, it should be noted that the efficiency of conversion of the polarization state changes depending on the divergence of the incident optical beam. In the case the angle of divergence of the incoming optical beam is excessive, the lens array of the polarization device cannot achieve the necessary optical focusing and the optical loss tends to increase.

In the construction of FIG. 85A, it should be noted that the cylindrical lenses 542A arranged radially about the optical axis do not focus the incident optical beam in the radial direction, in which direction the divergence angle of the incident optical beam is large, but in the circumferential direction. As noted above, the divergent angle $\Phi$ of the incident optical beam in the circumferential direction is smaller than the divergent angle $\theta$ in the radial direction. Thereby, the polarization device 542 can convert the incident optical beam into the desired linear-polarization optical beam with high efficiency.

SIXTY-SECOND EMBODIMENT

Figure 86A:
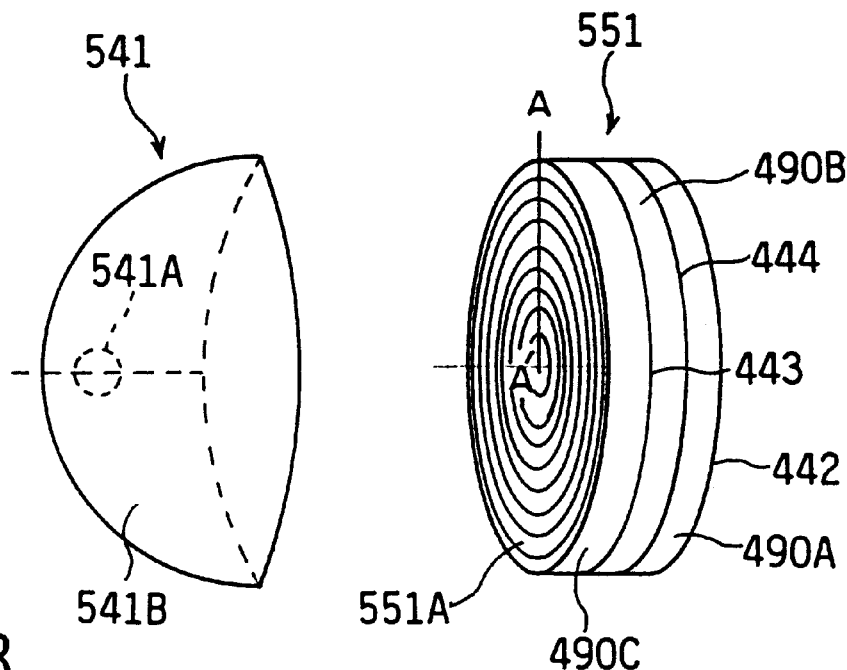
FIGS. 86A and 86B are diagrams showing the construction of a polarization optical source according to a sixty-second embodiment of the present invention.
Figure 86B:
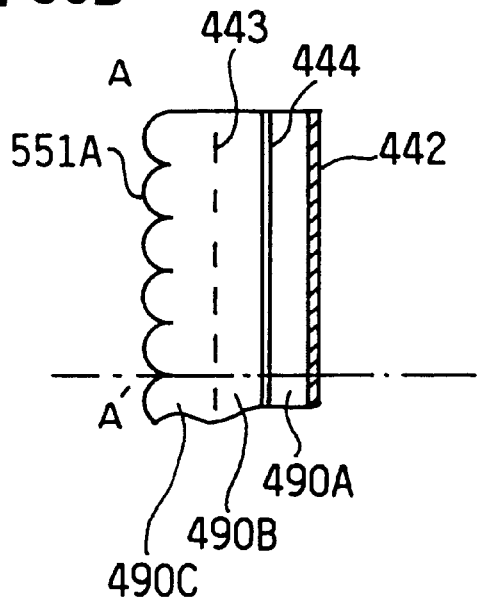

FIGS. 86A and 86B are diagrams showing the construction of a polarization optical source 550 according to a sixty-second embodiment of the present invention, wherein those parts corresponding to the parts described previously are designated by the same reference numerals and the description thereof will be omitted.

Referring to FIG. 86A, the polarization optical source 550 has a construction in which the high-power optical source 541 is combined with a polarization device 551, wherein the polarization device 551 includes, in place of the radically arranged cylindrical lenses 542A, a number of concentric cylindrical lenses 551A disposed commonly about the optical axis of the parabolic mirror 541B.

FIG. 86B is a cross-sectional view showing a part of the polarization device 551 in an enlarged scale, wherein FIG. 86B shows the cross-sectional view taken along a line A—A' shown in FIG. 86A.

Referring to FIG. 86B, the polarization device 551 includes the reflection-type polarization element 442 on the substantially entire bottom surface thereof similarly to the polarization device 490 of FIG. 80B. The polarization device 490 includes the first glass substrate 490A carrying thereon the quarter-wavelength film 444 and the second glass substrate 490B formed on the first glass substrate 490A, wherein the second glass substrate 490B carries thereon the mirrors 443 in the form of a number of concentric bands each corresponding to an optically ineffective region formed by the concentric arrangement of the cylindrical lenses 551A. It should be noted that the concentric cylindrical lenses 551 are formed on the glass substrate 490C provided on the glass substrate 590B. As noted previously, the glass substrates 490A–490C are bonded with each other by an adhesive having a refractive index identical with the refractive index of the glass substrates. Thereby, the problem of optical loss caused by the reflection at the free surface of the substrates 490A–490C is minimized.

Figure 87:
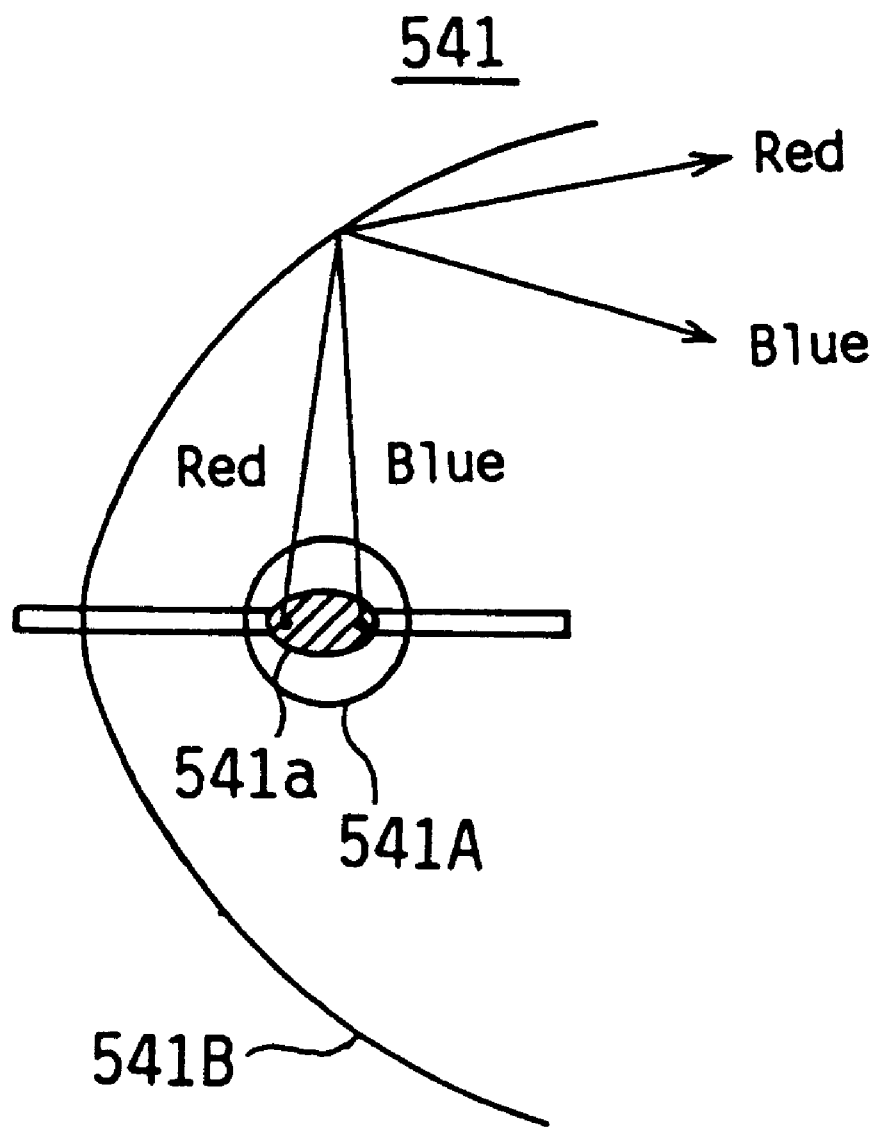
FIG. 87 is a diagram showing the construction of an optical source used in the construction of FIG. 86A.

FIG. 87 shows the optical beam emission caused by the high-power optical source 541 used in the polarization optical source 550 of FIG. 86A.

Referring to FIG. 87, the high-power optical source 541 produces an optical radiation as a result of the arc discharge 541a occurring inside the point optical source 541A, which may be a metal halide lamp, wherein the arc discharge 541a has an elongating shape extending in the axial direction of the parabolic mirror 541B as indicated in FIG. 87 and there tends to appear a bluish color at an end of the arc 541a and a reddish color at the other end. These bluish radiation and reddish radiation reach the parabolic mirror 541B along respective optical paths and are reflected generally in the axial direction of the parabolic mirror 541B, wherein the reddish and bluish beams thus formed enter the cylindrical lens array 551A including the concentric array of the cylindrical lenses. As a result of the focusing action caused by the concentric cylindrical lenses in the radial direction, the foregoing bluish and reddish optical beams are mixed and the uneven color of the optical beam produced by the point optical source 541A is successfully eliminated.

Figure 88A:
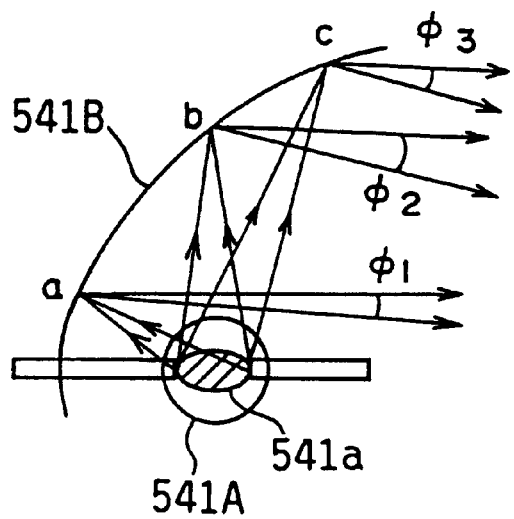
FIGS. 88A–88C are diagrams showing a modification of the polarization optical source of the sixty-second embodiment.

FIG. 88A shows the relationship between the divergent angle $\Phi$ of the optical radiation produced in the point optical source 541A by the arc 541a and the position (a, b, c) of the parabolic mirror 541B where the optical radiation thus formed is reflected.

Figure 88B:
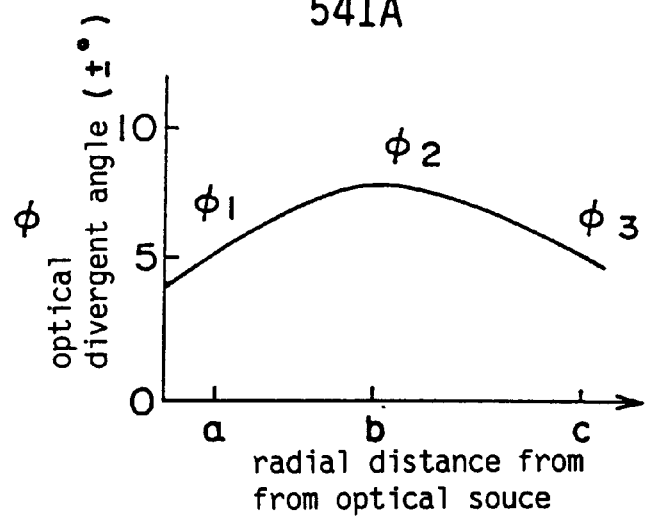

Referring to FIG. 88A, it will be noted that the divergent angle $\Phi$ takes the values of $\Phi_1$, $\Phi_2$ and $\Phi_3$ in correspondence to respective, different parts a, b and c of the mirror 541B on which the reflection of the optical radiation takes place, wherein the divergent angle $\Phi_1$ or $\Phi_3$ corresponding to the central part a or edge part c of the mirror 541B has a smaller value than the divergent angle $\Phi_2$ that corresponds to the intermediate part b of the mirror 541B as represented in FIG. 88B.

Figure 88C:
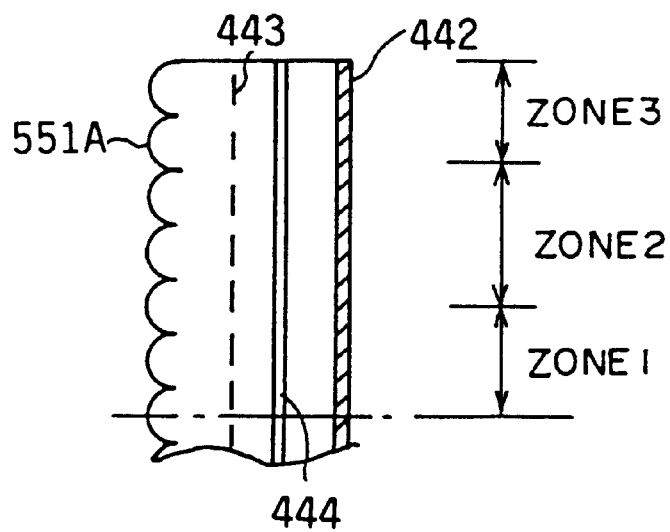

Thus, in the modification of the polarization device shown in FIG. 88C, the concentric cylindrical lenses 551A are divided or grouped, in the radial direction as measured from the optical axis, into three groups, ZONE 1, ZONE 2 and ZONE 3, wherein the pitch of the concentric cylindrical lenses is reduced in the ZONE 2 as compared with the ZONE 1 or ZONE 3 for achieving a more strong focusing of the optical beam in correspondence to the ZONE 2 where the divergent angle $\Phi$ of the incident optical beam is maximum. Thereby, it becomes possible to convert the polarization state of the optical beam in the polarization device 551 irrespective of the reflection point a, b or c on the parabolic mirror 541B.

SIXTY-THIRD EMBODIMENT

Figure 89A:
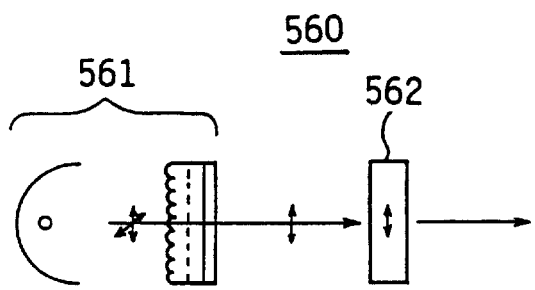
FIG. 89A is a diagram showing the construction of an optical projector according to a sixty-third embodiment of the present invention.

FIG. 89A shows the construction of an optical projector 560 according to a sixty-third embodiment of the present invention, wherein those parts corresponding to the parts described previously are designated by the same reference numerals and the description thereof will be omitted.

Referring to FIG. 19A, the linear-polarized optical beam produced by an optical source 561, which may either be the polarization optical source 540 or the polarization optical source 550 described previously, is subjected to a spatial modulation by a liquid crystal light valve 562 disposed in the optical path of the linear-polarized optical beam thus produced. After the spatial modulation in the liquid crystal light valve 562, the optical beam enters a next stage optical device not illustrated, which may be a projection optical system. In such a construction, the optical beam produced by the optical source 561 is already polarized and it is not necessary to provide an absorption-type polarizer at the upstream-side of the liquid crystal light valve 562. Thereby, the problem of temperature rise of the absorption-type polarizer is successfully avoided even in such a case in which a very powerful lamp is used for the optical source 561. Associated therewith, it becomes possible to eliminate the bulky cooking system hitherto used for cooing the absorption-type polarizer. As the optical source 561 converts substantially the entire optical energy produced as a result of electric discharge into the linear polarization beam having the desired polarization plane, the optical projector 560 having such a construction has the advantageous feature of small optical loss. Further, the problem of temperature rise of the lamp caused by the reflected optical beam is also avoided.

SIXTY-FOURTH EMBODIMENT

Figure 89B:
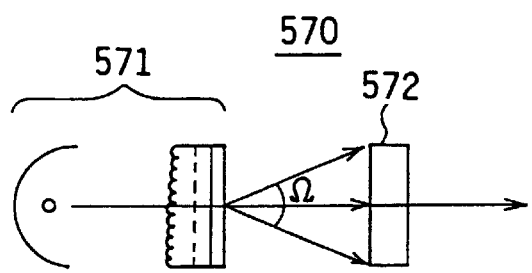
FIG. 89B is a diagram showing the construction of an optical projector according to a sixty-fourth embodiment of the present invention.

FIG. 89B shows the construction of an optical projector 570 according to a sixty-fourth embodiment of the present invention, wherein those parts corresponding to the parts described previously are designated by the same reference numerals and the description thereof will be omitted.

Referring to FIG. 89B, the linear-polarization optical beam emitted from an optical source 571, which may either be the polarization optical source 540 or the polarization optical source 550 described previously, is subjected to a spatial modulation by a liquid crystal light valve 572 disposed in the optical path of the linear-polarized optical beam thus produced. After the spatial modulation in the liquid crystal light valve 572, the optical beam enters a next stage optical device not illustrated, which may be a projection optical system.

In the present embodiment, it is possible to set the divergent angle $\Omega$ of the optical beam exiting from the optical source 571, by suitably setting the focal length f of the lens element 542A of FIG. 85A or the lens element 551A of FIG. 86A, such that substantially the entire optical beam enters the liquid crystal light valve 572. As a result of the construction, the optical loss of the optical projector 570 is minimized.

SIXTY-FIFTH EMBODIMENT

Figure 89C:
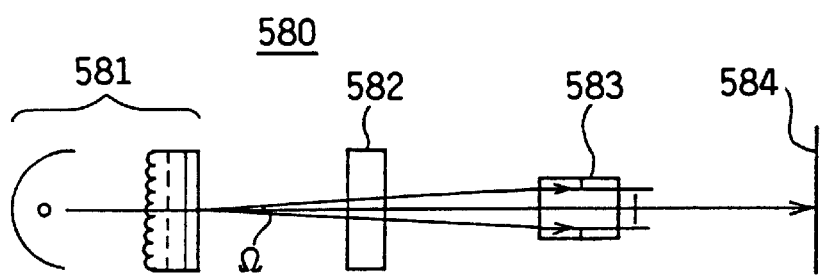
FIG. 89C is a diagram showing the construction of an optical projector according to a sixty-fifth embodiment of the present invention.

FIG. 89C shows the construction of an optical projector 580 according to a sixty-fifth embodiment of the present invention, wherein those parts corresponding to the parts described previously are designated by the same reference numerals and the description thereof will be omitted.

Referring to FIG. 89C, the linear-polarization optical beam emitted from an optical source 581, which may either be the polarization optical source 540 or the polarization optical source 550 described previously, is subjected to a spatial modulation by a liquid crystal light valve 582 disposed in the optical path of the linear-polarized optical beam thus produced. After the spatial modulation in the liquid crystal light valve 582, the optical beam enters a projection optical system 583 of the next stage and is focused on a screen 584.

In the present embodiment, it is possible to set the divergent angle $\Omega$ of the optical beam exiting from the optical source 581, by suitably setting the focal length f of the lens element 542A of FIG. 85A or the lens element 551A of FIG. 86A, such that substantially the entire optical beam of the optical source 581 enters the optical projector 582. As a result of the construction, the optical loss of the optical projector 580 is minimized.

SIXTY-SIXTH EMBODIMENT

Figure 89D:
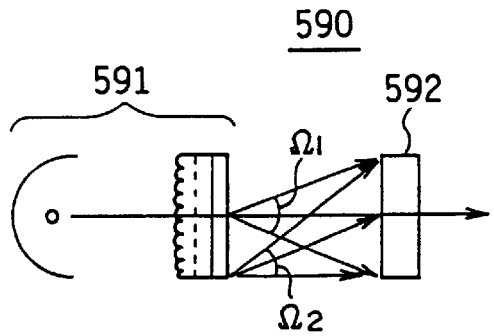
FIG. 89D is a diagram showing the construction of an optical projector according to a sixty-sixth embodiment of the present invention.

FIG. 89D shows the construction of an optical projector 590 according to a sixty-sixth embodiment of the present invention, wherein those parts corresponding to the parts described previously are designated by the same reference numerals and the description thereof will be omitted.

Referring to FIG. 89D, the linear-polarization optical beam emitted from an optical source 591, which may either be the polarization optical source 540 or the polarization optical source 550 described previously, is subjected to a spatial modulation by a liquid crystal light valve 592 disposed in the optical path of the linear-polarized optical beam thus produced. After the spatial modulation in the liquid crystal light valve 592, the optical beam enters a next stage optical device not illustrated, which may be a projection optical system.

In the present embodiment, there is provided a prism corresponding to the prism 532 of FIG. 84B in the optical source 591, wherein the prism sets the divergent angle, such as the angle $\Omega_1$ or $\Omega_2$, of the optical beam emitted from the optical source 591, such that substantially entirety of the optical beam impinges upon the liquid crystal light valve 592, irrespective of whether the optical beam is emitted along the optical axis of the optical source 591 or emitted from a marginal part of the optical source 591. Thereby, the optical loss of the optical projector 590 is minimized.

SIXTY-SEVENTH EMBODIMENT

Figure 90:
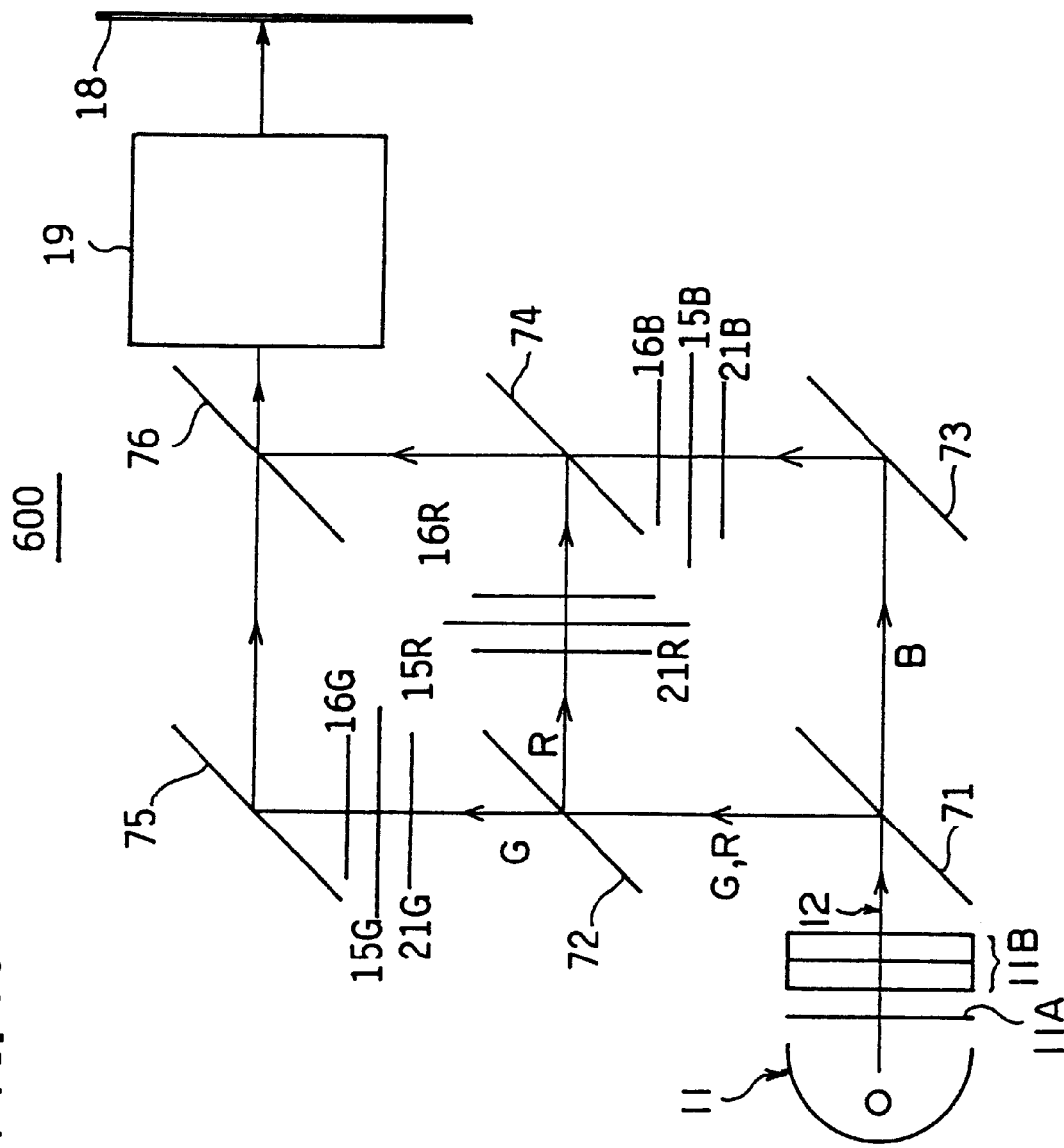
FIG. 90 is a diagram showing the construction of an optical projector according to a sixty-seventh embodiment of the present invention.

FIG. 90 shows the construction of an optical projector 600 according to a sixty-seventh embodiment of the present invention, wherein those parts corresponding to the parts described previously are designated by the same reference numerals.

Referring to FIG. 60, the optical projector 600 has a construction similar to that of the optical projector 70 described with reference to FIG. 18, except that a polarization device 11B, which may be any of the polarization devices 400, 460–530 described before, is provided behind a UV-cut filter 11A but before the dichroic mirror 71. Thereby, the optical beam 12 is converted to the desired linear-polarization optical beam upon passage through the polarization device 11B and the polarization device 11B form, together with the optical source 11, the polarization optical source described in any of the embodiments 540–590.

As the high-power optical beam 12 impinging upon the dichroic mirror 71 is already polarized to have the desired polarization plane, it is possible to use the ordinary, absorption-type polarization element for the polarizer 21R, 21G or 21B, without using a bulky cooing mechanism.

SIXTY-EIGHTH EMBODIMENT

Figure 91:
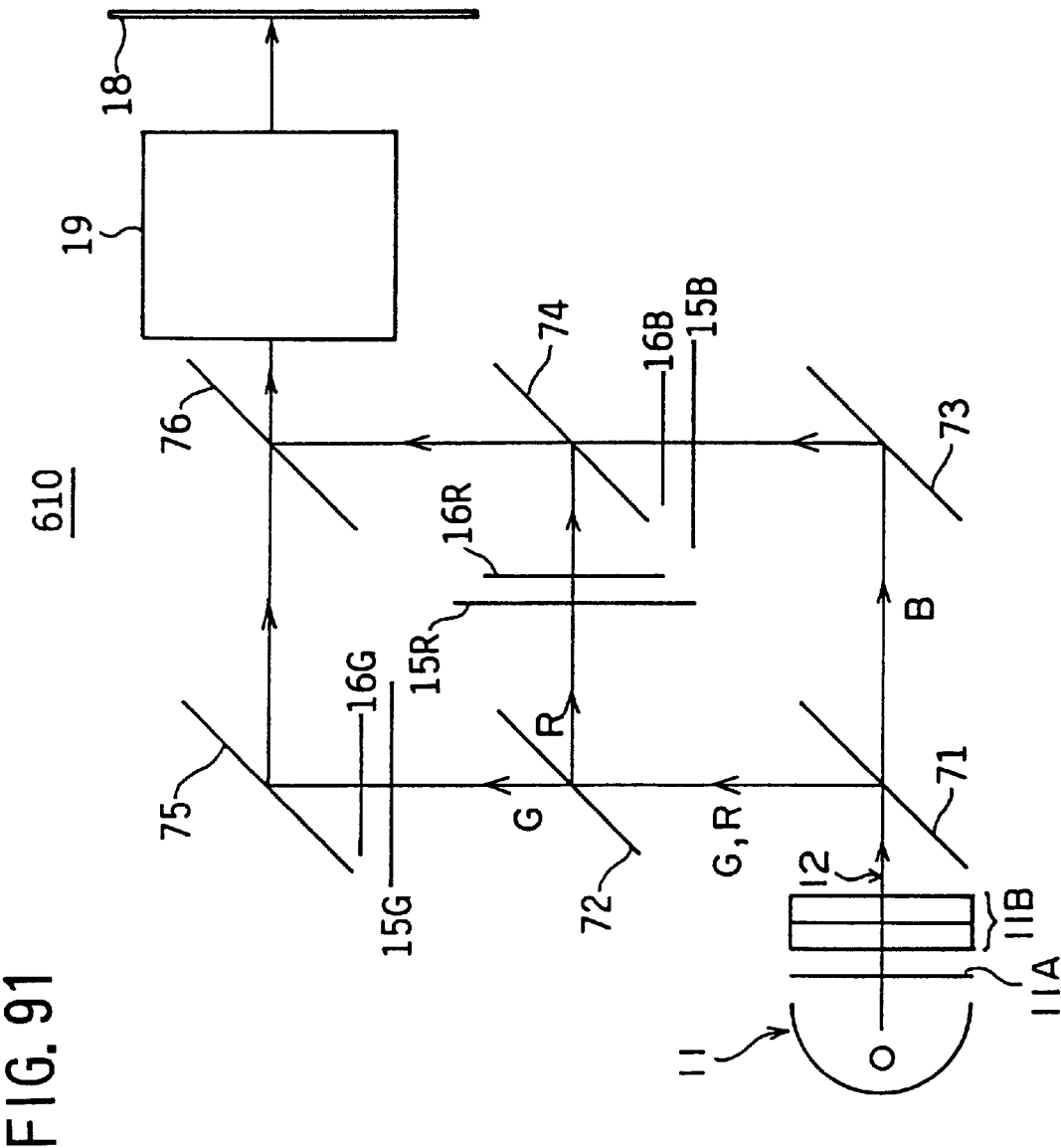
FIG. 91 is a diagram showing the construction of an optical projector according to a sixty-eighth embodiment of the present invention.

FIG. 91 show the construction of an optical projector 610 according to a sixty-eighth embodiment of the present invention, wherein those parts corresponding to the parts described previously are designated by the same reference numerals and the description thereof will be omitted.

Referring to FIG. 91, it will be noted that the absorption-type polarization elements 21R, 21G and 21B of the construction of FIG. 90 are eliminated from the upstream-side of the liquid crystal light valve 15R, 15G or 15B. Depending on the required quality of image representation, such a simplified construction is also possible.

Further, the present invention is not limited to the embodiments described heretofore, but various variations and modifications may be made without departing from the scope of the present invention.

What is claimed is:

1. A polarization device for polarizing an incident optical beam, comprising:

a first polarization element passing a predetermined polarization component included in said incident optical beam and having a predetermined polarization plane, said first polarization element reflecting other polarization components substantially, said other polarization components being included in said incident optical beam and having different polarization planes; and a second polarization element passing said polarization component having said predetermined polarization plane and absorbing said other polarization components substantially;

said first and second polarization elements being disposed such that a transmission axis of said first polarization element and a transmission axis of said second polarization element coincide with each other;

said first polarization element being disposed at an upstream side of an optical path of said incident optical beam with respect to said second polarization element, said polarization device further comprising a condenser lens on said optical path at an upstream side of said incident optical beam with respect to said first polarization element.

2. The polarization device as claimed in claim 1, wherein said first and second polarization elements are in intimate contact with each other.

3. The polarization device as claimed in claim 1, wherein said condenser lens is provided on said first polarization element in intimate contact therewith.

4. The polarization device as claimed in claim 1, wherein said first polarization element includes a liquid crystal layer that reflects one of a right-rotation circularly polarized component and a left-rotation circularly polarized component selectively, and a phase retardation film disposed adjacent to said liquid crystal layer on said path of said optical beam passing through said first polarization element, said phase retardation film inducing a phase retardation of a quarter wavelength in said optical beam passing through said phase retardation film.

5. The polarization device as claimed in claim 1, wherein said first polarization element comprises:

a first liquid crystal layer that acts upon a first primary color beam included in said incident optical beam, said first liquid crystal layer selectively reflecting one of a right-rotation circularly polarized component and a left-rotation circularly polarized component included in said first primary color beam; a second liquid crystal layer that acts upon a second primary color beam included in said incident optical beam, said second liquid crystal layer selectively reflecting one of a right-rotation circularly polarized component and a left-rotation circularly polarized component included in said second primary color beam; a third liquid crystal layer that acts upon a third primary color beam included in said incident optical beam, said third liquid crystal layer selectively reflecting one of a right-rotation circularly polarized component and a left-rotation circularly polarized component included in said third primary color beam;

said first through third liquid crystal layers being stacked to form a stacked structure, and wherein said first polarization element further includes a phase retardation layer provided adjacent to said stacked structure, said phase retardation layer inducing a shift in phase of an optical beam passing therethrough by a quarter-wavelength.

6. The polarization device as claimed in claim 1, wherein said first polarization element comprises:

a first liquid crystal layer that acts upon a first primary color beam included in said incident optical beam, said first liquid crystal layer selectively reflecting one of a right-rotation circularly polarized component and a left-rotation circularly polarized component included in said first primary color beam;

a first phase retardation layer provided adjacent to said first liquid crystal layer, said first phase retardation layer acting upon said first primary color beam and inducing a phase shift in said first primary color beam by a quarter-wavelength;

a second liquid crystal layer that acts upon a second primary color beam included in said incident optical beam, said second liquid crystal layer selectively reflecting one of a right-rotation circularly polarized component and a left-rotation circularly polarized component included in said second primary color beam;

a second phase retardation layer provided adjacent to said second liquid crystal layer, said second phase retardation layer acting upon said second primary color beam and inducing a phase shift in said second primary color beam by a quarter-wavelength;

a third liquid crystal layer that acts upon a third primary color beam included in said incident optical beam, said third liquid crystal layer selectively reflecting one of a right-rotation circularly polarized component and a left-rotation circularly polarized component included in said third primary color beam; and a third phase retardation layer provided adjacent to said third liquid crystal layer, said third phase retardation layer acting upon said third primary color beam and inducing a phase shift in said third primary color beam by a quarter-wavelength.

7. The polarization device as claimed in claim 1, wherein said first polarization element carries a filter that interrupts ultraviolet radiation at a side to which said incident optical beam comes in.

8. The polarization device as claimed in claim 7, wherein said filter has a multilayered structure that reflects said ultraviolet radiation.

9. The polarization device as claimed in claim 7, wherein said filter includes a plurality of filter elements disposed in an optical path of said incident optical beam, each of said plurality of filter elements reflecting an ultraviolet radiation.

10. The polarization device as claimed in claim 9, wherein one of said filter elements is provided with a tilting with respect to another filter element.

11. The polarization device as claimed in claim 7, wherein said filter is provided on said first polarization element in an intimate contact therewith.

12. A polarization device, comprising:

a plurality of focusing elements disposed adjacent with each other, each of said focusing elements having an incident side to which an incident optical beam comes in and an exit side from which said optical beam is exited, each of said focusing elements focusing said incident optical beam to form a focused optical beam bundle;

a reflection-type polarization element provided at said exit side of each of said focusing elements so as to intercept said focused optical beam bundle focused by said focusing element;

an optically ineffective region formed for each of said plurality of focusing element between said focusing element and an adjacent focusing element, none of said optical beam bundles reaching said optically ineffective region;

a mirror formed in each of said optically ineffective regions so as to intercept an optical beam bundle reflected by a corresponding reflection-type polarization element, said reflection-type polarization element thereby reflecting said optical beam bundle along said optically ineffective region; and an optical phase compensation element disposed in an optical path of said optical beam bundle reflected by said mirror, said optical phase compensation element converting a polarization state of said reflected optical beam bundle;

wherein each point of said mirror intersects a ray included in said optical bundle reflected by said reflection-type polarization element.

13. A polarization device as claimed in claim 12, wherein each of said reflection-type polarization elements is provided on an optical axis of a corresponding focusing element within a distance of (½)f as measured from a focusing point of said focusing element having a focal distance f.

14. A polarization device as claimed in claim 12, wherein each of said reflection-type polarization elements is provided on an optical axis of a corresponding focusing element at a distance of about (¼)f as measured form a focusing point of said focusing element having a focal distance f.

15. A polarization device as claimed in claim 12, wherein said plurality of focusing elements are provided with a pitch P, and wherein said focal distance f is determined so as to satisfy a relationship of $P \times f/2 \leq 1$.

16. A polarization device as claimed in claim 12, wherein each of said reflection-type polarization elements is formed on a first plane perpendicular to an optical axis of a corresponding focusing element, each of said plurality of mirrors is provided on a second plane parallel to said first plane, each of said optical phase compensation element is provided on a third plane parallel to said first and second planes, and wherein said polarization device is disposed such that said first plane intersects an optical path of said incident optical beam obliquely.

17. A polarization device as claimed in claim 16, wherein said plurality of reflection-type polarization elements are formed on a first substrate, said first substrate being defined by a first principal surface corresponding to said first plane and a second principal surface corresponding to said third plane, as a single continuous layer covering said first principal surface, said plurality of optical phase compensation elements are formed on said first substrate as a single continuous layer covering said second principal surface, said plurality of mirrors are formed on a second substrate defined by a third principal surface and a fourth principal surface opposing said third principal surface and corresponding to said second plane, so as to cover said fourth principal surface partially, said plurality of focusing elements are formed on a third substrate defined by a fifth principal surface and a sixth principal surface opposing said fifth principal surface, said plurality of focusing elements thereby being formed on said sixth principal surface, said first through third substrates being stacked such that said second principal surface of said first substrate engages said third principal surface of said second substrate and such that said fourth principal surface of said second substrate engages said fifth principal surface of said third substrate, at least two of said first through third substrates being adhered with each other by an adhesive layer.

18. A polarization device as claimed in claim 17, wherein said substrates adhered with each other has a substantially identical refractive index, and wherein said adhesive layer has a refractive index substantially identical with said refractive index of said adhered substrates.

19. A polarization device as claimed in claim 16, wherein said plurality of reflection-type polarization elements are formed on a first substrate, said first substrate being defined by a first principal surface corresponding to said first plane and a second principal surface opposing said first principal surface, as a single continuous layer covering said first principal surface, said plurality of optical phase compensation elements are formed on a second substrate defined by a third principal surface corresponding to said third plane and a fourth principal surface opposing said third principal surface as a single continuous layer covering said third principal surface, said plurality of mirrors are formed on a third substrate defined by a fifth principal surface corresponding to said second plane and a sixth principal surface opposing said fifth principal surface so as to cover said fifth principal surface partially, said plurality of focusing elements are formed on said sixth principal substrate of said third substrate, said first through third substrates being stacked such that said second principal surface of said first substrate engages said third principal surface of said second substrate and such that said fourth principal surface of said second substrate engages said fifth principal surface of said third substrate, at least two of said first through third substrates being adhered with each other by an adhesive layer.

20. A polarization device as claimed in claim 19, wherein said substrates adhered with each other has a substantially identical refractive index, and wherein said adhesive layer has a refractive index substantially identical with said refractive index of said adhered substrates.

21. A polarization device as claimed in claim 16, wherein said first plane and said second plane coincide with each other, each of said plurality of reflection-type polarization elements and each of said plurality of optical phase compensation elements are provided on a first substrate defined by a first principal surface corresponding to said first plane and a second, opposing principal surface corresponding to said second plane, so as to cover said first principal surface alternately, each of said plurality of mirrors is provided on said second principal surface of said first substrate, each of said plurality of focusing elements is formed on a second substrate disposed so as to face said second principal surface of said first substrate, wherein said first and second substrates are stacked with each other such that said second principal surface of said first substrate engages a principal surface of said second substrate on which said plurality of focusing elements are formed, said first and second substrates being adhered by an adhesive layer.

22. A polarization device as claimed in claim 21, wherein said first and second substrates have a substantially identical refractive index, and wherein said adhesive layer has a refractive index substantially identical with said refractive index of said first and second substrates.

23. A polarization device as claimed in claim 16, wherein said first plane and said third plane coincide with each other, each of said plurality of optical phase compensation elements is provided on a first substrate defined by a first principal surface corresponding to said first plane and a second, opposing principal surface corresponding to said second plane, in the form of a single continuous layer covering said first principal surface, each of said plurality of reflection-type polarization elements is formed on said first substrate as another single continuous layer covering said single continuous layer, each of said plurality of mirrors formed on said second principal surface of said first substrate, said plurality of focusing elements are formed on a second substrate provided so as to face said second principal surface of said first substrate, said first and second substrates being stacked with each other such that said second principal surface of said first substrate engages said principal surface of said second substrate on which said plurality of focusing elements are formed, said first and second substrates being thereby adhered by an adhesive layer.

24. A polarization device as claimed in claim 23, wherein said first and second substrates have a substantially identical refractive index, and wherein said adhesive layer has a refractive index substantially identical with said refractive index of said first and second substrates.

25. A polarization device as claimed in claim 12, further including a deflecting element at an incident side of said polarization device, said deflecting element deflecting an optical path of an incident optical beam incident to said polarization device obliquely with respect to an optical axis of said focusing elements.

26. A polarization device as claimed in claim 12, further including a deflecting element at an exit side of said polarization device, said deflecting element deflecting an optical path of an exit optical beam exiting from said polarization device such that said optical path coincides with a direction of an optical axis of said focusing elements.

27. A polarization device as claimed in claim 12, wherein said optical phase compensation elements induces a phase retardation in an optical beam passing therethrough with a magnitude of half-wavelength of said optical beam.

28. A polarization device as claimed in claim 12, further including an additional optical phase compensation element between said reflection-type polarization element and said mirror, said optical phase compensation element and said additional optical phase compensation element inducing together an optical phase retardation, in an optical beam passing through said optical phase compensation element and said additional optical phase compensation element, with a magnitude of half-wavelength of said optical beam.

29. A polarized optical source, comprising:

an optical source; and a polarization device disposed on an optical path of an optical beam produced by said optical source, said polarization device comprising:

a plurality of focusing elements disposed adjacent with each other, each of said focusing elements having an incident side to which an incident optical beam comes in and an exit side from which said optical beam is exited, each of said focusing elements focusing said incident optical beam to form a focused optical beam bundle;

a reflection-type polarization element provided at said exit side of each of said focusing elements so as to intercept said focused optical beam bundle focused by said focusing element;

an optically ineffective region formed for each of said plurality of focusing element between said focusing element and an adjacent focusing element, none of said optical beam bundles reaching said optically ineffective region;

a mirror formed in each of said optically ineffective regions so as to intercept an optical beam bundle reflected by a corresponding reflection-type polarization element, said reflection-type polarization element thereby reflecting said optical beam bundle along said optically ineffective region; and an optical phase compensation element disposed in an optical path of said optical beam bundle reflected by said mirror, said optical phase compensation element converting a polarization state of said reflected optical beam bundle;

wherein each point of said mirror intersects a ray included in said optical bundle reflected by said reflection-type polarization element.

* * * * *